United States Patent
Mühlebach et al.

(10) Patent No.: US 6,281,307 B1
(45) Date of Patent: *Aug. 28, 2001

(54) POLYMERIZABLE COMPOSITION, PROCESS FOR PRODUCING CROSS LINKED POLYMERS, AND CROSS-LINKABLE POLYMERS

(75) Inventors: Andreas Mühlebach, Belfaux; Andreas Hafner, Laupen; Paul Adriaan Van Der Schaaf, Fribourg, all of (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/875,529

(22) PCT Filed: Jan. 18, 1996

(86) PCT No.: PCT/EP96/00195

§ 371 Date: Jul. 31, 1997

§ 102(e) Date: Jul. 31, 1997

(87) PCT Pub. No.: WO96/23829

PCT Pub. Date: Aug. 8, 1996

(30) Foreign Application Priority Data

Jan. 31, 1995 (CH) ..................... 261/95

(51) Int. Cl.$^7$ .............. C08F 4/80; B01G 31/00
(52) U.S. Cl. ............ 526/171; 526/172; 526/260; 526/280; 526/283; 526/309; 502/150; 502/156; 502/162; 502/158

(58) Field of Search .................. 526/113, 117, 526/120, 123, 171, 280, 260, 281, 172, 283, 309, 268; 502/150, 152, 162

(56) References Cited

U.S. PATENT DOCUMENTS

| 4,883,851 | * | 11/1989 | Grubbs et al. | 526/268 |
|---|---|---|---|---|
| 4,923,936 | * | 5/1990 | Goodall et al. | 526/115 |
| 4,943,621 | * | 7/1990 | Janda et al. | 526/127 |
| 4,945,141 | * | 7/1990 | Grubbs et al. | 526/90 |
| 4,945,144 | * | 7/1990 | Grubbs et al. | 526/268 |
| 4,994,535 | * | 2/1991 | Endo et al. | 526/259 |
| 5,011,730 | * | 4/1991 | Tenney et al. | 428/209 |

FOREIGN PATENT DOCUMENTS

| 0467115 | | 1/1992 | (EP) . |
|---|---|---|---|
| 9313171 | * | 7/1993 | (WO) . |

OTHER PUBLICATIONS

Macromolecular Chemistry & Physics, vol. 195, 1994, pp. 2875–2885.

* cited by examiner

Primary Examiner—David W. Wu
Assistant Examiner—Tanya Zalukaeva
(74) Attorney, Agent, or Firm—Luther A. R. Hall; Kevin T. Mansfield

(57) ABSTRACT

Composition comprising (a) catalytic amounts of a one-component catalyst for metathesis polymerization and (b) at least one polymer with strained cycloalkenylene radicals bonded in the polymer backbone, alone or as a mixture with strained cycloolefins. The composition can be polymerized thermally or photochemically by metathesis polymerization and is suitable for the production of shaped articles, coatings and relief images. The catalyst is selected from Ruthenium and Osmium compounds.

27 Claims, No Drawings

POLYMERIZABLE COMPOSITION, PROCESS FOR PRODUCING CROSS LINKED POLYMERS, AND CROSS-LINKABLE POLYMERS

The present invention relates to a composition of unsaturated polymers, in the polymer backbone of which is bonded a strained cycloalkenylene, with a one-component catalyst for metathesis polymerization which is induced thermally or by actinic radiation; a process for the polymerization of the composition; materials coated with the composition or the polymerized composition, and shaped articles of the crosslinked polymers; and crosslinkable polymers.

Thermally induced ring-opening metathesis polymerization using catalytic amounts of metal catalysts has already been known for a relatively long time and described in many cases in the literature [see, for example, Ivin, K. J., Olefin Metathesis 1–12, Academic Press, London (1983)]. Polymers obtainable in this way are prepared industrially and are commercially obtainable, for example under the trade name Vestenamer®. The industrial preparation is carried out using highly reactive two-component catalysts, as a rule transition metal halides, for example $WCl_6$ and metal-alkylenes, for example zinc-, aluminium- or tin-alkylene. The polymerization or gelling starts immediately after a cycloolefin has been combined with the two catalyst components. The mixtures of cycloolefin and catalyst therefore have exceptionally short pot lives, and they are suitable in practice only in the reaction injection moulding process (RIM process). The severe heating of the reaction mixture due to the heat of reaction, which imposes very high technical requirements on a controlled reaction temperature, is also a disadvantage. It is therefore difficult to adhere to a polymer specification. WO 93/13171 describes air- and water-stable one-component and two-component catalysts based on molybdenum and tungsten compounds containing carbonyl groups and ruthenium and osmium compounds having at least one polyene ligand for thermal metathesis polymerization and a photoactivated metathesis polymerization of strained cycloolefins, in particular norbornene. No other polycyclic—above all non-fused polycyclic—cycloolefins are mentioned. The one-component catalysts of the ruthenium compounds used, that is to say $[Ru(cumene)Cl_2]_2$ and $[(C_6H_6)Ru(CH_3CN)_2Cl]^{3\oplus} PF_6^-$, can indeed be activated by UV irradiation; however, the storage stability of the compositions with norbornene are [sic] completely unsatisfactory. These catalysts can replace the known two-component catalysts only in adequately. Demonceau et al. [Demonceau, A., Noels, A. F., Saive, E., Hubert, A. J., J. Mol. Catal. 76: 123–132 (1992)] describe (p-cumene)$RuCl_2P(C_6H_{11})_3$, $(C_6H_5)_3]_3PRuCl_2$ and $(C_6H_5)_3]_3PRuHCl$ as thermal catalysts for the ring-opening metathesis polymerization of norbornene, a fused polycycloolefin. Because their activity is too low, these catalysts have not found acceptance in industrial preparation. It is therefore proposed to increase the activity by the addition of diazoesters. It is also mentioned that only (p-cumene)$RuCl_2P(C_6H_{11})_3$ is capable of polymerizing norbornene in a relatively short time at 60° C. Cyclooctene is also mentioned as a further monomer. No other cycloolefins are mentioned for the methatesis [sic] polymerization.

Petasis and Fu [Petasis, N. A., Fu, D., J. Am. Chem. Soc. 115: 7208–7214 (1993)] describe the thermal ring-opening metathesis polymerization of norbornene using bis-cyclopentadienyl-bis(trimethylsilyl)methyl-titanium(IV) as a thermally active catalyst. No other cycloolefins are mentioned for the metathesis polymerization.

No other more reactive one-component catalysts have yet been disclosed. It is furthermore also not known to use polymers with a strained cycloalkenylene in the polymer backbone for the preparation of crosslinked polymers.

It has now been found that polymers with strained cycloalkenylene radicals bonded in the polymer backbone are outstandingly suitable for the preparation of crosslinked polymers under the action particularly of one-component catalysts. The compositions are storage-stable and are even insensitive to air and oxygen, depending on the catalysts used, which allows processing without particular protective measures. Processing is easy and the processing possibilities are diverse, because no particular measures have to be taken owing to excessive reactivity. The polymers are suitable both for the production of solid shaped articles and for coatings with particularly high adhesive strength. The polymers can furthermore be used for the production of images by means of irradiation under a photomask and subsequent development of the non-exposed portions with a suitable solvent.

The invention first relates to a composition comprising (a) catalytic amounts of a one-component catalyst for metathesis polymerization and (b) at least one polymer with strained cycloalkenylene radicals bonded in the polymer backbone, alone or mixed with strained cycloolefins.

In a preferred embodiment, the polymers are those with recurring structural units of the formula (a) in the polymer backbone

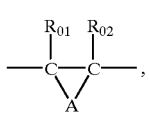

(a)

in which
$R_{01}$ and $R_{02}$ independently of one another are H or $C_1$–$C_6$alkyl, or $R_{01}$ and $R_{02}$ together are a bond, and A, together with the C—C group, forms an unsubstituted or substituted strained cycloolefin ring. The structural units of the formula (a) can be bonded directly or via bridge groups, preferably identical bridge groups.

Alkyl $R_{01}$ and $R_{02}$ preferably contain 1 to 4 C atoms; the alkyl is preferably methyl or ethyl. $R_{01}$ and $R_{02}$ are particularly preferably H.

The susbtituents for the cycloolefin ring can be, for example, $C_1$–$C_8$-, and preferably $C_1$–$C_4$alkyl or -alkoxy, for example methyl, ethyl, n- or i-propyl, n-, i- or t-butyl, methoxy, ethoxy or propyloxy; $C_1$–$C_4$haloalkyl or -alkoxy, for example trifluoromethyl, trichloromethyl, perfluoroethyl, bis(trifluoromethyl)methyl, trifluoromethoxy or bis(trifluoromethyl)methoxy; halogen, for example F, Cl or Br; —CN; —NH$_2$; secondary amino having 2 to 18 C atoms; tertiary amino having 3 to 18 C atoms; —C(O)—OR$_{03}$ or —C(O)—NR$_{03}$R$_{04}$, in which R$_{03}$ is H, $C_1$–$C_{18}$alkyl, phenyl or benzyl and R$_{04}$ independently has the meaning of R$_{03}$.

The strained cycloolefin ring can be monocyclic or polycyclic fused and/or bridged ring systems, for example with 2 to 6, preferably 2 to 4, and particularly preferably 2 or 3 rings, which are unsubstituted or substituted and can contain heteroatoms, for example O, S, N or Si, in one or more rings and/or fused aromatic or heteroaromatic rings, for example o-phenylene, o-naphthylene, o-pyridinylene or o-pyrimidinylene. The individual cyclic rings can contain 3 to 16, preferably 4 to 12, particularly preferably 5 to 8 ring members. The cyclic olefins can contain further non-aromatic double bonds, preferably 2 to 4 such additional double bonds, depending on the ring size.

Fused-on alicyclic rings preferably contain 3 to 8, particularly preferably 4 to 7, and especially preferably 5 or 6 ring C atoms. Fused-on aromatics are preferably naphthylene and, in particular, phenylene.

In a preferred embodiment, in formula (a)

$R_{01}$ and $R_{02}$ together are a bond, and A is unsubstituted or substituted $C_1$–$C_{12}$alkylene, preferably $C_2$–$C_6$alkylene; unsubstituted or substituted $C_2$–$C_{12}$heteroalkylene, preferably $C_3$–$C_6$heteroalkenyklene with at least one heteroatom from the group consisting of O, S and N; unsubstituted or substituted $C_5$–$C_{12}$cycloalkylene, preferably $C_5$–$C_7$cycloalkylene; unsubstituted or substituted $C_4$–$C_{12}$heterocycloalkylene, preferably $C_4$–$C_7$heterocycloalkylene with at least one heteroatom from the group consisting of O, S and N; unsubstituted or substituted $C_2$–$C_{12}$alkenylene, preferably $C_2$–$C_6$-alkenylene; unsubstituted or substituted $C_3$–$C_{12}$heteroalkenylene, preferably $C_3$–$C_6$heteroalkenylene with at least one heteroatom from the group consisting of O, S and N; unsubstituted or substituted $C_5$–$C_{12}$cycloalkenylene, preferably $C_5$–$C_7$cycloalkenylene; or unsubstituted or substituted $C_4$–$C_{12}$heterocycloalkenylene, preferably $C_4$–$C_7$heterocycloalkenylene with at least one heteroatom from the group consisting of O, S and N; or $R_{01}$ and $R_{02}$ independently of one another are H or $C_1$–$C_6$alkyl and A is unsubstituted or substituted $C_5$–$C_{12}$-cycloalkenylene, preferably $C_5$–$C_7$cycloalkenylene; unsubstituted or substituted $C_4$–$C_{12}$heterocycloalkenylene, preferably $C_4$–$C_7$heterocycloalkenylene with at least one heteroatom from the group consisting of O, S and N; or unsubstituted or substituted $C_5$–$C_{12}$cycloalkdienylene, preferably $C_5$–$C_7$cycloalkdienylene; or $R_{01}$ is a double bond together with a terminal C atom of the radical A; $R_{02}$ is H or $C_1$–$C_6$alkyl; and A is unsubstituted or substituted $C_1$–$C_{12}$alkylene, preferably $C_2$–$C_6$alkylene, unsubstituted or substituted $C_3$–$C_{12}$heteroalkylene, preferably $C_3$–$C_6$heteroalkylene with at least one heteroatom from the group consisting of O, S and N; unsubstituted or substituted $C_5$–$C_{12}$cycloalkylene, preferably $C_5$–$C_7$cycloalkylene; unsubstituted or substituted $C_4$–$C_{12}$heterocycloalkylene, preferably $C_4$–$C_7$heterocycloalkylene with at least one heteroatom from the group consisting of O, S and N; unsubstituted or substituted $C_2$–$C_{12}$alkenylene, preferably $C_2$–$C_6$alkenylene; unsubstituted or substituted $C_3$–$C_{12}$heteroalkenylene, preferably $C_3$–$C_6$heteroalkenylene with at least one heteroatom from the group consisting of O, S and N; unsubstituted or substituted $C_5$–$C_{12}$cycloalkenylene, preferably $C_5$–$C_7$cycloalkenylene; or unsubstituted or substituted $C_4$–$C_{12}$heterocycloalkenylene, preferably $C_4$–$C_7$heterocycloalkenylene with at least one heteroatom from the group consisting of O, S and N; or $R_{01}$ and $R_{02}$ each are a double bond together with in each case a terminal C atom of the radical A, and A is unsubstituted or substituted $C_3$–$C_{12}$alkylene, preferably $C_3$–$C_6$alkylene; unsubstituted or substituted $C_3$–$C_{12}$heteroalkylene, preferably $C_3$–$C_6$heteroalkylene with at least one heteroatom from the group consisting of O, S and N; unsubstituted or substituted $C_5$–$C_{12}$cycloalkylene, preferably $C_5$–$C_7$cycloalkylene; or unsubstituted or substituted $C_4$–$C_{12}$heterocycloalkylene, preferably $C_4$–$C_7$heterocycloalkylene with at least one heteroatom from the group consisting of O, S and N;

it being possible for phenylene, $C_4$–$C_8$cycloalkylene or $C_4$–$C_8$heterocycloalkylene to be fused onto the alkylene, heteroalkylene, cycloalkylene, heterocycloalkylene, alkenylene, heteroalkenylene, cycloalkenylene, heterocycloalkenylene, alkdienylene, heteroalkdienylene, cycloalkdienylene and heterocycloalkdienylene.

It is known to the expert that cyclohexene can be polymerized by metathesis only with difficulty or not at all. Cyclohexene radicals of the formula (a) are therefore not preferred. Structural units of the formula (a) in which $R_{01}$ and $R_{02}$ together do not form a double bond are preferred.

Particularly preferably, in formula (a), $R_{01}$ and $R_{02}$ together are a bond, and A is unsubstituted or substituted $C_2$–$C_6$alkylene, unsubstituted or substituted $C_3$–$C_7$cycloalkylene, unsubstituted or substituted $C_2$–$C_6$alkenylene or unsubstituted or substituted $C_5$–$C_7$cycloalkenylene; or $R_{01}$ and $R_{02}$ independently of one another are H or $C_1$–$C_4$alkyl and A is unsubstituted or substituted $C_5$–$C_7$cycloalkenylene; or $R_{01}$ is a double bond together with a terminal C atom of the radical A; $R_{02}$ is H or $C_1$–$C_4$alkyl; and A is unsubstituted or substituted $C_2$–$C_6$alkenylene, unsubstituted or substituted $C_5$–$C_7$cycloalkylene, unsubstituted or substituted $C_2$–$C_6$alkenylene or unsubstituted or substituted $C_5$–$C_7$cycloalkenylene; or $R_{01}$ and $R_{02}$ each are a double bond together with in each case a terminal C atom of the radical A and A is unsubstituted or substituted $C_3$–$C_6$alkylene or unsubstituted or substituted $C_5$–$C_7$-cycloalkylene.

The polymer backbone of the polymers to be used according to the invention can be built up in different ways. The polymers can be homo- or copolymers, containing structural elements of the formula (a) to the extent of at least 5 mol %, preferably 5 to 100 mol %, more preferably 5 to 80 mol %, even more preferably 10 to 70 mol %, particularly preferably 10 to 60 mol %, and especially preferably 20 to 50 mol %, based on the polymer. The polymers can be random copolymers or block copolymers.

The polymers used in the composition according to the invention include oligomers and polymers. The number of recurring structural units can accordingly be 2 to 10 000, preferably 5 to 5000, particularly preferably 10 to 1000, and especially preferably 20 to 500.

One group of polymers which are possible for the compositions according to the invention comprises, for example, the homo- and copolymers of linear polyepoxides, polyesters, polyamides, polyester-amides, polyurethanes and polyureas in which the divalent diepoxide, dicarboxylic acid or diisocyanate radicals, or in which the divalent diol or diamine radicals, or both of these radicals, contain strained cycloolefin radicals, and which, in the case of the copolymers of these divalent radicals, contain different diepoxide, dicarboxylic acid or diisocyanate, diol or diamine radicals. The strained cycloolefin ring preferably corresponds to the formula (a), including the preferred meanings.

The polyepoxides can be built up from diepoxides, as comonomers (α), having preferably 6 to 40, and particularly preferably 8 to 30 C atoms and diols, as comonomers (β), having preferably 2 to 200, more preferably 2 to 100, and particularly preferably 2 to 50 C atoms. Diepoxides with a strained cycloolefin ring contain preferably 6 to 40, and particularly preferably 10 to 30 C atoms. The diepoxides are preferably the diglycidyl ethers, which can easily be prepared. The monomeric diepoxides can be, for example, the diglycidyl ethers of aliphatic, cycloaliphatic, aromatic or araliphatic diols. Diols with a strained cycloolefin ring contain preferably 5 to 40, and particularly preferably 7 to 30 C atoms. The diols can be, for example, aliphatic, cycloaliphatic, aromatic or araliphatic diols. Diols and diepoxides are familiar to the expert and are not listed here. Among the diepoxides, the diglycidyl ethers and diglycidyl esters are preferred. Diepoxides and diols with a strained cycloolefin ring preferably contain a structural element of the formula (a), including the preferred meanings.

The polyepoxides can contain, for example, recurring structural elements chosen from the group of structural elements of the formulae (b), (c), (d) and (e)

$$[-CH_2-CH(OH)-CH_2-O-R_{05}-O-CH_2-CH(OH)-CH_2-O-] \quad (b),$$

$$-R_{06}-O- \quad (c),$$

$$[-CH_2-CH(OH)-CH_2-O-R_{07}-O-CH_2-CH(OH)-CH_2-O-] \quad (d),$$

$$-R_{08}-O- \quad (e),$$

with the proviso that they contain at least structural elements of the formulae [sic] (b) or (c) or both, in which $R_{05}$ and $R_{06}$ independently of one another are a divalent radical of a strained cycloolefin or a divalent radical with a strained cycloolefin, $R_{07}$ is a divalent radical of a diglycidylether reduced by the glycidyloxy groups and $R_{08}$ is a divalent radical of a diol reduced by the hydroxyl group.

The polymer can contain in each case up to 100 mol % of the structural elements of the formulae (b) and (c) per mole of the polymer. If structural elements of the formulae (b) and (d) or (c) and (e) are present, advantageous mixing ratios are 5 to 95, preferably 10 to 80 mol % of structural elements of the formulae (b) and (c) and 95 to 5, preferably 90 to 20 mol % of the structural elements of the formulae (c) and (e), per mole of the polymer.

The polyepoxides are linear polyethers and are accessible in various ways, for example either by reaction of the diepoxides with the diols or by Diels-Alder reaction of polyepoxides with olefinically unsaturated diepoxide and/or diol structural units with open-chain or, preferably, cyclic 1,3-dienes to form strained cycloolefin rings.

$R_{05}$ and $R_{06}$ can be, for example, mono- or diolefinically unsaturated $C_5$–$C_8$cycloalkylene or fused polycyclic, preferably bi- or tricyclic, $C_7$–$C_{18}$cycloalkylene. Examples are cyclopentenylene, cycloheptenylene and cyclooctenylene. In a particularly preferred embodiment, $R_{05}$ and $R_{06}$ independently of one another are a norbornene radical of the formula $(nr_1)$ or $(nr_2)$

(nr₁)

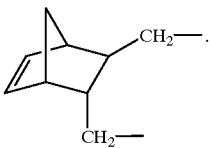
(nr₂)

$R_{07}$ and $R_{08}$ are preferably $C_2$–$C_{18}$-, preferably $C_2$–$C_{12}$alkylene, polyoxaalkylene having 2 to 50, preferably 2 to 10 oxalkylene units and 2 to 6, preferably 2 to 4 C atoms in the oxyalkylene, $C_3$–$C_{12}$-, preferably $C_5$–$C_8$cycloalkylene, $C_5$–$C_8$cycloalkylene-CH$_2$—, —CH$_2$—(C$_5$–$C_8$cycloalkylene)-CH$_2$—, $C_6$–$C_{14}$arylene, bisphenylene, benzylene, xylylene or —C$_6$H$_4$—X$_{01}$—C$_6$H$_4$—, where $X_{01}$ is O, S, SO, SO$_2$, CO, CO$_2$, NH, N(C$_1$–C$_4$-akyl), alkylidene having 1 to 18, preferably 1 to 12 C atoms or $C_5$–$C_7$cycloalkylidene. Some examples are ethylene, propylene, butylene, di-, tri- and tetraoxaethylene, cyclopentylene, cyclohexylene, cyclohexylene-CH$_2$—, —CH$_2$-cyclohexylene-CH$_2$—, phenylene, —C$_6$H$_4$—O—C$_6$H$_4$—, —C$_6$H$_4$—CH$_2$—C$_6$H$_4$—, —C$_6$H$_4$—CH(CH$_3$)—C$_6$H$_4$—, —C$_6$H$_4$—C(CH$_3$)$_2$—C$_6$H$_4$— and —C$_6$H$_4$—C$_6$H$_{10}$—C$_6$H$_4$—.

The polyepoxides are novel polymers and the invention likewise relates to these.

The polyesters can contain identical or different structural elements chosen from the group of structural elements of the formulae (f), (g), (h) and (i), where at least the structural elements of the formulae [sic] (f) or (g) or both must be present $$-C(O)-R_{09}-C(O)- \quad (f),$$

$$-O-R_{010}-O- \quad (g),$$

$$-C(O)-R_{011}-C(O)- \quad (h),$$

$$-O-R_{012}-O- \quad (i),$$

in which $R_{09}$ and $R_{010}$ independently of one another are a divalent radical of a strained cycloolefin or a divalent radical with a strained cycloolefin, $R_{011}$ is a divalent radical of a dicarboxylic acid reduced by the carboxyl groups and $R_{012}$ is a divalent radical of a diol reduced by the hydroxyl group.

The polymer can contain in each case up to 100 mol % of the structural elements of the formulae (f) and (g), per mole of the polymer. If structural elements of the formulae (f) and (h) or (g) and (i) are present, advantageous mixing ratios are 5 to 95, preferably 10 to 80 mol % of structural elements of the formulae (f) and (h) and 95 to 5 preferably 90 to 20 mol % of the structural elements of the formulae (g) and (i).

The polyesters are preferably linear and accessible either by esterification or transesterification processes on the corresponding monomers, or by Diels-Alder reaction of polyesters with olefinically unsaturated dicarboxylic acid and/or diol structural units with open-chain or, preferably, cyclic 1,3-dienes to form strained cycloolefin rings. Mono-, di- or tricyclic dienes are preferably used for the Diels-Alder reaction.

$R_{09}$ and $R_{010}$ can be, for example, mono- or diolefinically unsaturated $C_5$–$C_8$cycloalkylene or fused polycyclic, preferably bi- or tricyclic $C_7$–$C_{18}$cycloalkylene. Examples are cyclopentenylene, cycloheptenylene, cyclooctenylene and, in particular, norbornene radicals of the formulae $(nr_1)$ and $(nr_2)$.

$R_{011}$, is preferably $C_2$–$C_{18}$-, preferably $C_2$–$C_{12}$alkylene or -alkenylene, $C_3$–$C_{12}$-, preferably $C_5$–$C_8$cycloalkylene or -cycloalkenylene, $C_5$–$C_8$cycloalkylene-$CH_2$—, —$CH_2$—($C_5$–$C_8$cycloalkylene)-$CH_2$—, $C_6$–$C_{18}$arylene, bisphenylene, benzylene, xylylene or —$C_6H_4$—$X_{01}$—$C_6H_4$—, where $X_{01}$ is O, S, SO, $S_2$, CO, $CO_2$, NH, N($C_1$–$C_4$alkyl), alkylidene having 1 to 18, preferably 1 to 12 C atoms, or $C_5$–$C_7$cycloalkylidene. Some examples are ethylene, propylene, butylene, hexylene, cyclopentylene, cyclohexylene, cyclohexylene-$CH_2$—, —$CH_2$-cyclohexylene-$CH_2$—, phenylene, naphthylene, —$C_6H_4$—$CH_2$—$C_6H_4$—, —$C_6H_4$—$C_6H_4$—, —$C_6H_4$—$SO_2$—$C_6H_4$—, —$C_6H_4$—CO—$C_6H_4$— and —$C_6H_4$—O—$C_6H_4$—. $R_{011}$ is preferably $C_2$–$C_8$alkylene, cyclohexylene or o-, m- or p-phenylene.

$R_{012}$ can preferably be $C_2$–$C_{18}$, preferably $C_2$–$C_{12}$alkylene, polyoxaalkylene having 2 to 50, preferably 2 to 10 oxaalkylene units and 2 to 6, preferably 2 to 4 C atoms in the oxyalkylene, $C_3$–$C_{12}$-, preferably $C_5$–$C_8$cycloalkylene, $C_5$–$C_8$-cycloalkylene-$CH_2$—, —$CH_2$—($C_5$–$C_8$cycloalkylene)-$CH_2$—, $C_6$–$C_{14}$arylene, bisphenylene, benzylene, xylylene or —$C_6H_4$—$X_{01}$—$C_6H_4$—, where $X_{01}$ is O, S, SO, $SO_2$, CO, $CO_2$, NH, N($C_1$–$C_4$alkyl), alkylidene having 1 to 18, preferably 1 to 12 C atoms, or $C_5$–$C_7$cycloalkylidene. Some examples are ethylene, propylene, butylene, hexylene, di-, tri- and tetreaoxaethylene, cyclopentylene, cyclohexylene, cyclohexylene-$CH_2$—, —$CH_2$-cyclohexylene-$CH_2$—, phenylene, —$C_6H_4$—$CH_2$—$C_6H_4$—, —$C_6H_4$—CH($CH_3$)—$C_6H_4$—, —$C_6H_4$—C($CH_3$)$_2$—$C_6H_4$—, —$C_6H_4$—$C_6H_{10}$—$C_6H_4$— and —$C_6H_4$—O—$C_6H_4$—. $R_{012}$ is particularly preferably $C_2$–$C_6$alkylene, which, in particular, is linear.

The polyesters are novel polymers and the invention likewise relates to these.

The polyamides can contain identical or different structural elements chosen from the group of structural elements of the formulae (j), (k), (l) and (m), where at least the structural elements of the formulae [sic] (j) or (k) or both must be present

in which $R_{013}$ and $R_{014}$ independently of one another are a divalent radical of a strained cycloolefin or a divalent radical with a strained cycloolefin, $R_{015}$ is a divalent radical of a dicarboxylic acid reduced by the carboxyl groups and $R_{016}$ is a divalent radical of a diamine reduced by the amino groups.

The polymer can contain in each case up to 100 mol % of the structural elements of the formulae (j) and (k) per mole of the polymer. If the structural elements of the formulae (j) and (l) or (k) and (m) are present, advantageous mixing ratios are 5 to 95, preferably 10 to 80 mol % of structural elements of the formulae (j) and (l) and 95 to 5, preferably 90 to 20 mol % of the structural elements of the formulae (k) and (m).

The polyamides are preferably linear and accessible either by or transamidation processes on the corresponding monomers, or by Diels-Alder reaction of polyamides with olefinically unsaturated dicarboxylic acid and/or diamine structural units with open-chain or preferably cyclic 1,3-dienes to form strained cycloolefin rings. Mono-, di- or tricyclic dienes are preferably used for the Diels-Alder reaction.

$R_{013}$ and $R_{014}$ can be, for example, mono- or diolefinically unsaturated $C_5$–$C_8$cycloalkylene or fused polycyclic, preferably bi- or tricyclic $C_7$–$C_{18}$cycloalkylene. Examples are cyclopentenylene, cycloheptenylene, cyclooctenylene and, in particular, norbornene radicals of the formulae (nr$_1$) and (nr$_2$).

$R_{015}$ is preferably $C_2$–$C_{18}$-, preferably $C_2$–$C_{12}$alkylene or -alkenylene, $C_3$–$C_{12}$-, preferably $C_5$–$C_8$cycloalkylene or -cycloalkenylene, $C_5$–$C_8$cycloalkylene-$CH_2$—, —$CH_2$—($C_5$–$C_8$cycloalkylene)-$CH_2$—, $C_6$–$C_{18}$arylene, bisphenylene, benzylene, xylylene or —$C_6H_4$—$X_{01}$—$C_6H_4$—, where $X_{01}$ is O, S, SO, $SO_2$, CO, $CO_2$, NH, N($C_1$–$C_4$alkyl) or alkylidene having 1 to 18, preferably 1 to 12 C atoms, or $C_5$–$C_7$cycloalkylidene. Some examples are ethylene, propylene, butylene, hexylene, cyclopentylene, cyclohexylene, cyclohexylene-$CH_2$—, —$CH_2$-cyclohexylene-$CH_2$—, phenylene, naphthylene, —$C_6H_4$—$CH_2$—$C_6H_4$—, —$C_6H_4$—$C_6H_4$—, —$C_6H_4$—$SO_2$—$C_6H_4$—, —$C_6H_4$—CO—$C_6H_4$— and —$C_6H_4$—O—$C_6H_4$—. $R_{015}$ is preferably $C_2$–$C_8$alkylene, cyclohexylene or o-, m- or p-phenylene.

$R_{016}$ can preferably be $C_2$–$C_{18}$-, preferably $C_2$–$C_{12}$alkylene, $C_3$–$C_{12}$-, preferably $C_5$–$C_8$cycloalkylene, $C_5$–$C_8$cycloalkylene-$CH_2$—, —$CH_2$—($C_5$–$C_8$cycloalkylene)-$CH_2$—, $C_6$–$C_{14}$arylene, bisphenylene, benzylene, xylylene or —$C_6H_4$—$X_{01}$—$C_6H_4$—, where $X_{01}$ is O, S, SO, $SO_2$, CO, $CO_2$, NH, N($C_1$–$C_4$alkyl) or alkylidene having 1 to 18, preferably 1 to 12 C atoms, or $C_5$–$C_7$cycloalkylidene. Some examples are ethylene, propylene, butylene, hexylene, di-, tri- and tetreaoxaethylene, cyclopentylene, cyclohexylene, cyclohexylene-$CH_2$—, —$CH_2$-cyclohexylene-$CH_2$—, phenylene, —$C_6H_4$—CH($CH_3$)—$C_6H_4$—, $C_6H_4$—O—$C_6H_4$—, —$C_6H_4$—$CH_2$—$C_6H_4$—, —$C_6H_4$—C($CH_3$)$_2$—$C_6H_4$— and —$C_6H_4$—$C_6H_{10}$—$C_6H_4$—. $R_{016}$ is particularly preferably $C_2$–$C_6$alkylene, which, in particular, is linear.

The polyamides can also contain structural units of 4 to 12-membered lactams, for example ε-caprolactam.

The polyamides are novel polymers and the invention likewise relates to these.

Polyester-amides are copolymers with diamines and diols which can contain, for example, the structural elements mentioned above for the polyesters and polyamides, in any combination.

The polyester-amides are novel polymers and the invention likewise relates to them.

The polyurethanes and polyureas can contain identical or different structural elements chosen from the group of structural elements of the formulae (n), (o), (p) and (q), where at least the structural elements of the formulae [sic] (n) or (o) or both must be present

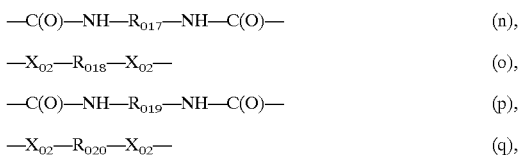

in which $R_{017}$ and $R_{018}$ independently of one another are a divalent radical of a strained cycloolefin or a divalent radical with a strained cycloolefin, $R_{019}$ is a divalent radical of a diisocyanate reduced by the cyanate groups and $R_{020}$ is a divalent radical of a diamine or of a diol reduced by the amino or hydroxyl groups, and the $X_{02}$ independently of one another are —O— or —NH—.

The polyurethanes and -ureas are preferably linear and accessible either by addition polymerization of the corresponding monomers or by Diels-Alder reaction of polyurethanes or polyureas with olefinically unsaturated diisocyanate, diol- and/or diamine structural units with open-chain or preferably cyclic 1,3-dienes to form strained cycloolefin rings. Mono-, di- or tricyclic dienes are preferably used for the Diels-Alder reaction.

The polymer can contain in each case up to 100 mol % of the structural elements of the formulae (n) and (o) per mole of the polymer. If the structural elements of the formulae (n) and (o) or (p) and (q) are present, advantageous mixing ratios are 5 to 95, preferably 10 to 80 mol % of structural elements of the formulae (n) and (p) and 95 to 5, preferably 90 to 20 mol % of the structural elements of the formulae (o) and (q).

$R_{017}$ and $R_{018}$ can be, for example, mono- or diolefinically unsaturated $C_5$–$C_8$cycloalkylene or fused polycyclic, preferably bi- or tricyclic $C_7$–$C_{18}$cycloalkylene. Examples are cyclopentenylene, cycloheptenylene, cyclooctenylene and, in particular, norbornene radicals of the formulae ($nr_1$) and ($nr_2$).

$R_{019}$ is preferably $C_2$–$C_{18}$-, preferably $C_2$–$C_{12}$alkylene or -alkenylene, $C_3$–$C_{12}$-, preferably $C_5$–$C_8$cycloalkylene or -cycloalkenylene, $C_5$–$C_8$cycloalkylene-$CH_2$—, —$CH_2$—($C_5$–$C_8$cycloalkylene)-$CH_2$—, $C_6$–$C_{18}$arylene, bisphenylene, benzylene, xylylene or —$C_6H_4$—$X_{01}$—$C_6H_4$—, where $X_{01}$ is O, S, SO, $SO_2$, CO, $CO_2$, NH, N($C_1$–$C_4$alkyl) or alkylidene having 1 to 18, preferably 1 to 12 C atoms, or $C_5$–$C_7$cycloalkylidene. Some examples are ethylene, propylene, butylene, hexylene, cyclopentylene, cyclohexylene, isophoronylene, cyclohexylene-$CH_2$—, —$CH_2$-cyclohexylen-$CH_2$—, phenylene, naphthylene, toluylene, xylylene, —$C_6H_4$—$C_6H_4$—, —$C_6H_4$—$CH_2$—$C_6H_4$—, —$C_6H_4$—$SO_2$—$C_6H_4$—, —$C_6H_4$—CO—$C_6H_4$— and —$C_6H_4$—O—$C_6H_4$—.

$R_{020}$ can preferably be $C_2$–$C_{18}$-, preferably $C_2$–$C_{12}$alkylene, polyoxaalkylene having 2 to 50, preferably 2 to 10 oxaalkylene units and 2 to 6, preferably 2 to 4 C atoms in the oxyalkylene, $C_3$–$C_{12}$-, preferably $C_5$–$C_8$cycloalkylene, $C_5$–$C_8$cycloalkylene-$CH_2$—, —$CH_2$—($C_5$–$C_8$cycloalkylene)-$CH_2$—, $C_6$–$C_{14}$arylene, bisphenylene, benzylene, xylylene, —$C_6H_4$—$X_{01}$—$C_6H_4$—, where $X_{01}$ is O, S, SO, $SO_2$, CO, $CO_2$, NH, N($C_1$–$C_4$alkyl) or alkylidene having 1 to 18, preferably 1 to 12 C atoms, or $C_5$–$C_7$cycloalkylidene. Some examples are ethylene, propylene, butylene, hexylene, di-, tri- and tetreaoxaethylene, cyclopentylene, cyclohexylene, cyclohexylene-$CH_2$—, —$CH_2$-cyclohexylene-$CH_2$—, phenylene, —$C_6H_4$—$CH_2$—$C_6H_4$—, —$C_6H_4$—CH($CH_3$)—$C_6H_4$—, —$C_6H_4$—C($CH_3$)$_2$—$C_6H_4$—, —$C_6H_4$—$C_6H_{10}$—$C_6H_4$— and —$C_6H_4$—O—$C_6H_4$—. $R_{020}$ is particularly preferably $C_2$–$C_6$alkylene which, in particular, is linear.

The polyurethanes and polyureas are novel polymers and the invention likewise relates to these.

Polymers with a carbon backbone, of which various embodiments may be mentioned, are preferred according to the invention.

One embodiment can be essentially or completely linear metathesis polymers of fused at least bicyclic cycloaliphatic dienes which contain two olefinic double bonds in different rings. The individual rings can contain 3 to 12, preferably 5 to 8 ring C atoms. The polymers contain, for example, recurring structural elements of the formula (r)

=CH—$R_{021}$—CH= (r), in which $R_{021}$ is $C_2$–$C_{10}$-, preferably $C_3$–$C_6$alkylene, onto which a cycloalkenylene having a total of 5 to 8 C atoms is fused directly or via another fused-on cycloalkylene having 5 to 8 C atoms. Preferred examples are linear polynorbornadiene with recurring structural elements of the formula (r')

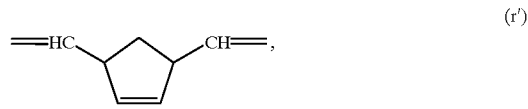

or linear polydicyclopentadiene with recurring structural elements of the formula (r")

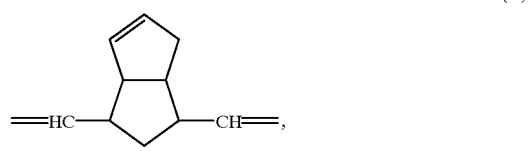

or copolymers with these two recurring structural elements.

Polymers which are furthermore suitable are linear copolymers with a recurring structural element of the formula (r), preferably in each case one or both the above structural elements (r') and (r") and structural elements of the formula (r''')

of a strained cycloolefin, in which $Q_3$ is a linear or branched $C_1$–$C_{18}$alkylene which is unsubstituted or substituted by halogen, =O, —CN, —$NO_2$, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $R_1R_2R_3Si$—(O)$_u$—, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroarylalkyl or $R_4$—X—; or in which two adjacent C atoms are substituted by —CO—O—CO— or —CO—$NR_5$—CO—; or in which, possibly at adjacent carbon atoms, an alicyclic, aromatic or heteroaromatic ring is fused on which is unsubstituted or is substituted by halogen, —CN, —$NO_2$, $R_6R_7R_8Si$—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroarylalkyl or $R_{13}$—$X_1$—;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, $C_7$–$C_{16}$aralkyl;

$R_5$ and $R_{10}$ independently of one another are hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl; M is an alkali metal and $M_1$ is an alkaline earth metal; and u is 0 or 1;

the alicyclic ring formed with $Q_3$ possibly containing further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN, $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

the abovementioned cycloalkyl, heterocycloalkyl, aryl, heteroaryl, aralkyl and heteroaralkyl groups being unsubstituted or substituted by $C_1$–$C_{12}$alkyl, $C_1$–$C_{12}$alkoxy, —$NO_2$, —CN or halogen, and the heteroatoms of the abovementioned heterocycloalkyl, heteroaryl and heteroaralkyl groups being selected from the group —O—, —S—, —$NR_9$— and —N=; and $R_9$ being hydrogen, $C_1$–$C_{12}$alkyl, phenyl or benzyl. $Q_2$ is with particular preference H.

In another embodiment, the polymers with a carbon backbone are copolymers of strained cycloolefins with fused at least bicyclic cycloaliphatic dienes which contain at least two olefinic double bonds in different rings, and ethylenically unsaturated comonomers. The individual rings can contain 3 to 12, preferably 5 to 8 ring C atoms. The polymers contain, for example, recurring structural elements of the formula (r) and of the formula (s)

(r),

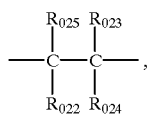

(s)

in which $R_{021}$ is $C_2$–$C_{10}$-, preferably $C_2$–$C_4$alkylene, onto which an alkenylene having 2 to 6, preferably 2 to 5 C atoms is bonded directly or via a fused-on cycloalkylene ring having 5 to 8 C atoms;

$R_{022}$ is H, F, $C_1$–$C_{12}$alkyl, —COOH, —C(O)O—$C_1$—$C_{12}$alkyl, —C(O)—NH—$C_1$–$C_{12}$alkyl or —C(O)—$NH_2$, preferably H, F, $C_1$–$C_4$alkyl, —COOH or —C(O)—$C_1$–$C_6$alkyl;

$R_{023}$ is H, F, Cl, CN or $C_1$–$C_{12}$alkyl, preferably H, F, Cl or $C_1$–$C_4$alkyl;

$R_{024}$ is H, F, Cl, CN, OH, $C_1$–$C_{12}$alkyl, $C_1$–$C_{12}$alkoxy, phenyl which is unsubstituted or substituted by OH, Cl, Br, $C_1$–$C_4$alkyl, $C_1$–$C_4$alkoxy, —C(O)O$C_1$–$C_{12}$alkyl, —C(O)—$NH_2$, —$SO_3H$, —COOH, C(O)—NH— $C_1$–$C_{12}$alkyl or —$SO_3$—$C_1$–$C_{12}$alkyl, or is —C(O)OH, —C(O)O—$C_2$–$C_{12}$hydroxyalkyl, —C(O)O—$C_1$–$C_{12}$alkyl, —C(O)—$NH_2$ or —C(O)—NH—$C_1$–$C_{12}$alkyl; and is preferably H, F, Cl, CN, OH, $C_1$–$C_4$alkyl, $C_1$–$C_4$alkoxy, pheny which is unsubstituted or substituted by OH, Cl, Br, $C_1$–$C_4$alkyl, $C_1$–$C_4$alkoxy, —COOH, —C(O)O$C_1$–$C_{14}$alkyl, —C(O)—$NH_2$, C(O)—NH—$C_1$–$C_4$alkyl, —$SO_3H$ or —$SO_3$—$C_1$–$C_4$alkyl, or —COOH, —C(O)O—$C_1$–$C_4$alkyl, —C(O)O—$C_2$—$C_6$hydroxyalkyl, —C(O)—NH—$C_1$–$C_4$alkyl or —C(O)—$NH_2$; and $R_{025}$ is H, F or $C_1$–$C_{12}$alkyl, preferably H or F.

Preferred examples of recurring structural elements of the formula (r) are structural elements of the formula (r') and (r").

The polymers can contain the structural elements of the formula (r) in an amount of 5 to 100, preferably 10 to 80, and particularly preferably 20 to 60 mol %, per mole of polymer.

The polymers, with the exception of the copolymers of norbornene and ethylene alone or together with other unsubstituted olefins, are novel and the invention likewise relates to these.

In another embodiment, the polymers with a carbon backbone are metathesis polymers of strained cycloolefins with a double bond in the ring, or copolymeric metathesis polymers of strained cycloolefins with a double bond in the ring and olefinically unsaturated comonomers, of which the olefinic double bonds in the polymer backbone are reacted partly or completely with open-chain or cyclic 1,3-dienes having 4 to 12, preferably 5 to 8 C atoms in a Diels-Alder reaction to give cycloalkenylene radicals having 6 to 14, preferably 7 to 12 C atoms. Preferably 5 to 80%, more preferably 5 to 60%, and in particular 10 to 50% of the double bonds are reacted.

In a preferred embodiment, these metathesis polymers contain recurring structural elements of the formula (t)

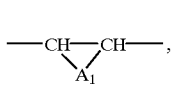

(t)

in which $A_1$ is mono- or bicyclic $C_5$–$C_8$cycloalkenylene.

The structural element of the formula (t) particularly preferably corresponds to norborn-1,2-enylene of the formula ($nr_3$)

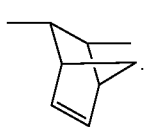

($nr_3$)

In another preferred embodiment, the metathesis polymer contains recurring structural units of the formula (u)

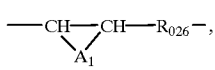

(u)

and recurring structural elements of the formula (w)

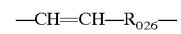

(w), in which $A_1$, together with the —CH—CH— group, is bicyclic $C_5$–$C_8$cycloalkenylene, preferably cyclopent-1,2-en-3,5-ylene, and $R_{026}$ is $C_1$–$C_{12}$-, preferably $C_3$–$C_{12}$alkylene, and, if desired, recurring structural elements of the formula (s).

The polymer can contain the structural elements of the formula (u) in an amount of 5 to 100, preferably 5 to 80, particularly preferably 5 to 60, and especially preferably 10 to 50 mol %, and the structural elements of the formula (w) in an amount of 95 to 0, preferably 95 to 20, particularly preferably 95 to 40 and especially preferably 90 to 50 mol %, per mole of polymer. They can contain the structural elements of the formula (s) in an amount of 0 to 80, preferably 0 to 60, and particularly preferably 0 to 50 mol %, per mole of a copolymer.

These metathesis polymers are novel and the invention likewise relates to them.

In another embodiment, the polymers with a carbon backbone are homo- and copolymers of 1,3-dienes and, if desired, olefinically unsaturated monomers, of which the olefinic double bonds in the polymer backbone are reacted partly or completely with open-chain or preferably cyclic 1,3-dienes having 4 to 12, preferably 5 to 8 C atoms in a Diels-Alder reaction to give cycloalkenylene radicals having 6 to 14, preferably 7 to 12 C atoms. Preferably 5 to 80%, more preferably 5 to 60%, and in particular 10 to 50% of the double bonds are reacted. Suitable 1,3-dienes are, for example, 1,3-butadiene, isoprene and chloroprene.

In a preferred embodiment, these polymers contain recurring structural elements of the formula (t).

The structural element of the formula (t) particularly preferably corresponds to norborn-1,2-enylene of the formula ($nr_3$).

In another preferred embodiment, the polymer contains recurring structural units of the formula (y)

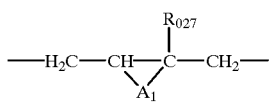
(y)

and recurring structural elements of the formula (z)

in which $A_1$, together with the —CH—$CR_{027}$ group, is bicyclic $C_5$–$C_8$cycloalkenylene, preferably cyclopent-1,2-en-3,5-ylene, and $R_{027}$ is H, Cl or $C_1$–$C_{12}$-, preferably $C_1$–$C_6$alkyl, and, if desired, recurring structural elements of the formula (s).

The polymer can contain the structural elements of the formula (y) in an amount of 5 to 100, preferably 5 to 80, particularly preferably 5 to 60, and especially preferably 10 to 50 mol %, and the structural elements of the formula (z) in an amount of 95 to 0, preferably 95 to 20, particularly preferably 95 to 40, and especially preferably 90 to 50 mol %, per mole of polymer. It can contain the structural elements of the formula (s) in an amount of 0 to 80, preferably 0 to 60, and particularly preferably 0 to 50 mol %, per mole of a copolymer.

These polymers are novel and the invention likewise relates to them.

Polymers which are built up only from carbon and hydrogen are particularly preferred.

The processes for the preparation of the abovementioned polymers are known or analogous to known processes. The starting monomers and polymers are likewise known and are in some cases commercially obtainable or can be prepared by analogous processes. Diels-Alder reactions are advantageously carried out in solvents and expediently under increased pressure. Metathesis copolymers and processes for their preparation are described, for example, in U.S. Pat. No. 5,215,798. These polymers or metathesis polymers of strained cycloolefins can also be prepared with the catalysts described below. Diels-Alder reactions can be carried out analogously to the process described in EP 287 762.

The choice of the polymers to be used according to the invention depends chiefly on the intended use and the desired properties. The wide selection by modifications of the polymers allows tailor-made polymers to be provided for the most diverse uses. A further modification possibility results from the concomitant use of strained cycloolefins which are capable of metathesis polymerization, which means that, overall, adaptations specific to desired uses can be carried out.

A very large number of strained cycloolefins which the composition according to the invention can comprise as comonomers are known.

The cyclic olefins can be monocyclic or polycyclic fused and/or bridged ring systems, for example with two to four rings, which are unsubstituted or substituted and can contain heteroatoms, for example O, S, N or Si, in one or more rings and/or fused aromatic or heteroaromatic rings, for example o-phenylene, o-naphthylene, o-pyridinylene or o-pyrimidinylene. The individual cyclic rings can contain 3 to 16, preferably 3 to 12, and particularly preferably 3 to 8 ring members. The cyclic olefins can contain further non-aromatic double bonds, preferably 2 to 4 such additional double bonds, depending on the ring size. Ring substituents are those which are inert, that is to say do not impair the chemical stability and the heat stability of the catalysts. The cycloolefins are strained rings or ring systems.

If the cyclic olefins contain more than one double bond, for example 2 to 4 double bonds, crosslinked polymers can also be formed, depending on the reaction conditions, the monomer chosen and the amount of catalyst.

Fused-on alicyclic rings contain preferably 3 to 8, particularly preferably 4 to 7, and especially preferably 5 or 6 ring C atoms.

In a preferred embodiment, the comonomeric strained cycloolefins correspond to the formula I

(I)

in which $Q_1$ is a radical having at least one carbon atom which, together with the —CH=$CQ_2$— group, forms an at least 3-membered alicyclic ring which may contain one or more heteroatoms chosen from the group consisting of silicon, phosporus, oxygen, nitrogen or sulfur; and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$hydroxyalkyl $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–C16aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$— may be fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, $C_7$–$C_{16}$aralkyl;

$R_5$ and $R_{10}$ independently of one another are hydrogen, $C_1$–$C_{12}$alkyl, phenyl or benzyl, where the alkyl groups in their turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclic ring formed with $Q_1$ may contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN, $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–C16aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1C_{12}$alkoxy, —$NO_2$, —CN or halogen and where the heteroatoms of the abovementioned heterocycloalkyl, heteroaryl and heteroaralkyl groups are chosen from the group consisting of —O—, —S—, —$NR_9$— and —N═; and $R_9$ is hydrogen, $C_1$–$C_{12}$alkyl, phenyl or benzyl.

Fused-on alicyclic rings preferably contain 3 to 8, particularly preferably 4 to 7, and especially preferably 5 or 6 ring C atoms.

If an asymmetric centre is present in the compounds of the formula I, this means that the compounds can occur in optically isomeric forms. Some compounds of the formula I can occur in tautomeric forms (for example keto-enol tautomerism). If an aliphatic C═C double bond is present, geometric isomerism (E form or Z form) can also occur. Exo-endo configurations are furthermore also possible. Formula I thus includes all the possible stereoisomers which are present in the form of enantiomers, tautomers, diastereomers, E/Z isomers or mixtures thereof.

In the definitions of the substituents, the alkyl, alkenyl and alkynyl groups can be straight-chain or branched. The same also applies to the alkyl or each alkyl part of alkoxy-, alkylthio-, alkoxycarbonyl- and of other alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, for example the isopropyl, n-propyl, n-butyl, iso-butyl, sec-butyl, tert-butyl, and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl, n-octadec4-enyl.

Cycloalkyl is preferably $C_5$–$C_8$ cycloalkyl, in particular $C_5$- or $C_6$cycloalkyl. Some example are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile [sic]), cyanoethyl (ethylnitrile [sic]), 1-cyanoisopropyl, 1-cyano-n-propyl, 2-cyano-n-butyl, 1-cyanoiso-butyl, 1-cyano-sec-butyl, 1-cyano-tert-butyl and various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalene, indene, naphthalene, azulene or anthracene.

Heteroaryl preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purin or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and caesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Compounds of the formula I which are particularly suitable for the composition according to the invention are those in which $Q_2$ is hydrogen.

Compounds of the formula I which are furthermore preferred for the polymerization are those in which the alicyclic ring which $Q_1$ forms together with the —CH═$CQ_2$— group contains 3 to 16, more preferably 3 to 12, and particularly preferably 3 to 8 ring atoms, it being possible for this to be a monocyclic, bicyclic tricyclic or tetracyclic ring system.

The composition according to the invention particularly advantageously comprises compounds of the formula I in which $Q_1$ is a radical having at least one carbon atom which, together with the —CH═$CQ_2$—group, forms a 3- to 20-membered alicyclic ring which may contain one or more heteroatoms chosen from the group consisting of silicon, oxygen, nitrogen and sulfur; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_4$—X—; or in which two adjacent C atoms in this radical Q$_1$ are substituted by —CO—O—CO— or —CO—NR$_5$—CO—; or in which an alicyclic, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_{13}$—X$_1$— may be fused onto adjacent carbon atoms;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are C$_1$–C$_6$alkyl, C$_1$–C$_6$perfluoroalkyl, phenyl or benzyl;

M is an alkali metal and M$_1$ is an alkaline earth metal;

R$_4$ and R$_{13}$ independently of one another are C$_1$–C$_{12}$alkyl, C$_1$–C$_{12}$haloalkyl, C$_1$–C$_{12}$hydroxyalkyl, C$_3$–C$_8$cycloalkyl, C$_6$–C$_{12}$aryl, C$_7$–C$_{12}$aralkyl;

R$_5$ and R$_{10}$ independently of one another are hydrogen, C$_1$–C$_6$alkyl, phenyl or benzyl, where the alkyl groups in their turn are unsubstituted or substituted by C$_1$–C$_6$alkoxy or C$_3$–C$_6$cycloalkyl;

R$_6$, R$_7$ and R$_8$ independently of one another are C$_1$–C$_6$alkyl, C$_1$–C$_6$perfluoroalkyl, phenyl or benzyl;

u is 0 or 1;

where the alicyclic ring formed with Q$_1$ may contain further non-aromatic double bonds;

Q$_2$ is hydrogen, C$_1$–C$_{12}$alkyl, C$_1$–C$_{12}$haloalkyl, C$_1$–C$_6$alkoxy, halogen, —CN, R$_{11}$—X$_2$—;

R$_{11}$ is C$_1$–C$_{12}$alkyl, C$_1$–C$_{12}$haloalkyl, C$_1$–C$_{12}$hydroxyalkyl, C$_3$–C$_6$cycloalkyl, C$_6$–C$_{12}$aryl or C$_7$–C$_{12}$aralkyl;

X$_2$ is —C(O)—O— or —C(O)—NR$_{12}$—; and

R$_{12}$ is hydrogen, C$_1$–C$_6$alkyl, phenyl or benzyl;

where the cycloalkyl, heterocycloalkyl, aryl, heteroaryl, aralkyl and heteroaralkyl groups are unsubstituted or substituted by C$_1$–C$_6$alkyl, C$_1$–C$_6$alkoxy, —NO$_2$, —CN or halogen, and where the heteroatoms of the heterocycloalkyl, heteroaryl and heteroaralkyl groups are chosen from the group consisting of —O—, —S—, —NR$_9$— and —N=; and R$_9$ is hydrogen, C$_1$–C$_6$alkyl, phenyl or benzyl.

Compounds of the formula I from this group which are preferred are those in which Q$_1$ is a radical having at least one carbon atom which, together with the —CH=CQ$_2$— group, forms a 3- to 10-membered alicyclic ring which may contain a heteroatom chosen from the group consisting of silicon, oxygen, nitrogen and sulfur and is unsubstituted or substituted by halogen, —CN, —NO$_2$, R$_1$R$_2$R$_3$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_4$—X—; or in which an alicyclic, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_{13}$—X$_1$— may be fused onto adjacent carbon atoms;

R$_1$, R$_2$ and R$_3$ independently of one another are C$_1$–C$_4$alkyl, C$_1$–C$_4$perfluoroalkyl, phenyl or benzyl;

M is an alkali metal and M$_1$ is an alkaline earth metal;

R$_4$ and R$_{13}$ independently of one another are C$_1$–C$_6$alkyl, C$_1$–C$_6$haloalkyl, C$_1$–C$_6$hydroxyalkyl or C$_3$–C$_6$cycloalkyl;

X and X$_1$ independently of one another are —O—, —S—, —CO—, —SO— or —SO$_2$—;

R$_6$, R$_7$ and R$_8$ independently of one another are C$_1$–C$_4$alkyl, C$_1$–C$_4$perfluoroalkyl, phenyl or benzyl;

and Q$_2$ is hydrogen.

The composition according to the invention is particularly suitable for the polymerization of norbornene and norbornene derivatives. Of these norbornene derivatives, preferred derivatives are those which either correspond to the formula II

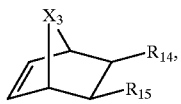

(II)

in which

X$_3$ is —CHR$_{16}$—, oxygen or sulfur;

R$_{14}$ and R$_{15}$ independently of one another are hydrogen, —CN, trifluoromethyl, (CH$_3$)$_3$Si—O—, (CH$_3$)$_3$Si— or —COOR$_{17}$; and R$_{16}$ and R$_{17}$ independently of one another are hydrogen, C$_1$–C$_{12}$alkyl, phenyl or benzyl;

or correspond to the formula III

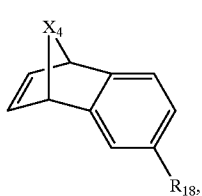

(III)

in which

X$_4$ is —CHR$_{19}$—, oxygen or sulfur;

R$_{19}$ is hydrogen, C$_1$–C$_{12}$alkyl, phenyl or benzyl; and

R$_{18}$ is hydrogen, C$_1$–C$_6$alkyl or halogen;

or correspond to the formula IV

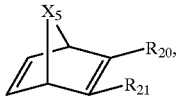
(IV)

in which
 $X_5$ is $CHR_{22}$—, oxgen or sulfur;
 $R_{22}$ is hydrogen, $C_1$–$C_{12}$alkyl, phenyl or benzyl;
 $R_{20}$ and $R_{21}$ independently of one another are hydrogen, CN, trifluoromethyl, $(CH_3)_3Si$—O—, $(CH_3)_3Si$— or —$COOR_{23}$; and
 $R_{23}$ is hydrogen, $C_1$–$C_{12}$alkyl, phenyl or benzyl;
or correspond to the formula V

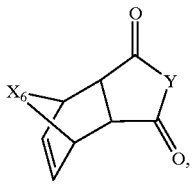
(V)

in which
 $X_6$ is —$CHR_{24}$—, oxygen or sulfur;
 $R_{24}$ is hydrogen, $C_1$–$C_{12}$alkyl, phenyl or benzyl;
 Y is oxygen or

\\
N—$R_{25}$;
/ and
 $R_{25}$ is hydrogen, methyl, ethyl or phenyl.

The following compounds of the formula I are particularly suitable, bi- and polycyclic systems being obtainable by Diels-Alder reactions:

(1)

(2)

(3)

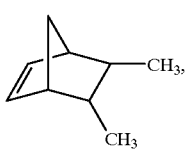

(4)

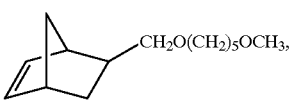
(5)

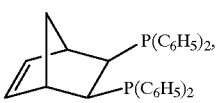
(6)

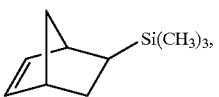
(7)

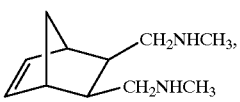
(8)

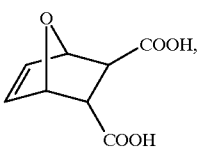
(9)

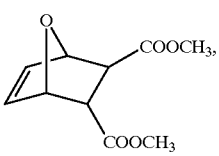
(10)

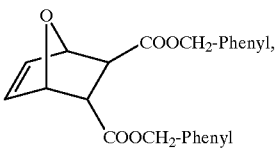
(11)

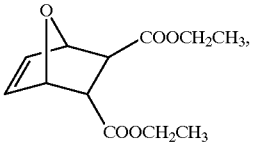
(12)

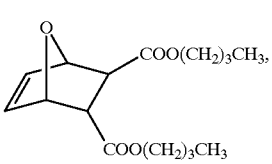
(13)

-continued
(14) 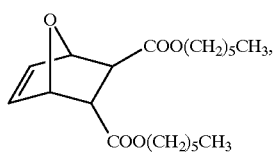
(15) 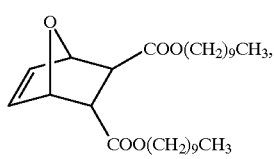
(16) 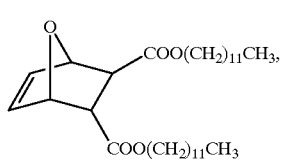
(17) 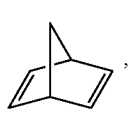
(18) 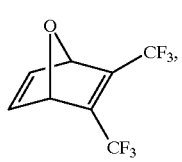
(19) 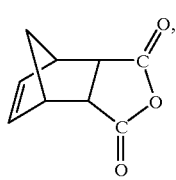
(20) 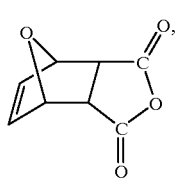
(21) 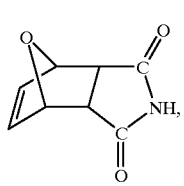
(22) 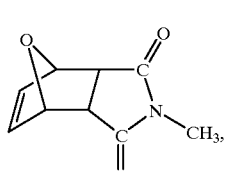
-continued
(23) 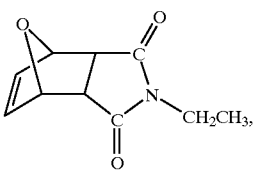
(24) 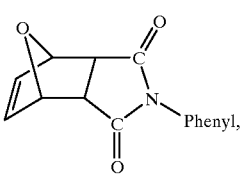
(25) 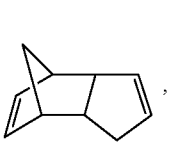
(26) 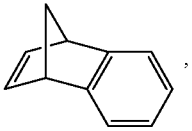
(27) 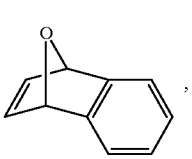
(28) 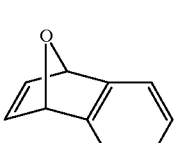
(29) 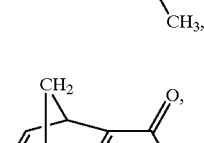
(30) 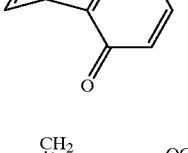
(31) 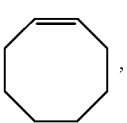

(32) 

(33) 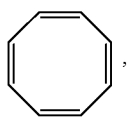

(34) 

(35) 

(36) 

(37) 

(38) 

(39) 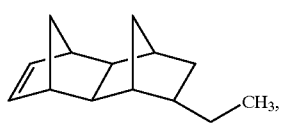

(40) 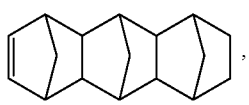

(41) 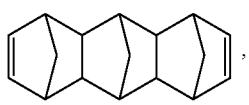

(42) 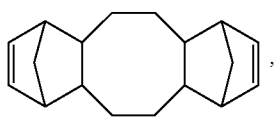

(43) 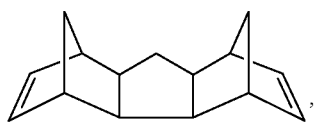

(44) 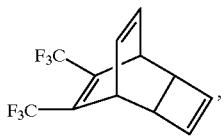

(45) 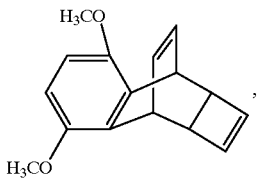

(46) 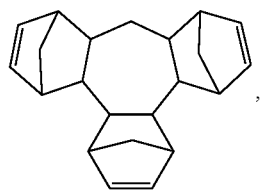

(47) 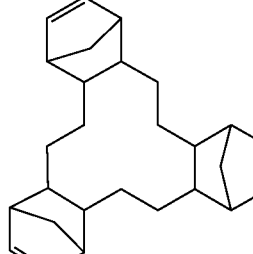 and

(48) 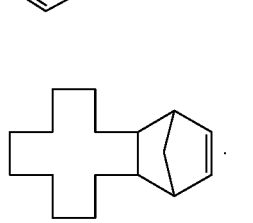.

The comonomeric polyfunctional strained cycloolefins can be compounds of the formula (f1)

$$(T)_n\text{—}U \quad (f1),$$

in which T is the radical of a strained cycloolefin, U is a direct bond or an n-valent bridge group and n is an integer from 2 to 8.

The cyclic olefins can be monocyclic or polycyclic fused and/or bridged ring systems, for example with two to four rings, which are unsubstituted or substituted and can contain heteroatoms, for example O, S, N or Si, in one or more rings and/or fused alicyclic, aromatic or heteroaromatic rings, for example o-cyclopentylene, o-phenylene, o-naphthylene, o-pyridinylene or o-pyimidinylene. The individual cyclic rings can contain 3 to 16, preferably 3 to 12, and particularly preferably 3 to 8 ring members. The cyclic olefins can contain further non-aromatic double bonds, preferably 2 to 4 such additional double bonds, depending on the ring size.

The ring substituents are those which are inert, that is to say which do not impair the chemical stability of the one-component catalysts.

Fused-on alicyclic rings preferably contain 3 to 8, particularly preferably 4 to 7, and especially preferably 5 or 6 ring C atoms.

In a preferred embodiment, the radicals T in formula (f1) correspond to cycloolefin radicals of the formula (f2)

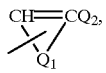
(f2)

in which $Q_1$ and $Q_2$ have the abovementioned meanings, including the preferred meanings.

The position of the double bond in the ring of the formula (f2) with respect to the free bond essentially depends on the ring size and the preparation method for the compounds of the formula I.

The cycloalkenyl radical of the formula (f2) is particularly preferably unsubstituted or substituted by cyclopropenyl, cyclobutenyl, cyclopentenyl, cycloheptenyl, cyclooctenyl, cyclopentadienyl, cyclohexadienyl, cycloheptadienyl, cyclooctadienyl and norbornenyl or norbornenyl derivatives, for example 7-oxa-2,2,2-cycloheptene and the corresponding benzo derivatives. Substituents are preferably $C_1$–$C_4$alkyl and $C_1$–$C_4$alkoxy.

Particularly suitable radicals of the formula (f2) are norbornenyl and norbornenyl derivatives. Of these norbornenyl derivatives, particularly preferred derivatives are those which either correspond to the formula (f3)

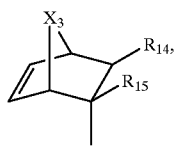
(f3)

in which $X_3$ is —$CHR_{16}$—, oxygen or sulfur;

$R_{14}$ and $R_{15}$ independently of one another are hydrogen, —CN, trifluormethyl, $(CH_3)_3Si$—O—, $(CH_3)_3Si$— or —$COOR_{17}$; and $R_{16}$ and $R_{17}$ independently of one another are hydrogen, $C_1$–$C_{12}$alkyl, phenyl or benzyl;

or correspond to the formula (f4)

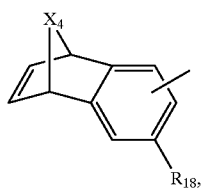
(f4)

in which $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen.

The cycloalkenyl radical T in the formula (f1) is particularly preferably norbornenyl of the formula ($nr_4$)

($nr_4$)

In formula (f1), n is preferably an integer from 2 to 6, particularly preferably 2 to 4, and especially preferably 2 or 3.

In formula (t), U is preferably an n-valent bridge group.

Possible divalent bridge groups are, for example, those of the formula (f5)

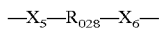
(f5), in which $X_5$ and $X_6$ independently of one another are a direct bond, —O—, —$CH_2$—O—, —C(O)O—, —O(O)C—, —$CH_2$—O(O)C—, —C(O)—$NR_{029}$—, —$R_{029}$N—(O)C—, —NH—C(O)—$NRC_{029}$—, —O—C(O)—NH—, —$CH_2$—O—C(O)—NH— or —NH—C(O)—O—, and $R_{028}$ is $C_2$–$C_{18}$alkylene, $C_5$–$C_8$cycloalkylene which is unsubstituted or substituted by $C_1$–$C_4$alkyl or $C_1$–$C_4$alkoxy, $C_6$–$C_{18}$arylene or $C_7$–$C_{19}$aralkylene which are unsubstituted or substituted by $C_1$–$C_4$alkyl or $C_1$–$C_4$alkoxy, or polyoxaalkylene having 2 to 12 oxaalkylene units and 2 to 6 C atoms in the alkylene, and $R_{029}$ is H or $C_1$–$C_6$alkyl.

Alkylene $R_{028}$ preferably contains 2 to 12, and particularly preferably 2 to 8 C atoms. The alkylene can be linear or branched. Preferred cycloalkylene is cyclopentylene, and in particular cyclohexylene. Some examples of arylene are phenylene, naphthylene, biphenylene, biphenylene ether and anthracenylene. An example of aralkylene is benzylene. The polyoxaalkylene preferably contains 2 to 6, and particularly preferably 2 to 4 units, and preferably 2 or 3 C atoms in the alkylene.

In a preferred embodiment, in formula (f5), a) $X_5$ and $X_6$ are a direct bond and $R_{028}$ is $C_2$–$C_{18}$alkylene, more preferably $C_2$–$C_{12}$alkylene, or b) $X_5$ and $X_6$ are —O—, —$CH_2$—O—, —C(O)O—, —O(O)C—, —$CH_2$—O(O)C—, —$CH_2$—O—C(O)—NH—, —C(O)—$NR_{029}$— or —O—C(O)—NH— and $R_{028}$ is $C_2$–$C_{12}$alkylene, or phenylene, naphthylene or benzylene which are unsubstituted or substituted by $C_1$–$C_4$alkyl or $C_1$–$C_4$alkoxy, or —$R_{030}$—(O—$R_{030}$—)$_x$—$OR_{030}$—, in which x is a number from 2 to 4, and $R_{030}$ is —$C_2$–$C_4$alkylene.

Some examples of compounds of the formula (f5) with a divalent bridge group are

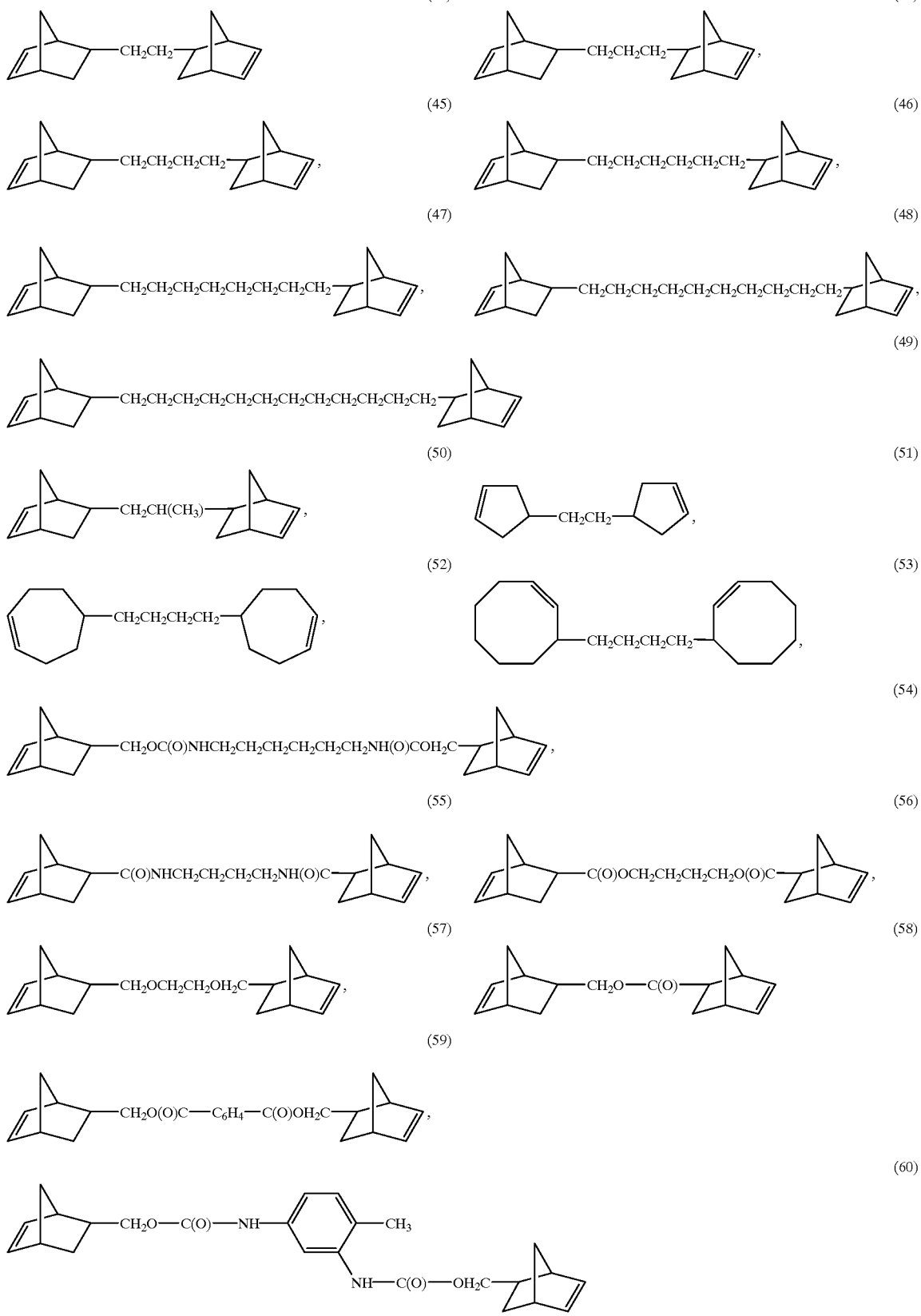

(61)

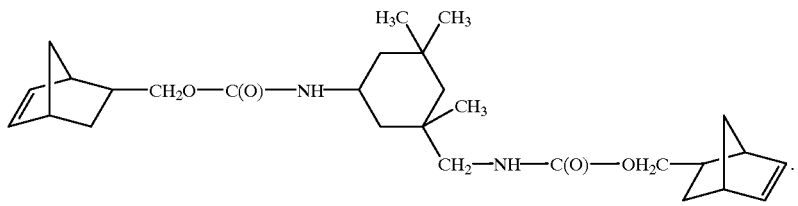

The compounds of the formula (f1) with a bridge group of the formula (f5) which is a pure hydrocarbon bridge are obtainable, for example, by means of a Diels-Alder reaction of a cyclic diene with a linear or branched aliphatic diene (see also EP 287 762), substance mixtures which are either further processed directly or separated beforehand by means of customary methods often being formed. Compounds of the formula (f1) with a bridge group of the formula (f5) in which $X_5$ and $X_6$ are not a direct bond are obtainable from the corresponding halides or dihalides, alcohols or diols, amines or diamines, carboxylic acids or dicarboxylic acids, or isocyanates or diisocyanates, via etherification, esterification or amidation reactions in a manner known per se.

Possible trivalent bridge groups are, for example, those of the formula (f6)

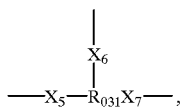

(f6)

in which
$X_5$, $X_6$ and $X_7$ are —O—, —CH$_2$—O—, —C(O)O—, —O(O)C—, —CH$_2$—O(O)C—, —C(O)—NR$_{029}$—, —R$_{029}$N—(O)C—, —NH—C(O)—NR$_{029}$—, —O—C(O)—NH—, —CH$_2$—O—C(O)—NH— or —NH—C(O)—O—, and $R_{031}$ is a trivalent aliphatic hydrocarbon radical having 3 to 20, preferably 3 to 12 C atoms, a trivalent cycloaliphatic radical which has 3 to 8, preferably 5 or 6 ring C atoms and is unsubstituted or substituted by $C_1$–$C_4$alkyl or $C_1$–$C_4$alkoxy, or a trivalent aromatic radical having 6 to 18, preferably 6 to 12 C atoms, which is unsubstituted or substituted by $C_1$–$C_4$alkyl or $C_1$–$C_4$alkoxy, a trivalent araliphatic radical having 7 to 19, preferably 7 to 12 C atoms, which is unsubstituted or substituted by $C_1$–$C_4$alkyl or $C_1$–$C_4$alkoxy, or a trivalent heteroaromatic radical having 3 to 13 C atoms and 1 to 3 heteroatoms from the group consisting of —O—, —N— and —S—, which is unsubstituted or substituted by $C_1$–$C_4$alkyl or $C_1$–$C_4$alkoxy, and $R_{031}$ is H or $C_1$–$C_6$alkyl.

In a preferred embodiment, $X_5$, $X_6$ and $X_7$ are —O—, —CH$_2$—O—, —C(O)O—, —O(O)C—, —CH$_2$—O(O)C—, —C(O)—NR$_{029}$—, —O—C(O)—NH— or —CH$_2$—O—C(O)—NH—.

Preferred radicals $R_{031}$ are derived, for example, from triols, such as glycerol, trimethylolpropane, butanetriol, pentanetriol, hexanetriol, trihydroxycyclohexane, trihydroxybenzene and cyanuric acid; triamines, such as diethylenetriamine; tricarboxylic acids, such as cyclohexanetricarboxylic acid or trimellitic acid; and triisocyanates, such as benzene triisocyanate or cyanuric triisocyanate.

Some examples of compounds of the formula (f1) with a trivalent bridge group are (62)

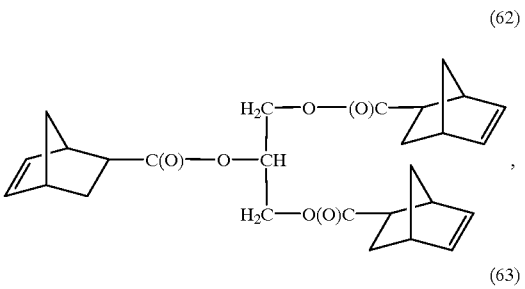

(63)

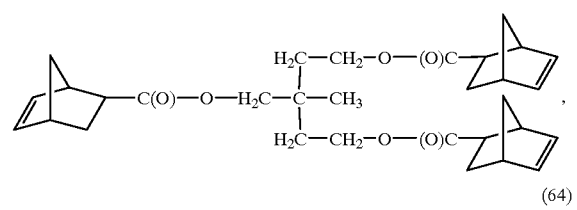

(64)

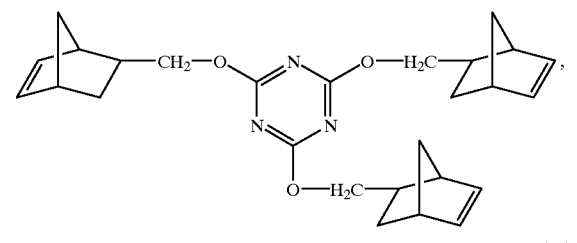

(65)

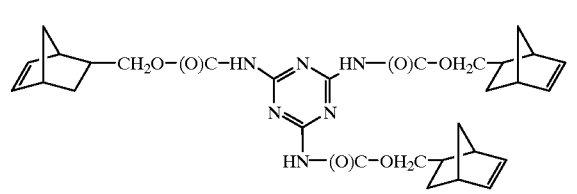

and (66)

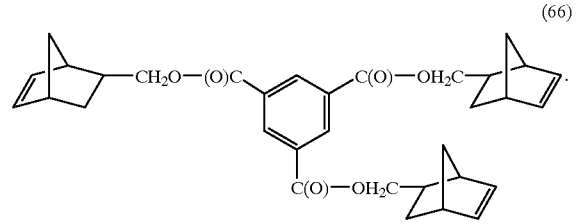

Possible tetravalent bridge groups are, for example, those of the formula (f7)

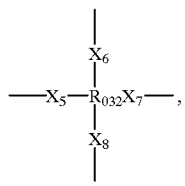
(f7)

in which

X$_5$, X$_6$, X$_7$ and X$_8$ are —C(O)O—, —CH$_2$—O(O)C— or —C(O)—NR$_{029}$—, and R$_{032}$ is a tetravalent aliphatic hydrocarbon radical having 4 to 20, preferably 4 to 12 C atoms, a tetravalent cycloaliphatic radical having 4 to 8, preferably 5 or 6 ring C atoms, which is unsubstituted or substituted by C$_1$–C$_4$alkyl or C$_1$–C$_4$alkoxy, or a tetravalent aromatic radical having 6 to 18, preferably 6 to 12 C atoms, which is unsubstituted or substituted by C$_1$–C$_4$alkyl or C$_1$–C$_4$alkoxy, a tetravalent araliphatic radical having 7 to 19, preferably 7 to 12 C atoms, which is unsubstituted or substituted by C$_1$–C$_4$alkyl or C$_1$–C$_4$alkoxy, or a tetravalent heteroaromatic radical having 3 to 13 C atoms and 1 to three heteroatoms from the group consisting of —O—, —N— and —S—, which is unsubstituted or substituted by C$_1$–C$_4$alkyl or C$_1$–C$_4$alkoxy, and R$_{029}$ is H or C$_1$–C$_6$alkyl.

Some examples of tetrafunctional compounds from which R$_{032}$ can be derived are pentaerythritol, pyromellitic acid and 3,4,3',4'-biphenyltetracarboxylic acid.

Preparation methods which can be used are the same methods as for the preparation of the abovementioned compounds with a di- or trivalent radical. Some examples of compounds of the formula (f1) with a tetravalent bridge group are

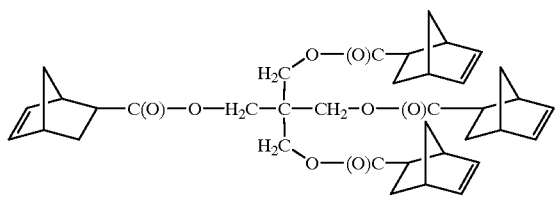
(67)

and

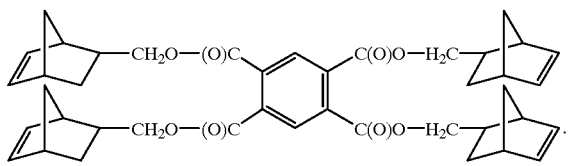
(68)

Polyols, such as dipentaerythritol or hexahydrohexane, which can be reacted with corresponding cycloolefinmonocarboxylic acids, may be mentioned as an example of compounds which are more than tetravalent and from which the bridge group can be derived.

Polymers and comonomers which contain only carbon and hydrogen are particularly preferred according to the invention. Norbornene is especially preferably contained as a comonomer in amounts of, for example, 20 to 60% by weight.

The comonomeric cycloolefins can be contained in an amount of 0.01 to 99% by weight, preferably 0.1 to 95% by weight, particularly preferably 1 to 90% by weight, and especially preferably 5 to 80% by weight, based on the polymers and monomers present in the composition.

The composition according to the invention can comprise solvents, especially if it is used for the production of coatings.

Suitable inert solvents are, for example, protic-polar and aprotic solvents, which can be used alone or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichlorethane, 1,1,1-trichlorethane and 1,1, 2,2-tetrachlorethane), carboxylic acid esters and lactones (ethyl acetate, methyl propionate, ethyl benzoate, 2-methoxyethyl acetate, γ-butyrolactone, δ-valerolactone and pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone and N-methylcaprolactam), sulfoxides (dimethyl sulfoxide), sulfones (dimethyl sulfone, diethyl sulfone, trimethylene sulfone and tetramethylene sulfone), tertiary amines (N-methylpiperidine and N-methylmorpholine), aliphatic and aromatic hydrocarbons, for example petroleum ether, pentane, hexane, cyclohexane, methylcyclohexane, benzene or substituted benzenes (chlorobenzene, o-dichlorobenzene, 1,2,4-trichlorobenzene, nitrobenzene, toluene and xylene) and nitriles (acetonitrile, propionitrile, benzonitrile and phenylacetonitrile). Preferred solvents are aprotic polar and non-polar solvents.

The choice of solvents depends chiefly on the properties of the one-component catalysts, which must not be deactivated by the solvents used. Ruthenium and osmium catalysts can be used together with polar protic solvents, for example water or alkanols. These catalysts are also insensitive to air, oxygen and moisture, and corresponding crosslinkable compositions can be processed without particular protective measures. In the case of the other one-component catalysts, the exclusion of oxygen and moisture is advisable. The compositions are stable to storage, storage in the dark being advisable because of the sensitivity to light.

The composition according to the invention can comprise formulation auxiliaries and additions to improve the physical or mechanical properties. The compounds mentioned above as solvents are suitable as such substances. Known auxiliaries are stabilizers, for example antioxidants and light stabilizers, plasticizers, dyes, pigments, tixotropic [sic] agents, viscosity improvers, antistatics, lubricants and mould release auxiliaries.

The compositions according to the invention can be polymerized even if they also comprise fillers or reinforcing fillers in relatively large amounts. They can comprise these fillers in amounts of 0.1 to 90% by weight, preferably 0.5 to 80% by weight, more preferably 1 to 70% by weight, particularly preferably 5 to 60% by weight, and especially preferably 10 to 50% by weight, based on the monomers present.

Suitable reinforcing fillers are, in particular, those having a length to width ratio of at least 2. These are often fibrous or needle-shaped fillers. Some examples are fibres of plastics, carbon fibres, glass fibres, silicatic fibres, such as asbestos, whisker and wood fibres.

Suitable fillers are, for example, metal powders, wood flour, glass powders, glass beads, semimetal and metal oxides, for example $SiO_2$ (aerosils and quartz), corundum and titanium oxide, semimetal and metal nitrides, for example silicon nitride, boron nitride and aluminium nitride, semimetal and metal carbides [sic], metal carbonates (dolomite and $CaCO_3$), metal sulfates (barite and gypsum), rock powders and naturally occurring or synthetic minerals, chiefly from the silicate series, for example talc, wollastonite, bentonite and others.

Catalytic amounts for the one-component catalyst in the context of the present invention preferably means an amount of 0.001 to 20 mol %, more preferably 0.01 to 15 mol %, particularly preferably 0.01 to 10 mol %, and especially preferably 0.01 to 5 mol %, based on the amount of the monomer. Because of the high photocatalytic activity in ruthenium and osmium catalysts containing phosphene groups, amounts of 0.001 to 2% by weight are especially preferred in this case.

The compositions according to the invention advantageously comprise the novel thermal and/or photochemical one-component catalysts below:

1. Heat-stable ruthenium or osmium compounds which can be activated by radiation and have at least one photolabile ligand bonded to the ruthenium or osmium atom, the remaining coordination sites being satisfied by non-photolabile ligands.

Heat stability in the context of the invention means that the photocatalytically active metal compounds form no active species for the ring-opening metathesis polymerization when heated. For example, at room temperature to slightly elevated temperature, such as about +40° C., the catalyst can initiate no ring-opening metathesis polymerization with exclusion of light in the course of weeks. Only an insignificant amount (less than 0.2% by weight) of monomer is reacted during this period. The heat stability can be determined, for example, by storing a toluene solution with 20% by weight of monomer and 0.33% by weight of metal catalyst in the dark at 50° C. for 96 hours, and any amount of polymer formed, which can be detected by the build-up in viscosity and can be determined quantitatively by precipitation in a precipitant, for example ethanol, filtration and drying, is not more than 0.5% by weight, and preferably not more than 0.2% by weight.

Organic or inorganic compounds, atoms or ions which are coordinated onto a metal centre are designated as ligands for the ruthenium and osmium compounds to be used according to the invention.

Photolabile ligand in the context of the present invention means that when the catalyst is irradiated by light in the visible or ultraviolet spectral range, the ligand dissociates from the catalyst and forms a catalytically active species for the metathesis polymerization. Nonionic photolabile ligands are preferred according to the invention.

The photolabile ligands can be, for example, nitrogen ($N_2$), monocyclic, polycyclic or fused arenes having 6 to 24, preferably 6 to 18, and particularly preferably 6 to 12 C atoms, which are unsubstituted or substituted by OH, $C_1$–$C_4$alkyl, $C_1$–$C_4$alkoxy, $C_6$–$C_{12}$aryl or halogen, or monocyclic heteroarenes, fused heteroarenes or fused areneheteroarenes having 3 to 22, preferably 4 to 16, and in particular 4 to 10 C atoms and 1 to 3 heteroatoms chosen from the group consisting of O, S and N, which are unsubstituted or substituted by $C_1$–$C_4$alkyl, $C_1$–$C_4$alkoxy or halogen; or aliphatic, cycloaliphatic, aromatic or araliphatic nitriles having 1 to 22, preferably 1 to 18, particularly preferably 1 to 12, and especially preferably 1 to 7 C atoms, which are unsubstituted or substituted by $C_1$–$C_4$alkyl, $C_1$–$C_4$alkoxy or halogen. The preferred substituents are methyl, ethyl, methoxy, ethoxy, fluorine, chlorine and bromine. The arenes and heteroarenes are preferably substituted by one or two radicals, and particularly preferably are unsubstituted. Among the heteroarenes, the electron-rich heteroarenes are preferred. The arenes and heteroarenes can be both π- and σ-bonded; in the last case, they are then the corresponding aryl and heteroaryl radicals. The aryl preferably contains 6 to 18, particularly preferably 6 to 12 C atoms. The heteroaryl preferably contains 4 to 16 C atoms.

Some examples of arenes and heteroarenes are benzene, p-cumene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. Preferred arenes and heteroarenes are benzene, naphthalene, thiophene and benzothiophene. The arene is especially preferably benzene and the heteroarene is especially preferably thiophene.

The nitriles can be substituted, for example by methoxy, ethoxy, fluorine or chlorine; the nitriles are preferably unsubstituted. The alkylnitriles are preferably linear. Some examples of nitriles are acetonitrile, propionitrile, butyronitrile, pentylnitrile, hexylnitrile, cyclopentyl- and cyclohexylnitrile, benzonitrile, methylbenzonitrile, benzylnitrile and naphthylnitrile. The nitriles are preferably linear $C_1$–$C_4$alkylnitriles or benzonitrile. Of the alkylnitriles, acetonitrile is particularly preferred.

In a preferred sub-group, the photolabile ligands are $N_2$, benzene which is unsubstituted or substituted by one to three $C_1$–$C_4$ alkyl, thiophene, benzonitrile or acetonitrile.

Non-photolabile ligand (also called highly coordinating ligand) in the context of the present invention means that when the catalyst is irradiated in the visible or near-ultraviolet spectral range, the ligand does not dissociate or dissociates to only an insignificant extent from the catalyst.

The non-photolabile ligands can be solvating inorganic and organic compounds which contain the heteroatoms O, S or N and are often also used as solvents, or cyclopentadienyl or indenyl which are unsubstituted or substituted by $C_1$–$C_4$alkyl, $C_1$–$C_4$alkoxy, $(C_1$–$C_4$alkyl$)_3$Si or $(C_1$–$C_4$alkyl)$_3$SiO—. Examples of such compounds are $H_2O$, $H_2S$ and $NH_3$; halogenated or unhalogenated, in particular fluorinated or chlorinated, aliphatic or cycloaliphatic alcohols or mercaptans having 1 to 18, preferably 1 to 12, and particularly preferably 1 to 6 C atoms, aromatic alcohols or thiols having 6 to 18, preferably 6 to 12 C atoms, and araliphatic alcohols or thiols having 7 to 18, preferably 7 to 12 C atoms; aliphatic, cycloaliphatic, araliphatic or aromatic ethers, thioethers, sulfoxides, sulfones, ketones, aldehydes, carboxylic acid esters, lactones, optionally N—$C_1$–$C_4$mono- or -dialkylated carboxylic acid amides having 2 to 20, preferably 2 to 12, and in particular 2 to 6 C atoms and optionally N—$C_1$–$C_4$alkylated lactams; aliphatic, cycloaliphatic, araliphatic or aromatic, primary, secondary and tertiary amines having 1 to 20, preferably 1 to 12, and particularly preferably 1 to 6 C atoms; and unsubstituted or substituted cyclopentadienyls, for example cyclopentadienyl, indenyl and mono- or polymethylated or trimethylsilylated cyclopentadienyls or indenyls.

Examples of such non-photolabile ligands are methanol, ethanol, n- and i-propanol, n-, i- and t-butanol, 1,1,1-trifuoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methyophenol, fluorophenol, phenylmercaptan, benzydmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can be those of the formula $R_{25}NH_2$, the secondary amines those of the formula $R_{25}R_{26}NH$ and the tertiary amines those of the formula $R_{25}R_{26}R_{27}N$, in which $R_{25}$ is $C_1$–$C_{18}$alkyl, $C_5$- or $C_6$cycloalkyl which is unsubstituted or substituted by $C_1$–$C_4$alkyl or $C_1$–$C_4$alkoxy, or $C_6$–$C_{18}$aryl or $C_7$–$C_{12}$aralkyl which are unsubstituted or substituted by $C_1$–$C_4$alkyl or $C_1$–$C_4$alkoxy, $R_{26}$ independently has the meaning of $R_{25}$, or $R_{25}$ and $R_{26}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$alkyl)—$CH_2$—$CH_2$—, $R_{25}$ and $R_{26}$ independently of one another have the abovementioned meanings, and $R_{27}$ independently has the meaning of $R_{25}$. The alkyl preferably contains 1 to 12, and particularly preferably 1 to 6 C atoms. The aryl preferably contains 6 to 12 C atoms and the aralkyl preferably contains 7 to 9 C atoms. Examples of amines are methyl-, dimethyl-, trimethyl-, ethyl-, diethyl-, triethyl-, methylethyl-, dimethylethyl, n-propyl-, di-n-propyl-, tri-n-butyl-, cyclo-hexyl-, phenyl- and benzylamine, and pyrrolidone, N-methylpyrrolidine, piperidine, piperazine, morpholine and N-methylmorpholine.

In a preferred sub-group, the non-photolabile ligands are $H_2O$, $NH_3$ and unsubstituted or partly or completely fluorinated $C_1$–$C_4$alkanols. $H_2O$, $NH_3$, cyclopentadienyl, methanol and ethanol are especially preferred.

The ruthenium and osmium compounds to be used according to the invention can be mono- or polynuclear, for example those having two or three metal centres. The metal atoms can be bonded here via a bridge group or metal-metal bonds.

Among the compounds with a plurallity of metal centres, those of the formula VIIIa or VIIIb

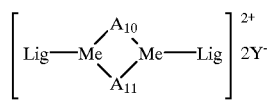

(VIIIa)

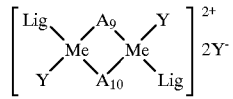

(VIIIb)

in which Lig is a photolabile ligand and Me is Ru or Os, $A_9$, $A_{10}$ and $A_{11}$ are a divalent bridge group, and Y is a monovalent non-coordinating anion, are preferred. The bridge group is preferably ionic, and particularly preferably a halide, especially preferably chloride, bromide or iodide. The photolabile ligand is preferably identical or different arenes, and Y can be the anions listed below, and especially chloride, bromide or iodide. An example of such complexes is $[C_6H_6Ru(Cl)_3RuC_6H_6]Cl$. Preferred catalysts according to the invention correspond to the formula IX

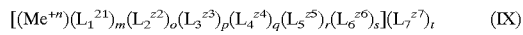

(IX)

in which

Me is ruthenium or osmium;

n is 0, 1, 2, 3, 4, 5, 6, 7 or 8;

$L_1$ is a photolabile ligand;

$L_2$, $L_3$, $L_4$, $L_5$ and $L_6$ independently of one another are a non-photolabile or a photolabile ligand;

m is 1, 2, 3, 4, 5 or 6;

o, p, q, r and s independently of one another are 0, 1, 2, 3, 4 or 5;

$z_1$, $z_2$, $z_3$, $z_4$, $z_5$, $z_6$ and $z_7$ independently of one another are −4, −3, −2, −1, 0, +1 or +2; and $L_7$ is a non-coordinating cation or anion;

where the sum of $m+o+p+q+r+s$ is an integer from 2 to 6 and t is the quotient of $(n+m \cdot z_1+o \cdot z_2+p \cdot z_3+q \cdot z_4+r \cdot z_5+s \cdot z_6)/z_7$.

In the formula IX, $L_7$ is preferably halogen (for example Cl, Br and I), the anion of an oxygen acid $BF_4$, $PF_6$, $SiF_6$ or $AsF_6$.

The anions of oxygen acids can be, for example, sulfate, phosphate, perchlorate, perbromate, periodate, antimonate, arsenate, nitrate, carbonate, the anion of a $C_1$–$C_8$carboxylic acid, for example formate, acetate, propionate, butyrate, benzoate, phenylacetate or mono-, di- or trichloro- or -fluoroacetate, sulfonates, for example methylsulfonate, ethylsulfonate, propylsulfonate, butylsulfonate, trifluoromethylsulfonate (triflate) or phenylsulfonate or benzylsulfonate which are unsubstituted or substituted by $C_1$–$C_4$alkyl, $C_1$–$C_4$alkoxy or halogen, in particular fluorine, chlorine or bromine, for example tosylate, mesylate, brosylate, p-methoxy- or p-ethoxyphenylsulfonate, pentafluorophenylsulfonate or 2,4,6-triisopropylsulfonate, and phosphonates, for example methylphosphonate, ethylphosphonate, propylphosphonate, butylphosphonate, phenylphosphonate, p-methylphenylphosphanate and benzylphosphonate.

Preferably, in the formula IX, Me is ruthenium, in particular $Ru^{2+}$.

A group of compounds of the formula IX which is to be singled out in particular is that in which the ligands $L_1$, $L_2$, $L_3$, $L_4$, $L_5$ and $L_6$ independently of one another are aliphatic, cycloaliphatic, aromatic or araliphatic nitriles having 1 to 22 C atoms, which are unsubstituted or substituted by $C_1$–$C_4$alkyl, $C_1$–$C_4$alkoxy or halogen, or $C_6$–$C_{18}$aryl; or $L_1$, $L_2$ and $L_3$ together are monocyclic, polycyclic or fused arenes having 6 to 24, preferably 6 to 18, and particularly preferably 6 to 12 C atoms, which are unsubstituted or substitututed by —OH, $C_1$–$C_4$alkyl, $C_1$–$C_4$alkoxy, $C_6$–$C_{12}$aryl or halogen, or monocyclic heteroarenes, fused heteroarenes or fused arene-heteroarenes having 4 to 22 C atoms and 1 to 3 heteroatoms chosen from the group consisting of O, S, and N, which are unsubstituted or substituted by —OH, $C_1$–$C_4$alkyl, $C_1$–$C_4$alkoxy or halogen, and $L_4$, $L_5$ and $L_6$ together have the same meaning, or individually, independently of one another, are $N_2$ or the said nitrile or the said $C_6$–$C_{18}$aryl.

A preferred sub-group of the above compounds of the formula IX are those in which the ligands $L_1$, $L_2$, $L_3$, $L_4$, $L_5$ and $L_6$ independently of one another are $N_2$, $C_1$–$C_{20}$alkylnitrile, $C_6$–$C_{12}$arylnitrile, $C_7$–$C_{12}$aralkylnitrile, $C_6$–$C_{12}$aryl or $L_1$, $L_2$ and $L_3$ each together are the groups $A_1$ or $A_2$

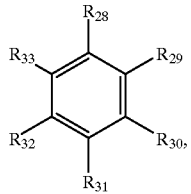

(A₁)

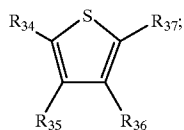

(A₂)

in which $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen, $C_1$–$C_{20}$alkyl, $C_1$–$C_{20}$alkoxy, aryl or $SiR_{38}R_{39}R_{40}$ where, in the case of groups $A_1$ and $A_2$ on adjacent carbon atoms, an aromatic or heteroaromatic ring, the heteroatoms of which are chosen from oxygen, sulfur and nitrogen, can be fused on; and $R_{38}$, $R_{39}$ and $R_{40}$ independently of one another are $C_1$–$C_{12}$alkyl, $C_5$- or $C_6$cycloalkyl, or phenyl or benzyl which are unsubstituted or substituted by $C_1$–$C_6$alkyl or $C_1$–$C_6$alkoxy, preferably $C_1$–$C_8$alkyl, phenyl or benzyl, particularly preferably $C_1$–$C_4$alkyl, phenyl or benzyl, and $L_4$, $L_5$ and $L_6$ likewise together have this meaning or are each individually $N_2$, the said nitriles or the said $C_6$–$C_{12}$aryl, or are an arene or heteroarene.

From this group of compounds of the formula IX which is to be singled out, preferred compounds are those in which $L_1$, $L_2$, $L_3$, $L_4$, $L_5$ and $L_6$ independently of one another are $C_1$–$C_{12}$alkylnitrile, $C_6$–$C_{12}$arylnitrile, or $L_1$, $L_2$ and $L_3$ each together are the groups $A_1$ or $A_2$ and $L_4$, $L_5$ and $L_6$ likewise together have this meaning or each individually are $N_2$, the said nitriles or the said arene or heteroarene of the formulae $A_1$ and $A_2$, in which $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen, $C_1$–$C_6$alkyl, $C_1$–$C_6$alkoxy, $SiR_{38}R_{39}R_{40}$ or phenyl, where, in the case of the groups $A_1$ and $A_2$ on adjacent carbon atoms, a benzene ring can be fused on, and $R_{38}$, $R_{39}$ and $R_{40}$ are methyl, ethyl or phenyl.

In an especially preferred embodiment of the process according to the invention, the catalyst used is that of the formula IX, in which $L_1$, $L_2$, $L_3$, $L_4$, $L_5$ and $L_6$ independently of one another are methylnitrile, ethylnitrile or phenylnitrile, or $L_1$, $L_2$ and $L_3$ each together are the groups $A_1$ or $A_2$ and $L_4$, $L_5$, and $L_6$ likewise together have this meaning or each individually are the said nitriles, in which $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen, methyl, methoxy or phenyl, where, in the case of the groups $A_1$ and $A_2$ on adjacent carbon atoms, a benzene ring can be fused on.

Another particularly preferred sub-group of the compounds of the formula IX are those in which $L_1$, $L_2$ and $L_3$ together are monocyclic, polycyclic or fused arenes having 6 to 24, preferably 6 to 18, and particularly preferably 6 to 12 C atoms, which are unsubstituted or substituted by $C_1$–$C_4$alkyl, $C_1$–$C_4$alkoxy, $C_6$–$C_{12}$aryl or halogen, or monocyclic heteroarenes, fused heteroarenes or fused arene- heteroarenes having 4 to 22, preferably 4 to 16, and in particular 4 to 10 C atoms and 1 to 3 heteroatoms chosen from the group consisting of O, S and N, which are unsubstituted or substituted by $C_1$–$C_4$alkyl, $C_1$–$C_4$alkoxy or halogen, and $L_4$, $L_5$ and $L_6$ are a non-photolabile ligand, the previous preferred meanings also applying here.

In this sub-group, $L_1$, $L_2$ and $L_3$ are preferably benzene or naphthalene, and the non-photolabile ligand is preferably $H_2O$, $NH_3$, $C_1$–$C_4$alkanol or -alkanethiol which are unsubstituted or substituted by fluorine, aliphatic ethers, thioethers, sulfoxides and sulfones having 2 to 8 C atoms, dimethylformamide or N-methylpyrrolidone.

In another preferred sub-group of compounds of the formula X, the compounds are ruthenium and osmium compounds of the formula X $$[L_1Me(L_8)_5]^{2+}[Y_1^{x-}]_{2/x} \qquad (X),$$

in which $L_1$ is a photolabile ligand and $L_8$ is a non-photolabile ligand, Me is Ru or Os, $Y_1$ is a non-coordinating anion and x is the numbers 1, 2 or 3. For the photolabile ligands, non-photolabile ligands, Me and $Y_1$, the abovementioned preferred meanings apply. Particularly preferably, $L_1$ is $N_2$ or a nitrile, for example $C_1$–$C_4$alkylnitrile (acetonitrile), benzonitrile or benzylnitrile, $L_8$ is $NH_3$ or an amine having 1 to 12 C atoms, $Y_1$ is a non-coordinating anion and x is the number 1 or 2.

Catalysts which are particularly suitable for the present invention are (tos is tosylate and tis is 2,4,6-triisopropylphenylsulfonate): $Ru(CH_3CN)_6(tos)_2$, $Ru(CH_3CH_2CN)_6(tos)_2$, $Ru(CH_3CN)_6(CF_3SO_3)_2$, $Ru(CH_3CH_2CN)_6(CF_3SO_3)_2$, $Ru(C_6H_6)_2(tos)_2$, $[Ru(C_6H_6)(C_6H_5OCH_3)](BF_4)_2$, $[Ru(C_6H_6)(C_6H_5\text{i-propyl})](BF_4)_2$, $[Ru(C_6H_6)(1,3,5\text{-trimethylphenol})](BF_4)_2$, $[Ru(C_6H_6)(\text{hexamethylbenzene})](BF_4)_2$, $[Ru(C_6H_6)(\text{biphenyl})](BF_4)_2$, $[Ru(C_6H_6)(\text{chrysene})](BF_4)_2$, $[Ru(C_6H_6)(\text{naphthalene})](BF_4)_2$, $[Ru(\text{cyclopentadienyl})(4\text{-methylcumyl})]PF_6$, $[Ru(\text{cyanophenyl})_6](tos)_2$, $[Ru(\text{cyanophenyl})_6](CF_3SO_3)_2$, $[Ru(C6H_6)(\text{tetramethylthiophene})_3](tos)_2$, $[Ru(C_6H_6)(CH_3CN)_3](tos)_2$, $[Ru(C_6H_6)(\text{tetramethylthiophene})_3](CF_3SO_3)_2$, $[Ru(C_6H_6)(CH_3CN)_3](CF_3SO_3)_2$, $[Ru(C_6H_6)(CH_3OH)_3](tos)_2$, $[Ru(C_6H_6)(CH_3OH)_3](tis)_2$, $[Os(NH_3)_5N_2](PF_6)_2$, $[Ru(NH_3)_5N_2](PF_6)_2$, $[Ru(NH_3)_(CH_3CN)]BF_4$, $[Ru(C_6H_6(NH_3)_3](tis)_2$, $[Ru(C_6H_6(\text{tetrahydrothiophene})_3](CF_3SO_3)_2$, $[Ru((CH_3)_2S)_3C_6H_6](tos)_2$, $[Ru(\text{dimethyl sulfoxide})_3C_6H_6](PF_6)_2$, $[Ru(\text{dimethylformamide})_3C_6H_6](PF6)_2$, $[Ru(C_6H_6)Cl_2]_2$ and $[Os(C_6H_6)Cl_2]_2$.

Ruthenium and osmium catalysts to be used according to the invention are either known and in some cases commercially obtainable, or can be prepared analogously to known processes. Such catalysts and their preparation are described, for example, in Gilkerson, W. R., Jackson, M. D., J. Am. Chem. Soc. 101:4096–411 (1979), Bennett, M. A., Matheson, T. W., J. Organomet. Chem. 175:87–93 (1979), Moorehouse, S., Wilkinson, G., J. Chem. Soc.; Dalton Trans., 2187–2190 (1974) and Luo, S., Rauchfuss, T. B., Wilson, S. R., J. Am. Chem. Soc. 114:8515–8520 (1992).

2. Heat-stable molybdenum(VI) or tungsten(VI) compounds which can be activated by heat or with radiation and have at least two methyl groups or two monosubstituted methyl groups bonded to the metal, the substituent having no hydrogen atom in the α position.

The other valencies of the molybdenum- and tungsten are preferably satisfied by heat-stable neutral ligands, a very large number of which are known. The number of neutral ligands may also exceed the stoichiometrically possible number (solvates). Heat stability has been explained above.

At temperatures above 50° C., for example 60 to 300° C., these molybdenum and tungsten compounds are also activated by heat.

The molybdenum and tungsten compounds to be used according to the invention can be those which contain one metal atom, or two metal atoms bonded via a single, double or triple bond. The methyl group or monosubstituted methyl group bonded to the metal is bonded at least twice, particularly preferably two to six times, and especially preferably two to four times, as a ligand. This ligand preferably is that of the formula IX

in which R is H, —CF$_3$, —SiR$_{38}$R$_{39}$R$_{40}$, —CR$_{41}$R$_{42}$R$_{43}$, or C$_6$–C$_{16}$aryl or C$_4$–C$_{15}$ heteroaryl having 1 to 3 heteroatoms from the group consisting of O, S and N, which are unsubstituted or substituted by C$_1$–C$_6$alkyl or C$_1$–C$_6$alkoxy; and R$_{41}$, R$_{42}$ and R$_{43}$ independently of one another are C$_1$–C$_{10}$alkyl, which is unsubstituted or substituted by C$_1$–C$_{10}$alkoxy, or R$_{41}$ and R$_{42}$ have this meaning and R$_{43}$ is C$_6$–C$_{10}$aryl or C$_4$–C$_9$heteroaryl, which is unsubstituted or substituted by C$_1$–C$_6$alkyl or C$_1$–C$_6$alkoxy; and R$_{38}$, R$_{39}$ and R$_{40}$ are as defined above.

Alkyl R$_{38}$ to R$_{43}$ can be linear or branched and preferably contain 1 to 8, and particularly preferably 1 to 4 C atoms. Aryl R$_{38}$ to R$_{43}$ is preferably phenyl or naphthyl.

Aryl R in formula XI is preferably phenyl or naphthyl. Heteroaryl R in formula XI is preferably pyridinyl, furanyl, thiophenyl or pyrrolyl.

Preferred substituents for R$_{38}$ to R$_{43}$ in the context of the definitions are methyl, ethyl, methoxy and ethoxy. Examples of the radicals R$_{38}$ to R$_{43}$ have been given above under the compounds of the formula I.

In a preferred embodiment, the group R in formula XI is H, —C(CH$_3$)$_3$, —(CH$_3$)$_2$C$_6$H$_5$, phenyl which is unsubstituted or substituted by methyl, ethyl, methoxy or ethoxy, —CF$_3$, or —Si(CH$_3$)$_3$.

The other valencies of the Mo(VI) and W(VI) atoms may be satisfied by identical or different ligands from the group consisting of =O, =N—R$_{44}$, secondary amines having 2 to 18 C atoms, R$_{45}$O—, R$_{45}$S—, halogen, unsubstituted or substituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen; and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen.

Secondary amines are preferably those of the formula R$_{46}$R$_{47}$N—, in which R$_{46}$ and R$_{47}$ independently of one another are linear or branched C$_1$–C$_{18}$alkyl; C$_5$- or C$_6$cycloalkyl; benzyl or phenylethyl which are unsubstituted or substituted by C$_1$–C$_6$alkoxy, or halogen, or (C$_1$–C$_6$alkyl)$_3$Si; or R$_{46}$ and R$_{47}$ together are tetramethylene, pentamethylene or 3-oxapentane-1,5-diyl. The alkyl preferably contains 1 to 12, and particularly preferably 1 to 6 C atoms. Some examples are dimethyl-, diethyl-, di-n-propyl-, di-i-propyl-, di-n-butyl-, methylethyl-, dibenzyl-, benzylmethyl-, diphenyl-, phenyl-methylamino and di(trimethylsilyl) amino.

Halogen as a ligand or substituent is preferably F or Cl, and particularly preferably Cl.

The cyclopentadienyl can be unsubstituted or substituted by one to five C$_1$–C$_4$alkyl, in particular methyl, or —Si (C$_1$–C$_4$alkyl), in particular —Si(CH$_3$)$_3$. Bridged cyclopentadienyls are, in particular, those of the formula R$_{48}$—A—R$_{48}$, in which R$_{48}$ is cyclopentadienyl which is unsubstituted or substituted by one to five C$_1$–C$_4$alkyl, in particular methyl, or —Si(C$_1$–C$_4$alkyl), in particular —Si(CH$_3$)$_3$, and A is —CH$_2$—, —CH$_2$—CH$_2$—, —Si(CH$_3$)$_2$—, —Si(CH$_3$)$_2$—Si(CH$_3$)$_2$— or —Si(CH$_3$)$_2$—O—Si(CH$_3$)$_2$—.

Ethers as neutral ligands can be dialkyl ethers having 2 to 8 C atoms or cyclic ethers with 5 or 6 ring members. Some examples are diethyl ether, methyl ethyl ether, diethyl [sic] ether, di-n-propyl ether, di-i-propyl ether, di-n-butyl ether, ethylene glycol dimethyl ether, tetrahydrofuran and dioxane.

Nitriles as neutral ligands can be aliphatic or aromatic nitriles having 1 to 12, preferably 1 to 8 C atoms. Some examples are acetonitrile, propionitrile, butylnitrile, benzonitrile and benzylnitrile.

Tertiary amines and phosphines as neutral ligands can be those having 3 to 24, preferably 3 to 18 C atoms. Some examples are trimethylamine and -phosphine, triethylamine and -phosphine, tri-n-propylamine and -phosphine, tri-n-butylamine and -phosphine, triphenylamine and -phosphine, tricyclohexylamine and -phosphine, phenyldimethylamine and -phosphine, benzyldimethylamine and -phosphine, 3,5-dimethylphenyl-dimethylamine and -phosphine.

The tridentate monoanionic ligands can be, for example, hydro(tris-pyrazol-1-yl)borates or alkyl(trispyrazol-1-yl) borates, which are unsubstituted or substituted by one to three C$_1$–C$_4$alkyl [see Trofimenko, S., Chem. Rev., 93:943–980 (1993)], or [C$_5$(R'$_5$)Co(R$_{50}$R$_{50}$ R$_{51}$P=O)$_3$]$^-$, in which R' is H or methyl and R$_{50}$ and R$_{51}$ independently of one another are C$_1$–C$_4$alkyl, C$_1$–C$_4$alkoxy or phenyl [see Kläui, W., Angew. Chem. 102:661–670 (1990)].

Halogen as a substituent for the radicals R$_{44}$ and R$_{45}$ is preferably fluorine, and particularly preferably chlorine. The substituents alkyl, alkoxy or alkoxy in alkoxymethyl or -ethyl preferably contain 1 to 4, and in particular 1 or 2 C atoms. Examples are methyl, ethyl, n- and i-propyl, n-, i- and t-butyl, methoxy, ethoxy, n- and i-propyloxy and n-, i- and t-butyloxy.

Alkyl R$_{44}$ and R$_{45}$ preferably contain 1 to 12, particularly preferably 1 to 8, and especially preferably 1 to 4 C atoms. The alkyl is preferably branched alkyl. Some examples of R$_{44}$ are methoxy, ethoxy, n- and i-propyloxy, n-, i- and t-butyloxy, hexafluoro-i-propyloxy and hexa- and perfluorobutyloxy.

Some examples of substituted phenyl and benzyl R$_{44}$ and R$_{45}$ are p-methylphenyl or benzyl, p-fluoro- or p-chlorophenyl or -benzyl, p-ethylphenyl or -benzyl, p-n- or i-propylphenyl or -benzyl, p-i-butylphenyl or -benzyl, 3-methylphenyl or -benzyl, 3-i-propylphenyl or -benzyl, 2,6-dimethylphenyl or -benzyl, 2,6-di-i-propylphenyl or -benzyl, 2,6-di-n- or -t-butylphenyl and -benzyl. R$_{45}$ is particularly preferably phenyl which is unsubstituted or substituted by C$_1$–C$_4$alkyl or C$_1$–C$_4$alkoxy.

In a preferred embodiment, the molybdenum and tungsten compounds are, in particular, those of one of the formulae XII to XIIc

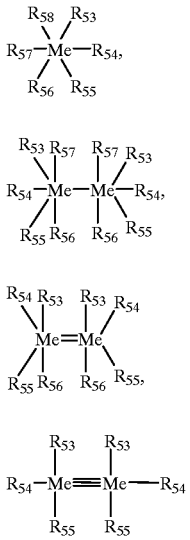

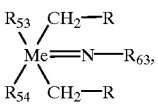

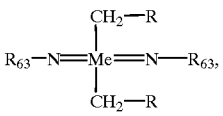

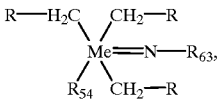

in which

Me is Mo(VI) or W(VI);

at least two, preferably 2 to 4, of the radicals $R_{53}$ to $R_{58}$ are a radical —$CH_2$—R of the formula XI in which R is as defined above;

in each case two of the other radicals of $R_{53}$ to $R_{58}$ are =O or =N—$R_{44}$, and $R_{44}$ is as defined above; and/or the other radicals of $R_{53}$ to $R_{58}$ are secondary amino having 2 to 18 C atoms, $R_{45}$O— or $R_{45}$S—, halogen, cyclopentadienyl or bridged biscyclopentadienyl or a neutral ligand, in which $R_{45}$ is as defined above. For the radicals R, $R_{44}$ and $R_{45}$, the abovementioned preferred meanings apply.

In a particularly preferred embodiment, molybdenum or tungsten compounds of the formula XII which are employed in the composition according to the invention are those in which a) $R_{53}$ to $R_{58}$ are a radical of the formula XI —$CH_2$—R, or b) $R_{53}$ and $R_{54}$ are a radical of the formula XI —$CH_2$—R, $R_{55}$ and $R_{56}$ together are the radical =N—$R_{44}$, and $R_{57}$ and $R_{58}$ together independently of one another are $R_{45}$—O— or halogen, or c) $R_{53}$ and $R_{54}$ together and $R_{55}$ and $R_{56}$ together are the radical =N—$R_{44}$, and $R_{57}$ and $R_{58}$ are a radical of the formula XI —$CH_2$—R, in which R, $R_{44}$ and $R_{45}$ have the above meanings. For R, $R_{44}$ and $R_{45}$, the above preferred meanings apply.

Particularly preferred compounds of the formula XIIc are those in which $R_{53}$, $R_{54}$ and $R_{55}$ are a radical of the formula XI, the radical of the formula XI particularly preferably being —$CH_2$—Si($C_1$–$C_4$alkyl)$_3$.

Molybdenum or tungsten compounds which are especially preferably used in the composition according to the invention are those of the formulae XIII, XIIIa or XIIIb in which Me is Mo(VI) or W(VI), R is H, —$C(CH_3)_3$, —$C(CH_3)_2$—$C_6H_5$, —$C_6H_5$ or —Si($C_1$–$C_4$alkyl)$_3$, $R_{63}$ is phenyl or phenyl which is substituted by 1 to 3 $C_1$–$C_4$alkyl or $C_1$–$C_4$alkoxy, $R_{53}$ is linear or branched $C_1$–$C_4$alkoxy which is unsubstituted or substituted by fluorine, and $R_{54}$ has the same meaning as $R_{53}$ or is F, Cl or Br. $R_{53}$ is particularly preferably branched alkoxy, which is unsubstituted or partly or completely substituted by F, for example i-propyloxy, i- and t-butyloxy, hexafluoropopyloxy [sic] and nonafluoropropyloxy. $R_{54}$ is preferably Cl.

Some examples of molybdenum and tungsten compounds are: W(=N—$C_6H_5$)(OC($CH_3$)$_3$)(Cl)[($CH_2$Si($CH_3$)$_3$)]$_2$, [($CH_3$)$_3$Si$CH_2$]$_3$Mo≡Mo[$CH_2$Si($CH_3$)$_3$]$_3$, W(=N—$C_6H_5$)(OC($CF_3$)$_2$$CH_3$)$_2$[($CH_2$Si($CH_3$)$_3$)]$_2$, W(=N$C_6H_5$)[$CH_2$Si($CH_3$)$_3$]$_3$Cl, Mo(=N-2,6-dimethyl$C_6H_3$)$_2$[($CH_2$—$C_6H_5$)]$_2$, W[2,6-($CH_3$)$_2$$C_6H_3$N]$_2$($CH_2$—$C_6H_5$)$_2$, Mo(=N-2,6-diisopropyl$C_6H_3$)$_2$[($CH_2$—$C_6H_5$)]$_2$, Mo(=N-2,6-diisopropyl$C_6H_3$)$_2$[($CH_2$C($CH_3$)$_2$—$C_6H_5$)]$_2$ and Mo(=N-2,6-dimethyl$C_6H_3$)$_2$($CH_3$)$_2$(tetrahydrofuran).

The molybdenum and tungsten catalysts to be used according to the invention are known or can be prepared by known and analogous processes starting from the metal halides by means of Grignard reactions [see, for example, Huq, F., Mowat, W., Shortland, A., Skapski, A. C., Wilkinson, G., J. Chem. Soc., Chem. Commun. 1079–1080 (1971) or Schrock, R. R., Murdzeck, J. S., Bazan, G. C., Robbins, J., DiMare, M., O'Regan, M., J. Am. Chem. Soc., 112:3875–3886 (1990)].

3. Heat-stable titanium(IV), niobium(V), tantalum(V), molybdenum(VI) or tungsten(VI) compounds in which a silylmethyl group and at least one halogen are bonded to the metal. These one-component catalysts are particularly photocatalytically active.

The titanium(IV), niobium(V) and tantalum(V) compounds to be used according to the invention are those which contain one metal atom. The molybdenum(VI) and tungsten (VI) compounds to be-used according to the invention can be those which contain one metal atom, or two metal atoms bonded via a single, double or triple bond. The other valencies of the titanium, niobium, tantalum, molybdenum and tungsten are preferably satisfied by heat-stable neutral ligands, the definition of heat stability having been given above. The halogen bonded to the metal atom is preferably F, Cl, Br and I more preferably F, Cl and Br, and particularly preferably F or Cl. The silylmethyl ligand preferably corresponds to the formula XIV —CH$_2$—SiR$_{38}$R$_{39}$R$_{40}$ (XIV), in which R$_{38}$, R$_{39}$ and R$_{40}$ independently of one another are C$_1$–C$_{18}$alkyl, C$_5$- or C$_6$cycloalkyl or phenyl or benzyl which are unsubstituted or substituted by C$_1$–C$_6$alkyl or C$_1$–C$_6$alkoxy.

Alkyl R$_{38}$ to R$_{40}$ can be linear or branched and preferably contains 1 to 12, particularly preferably 1 to 8, and in particular 1 to 4 C atoms. The particularly preferred alkyl is methyl and ethyl.

Preferred substituents for phenyl and benzyl R$_{38}$ to R$_{40}$ in the context of the definitions are methyl, ethyl, methoxy and ethoxy.

In a preferred embodiment R$_{38}$ to R$_{40}$ in the group of formula XIV are C$_1$–C$_4$alkyl, phenyl or benzyl.

Some examples of the group of the formula XIV are —CH$_2$—Si(CH$_3$)$_3$, —CH$_2$—Si(C$_2$H$_5$)$_3$, —CH$_2$—Si(n-C$_3$H$_7$)$_3$, —CH$_2$—Si(n-C$_4$H$_9$)$_3$, —CH$_2$—Si(CH$_3$)$_2$(n-C$_4$H$_9$), —CH$_2$—Si(CH$_3$)$_2$(t-C$_4$H$_9$), —CH$_2$—Si(CH$_3$)$_2$(C$_2$H$_5$), —CH$_2$—Si(CH$_3$)$_2$[C(CH$_3$)$_2$CH(CH$_3$)$_2$], —CH$_2$—Si(CH$_3$)$_2$(n-C$_{12}$H$_{25}$), —CH$_2$—Si(CH$_3$)$_2$(n-C$_{18}$H$_{37}$), —CH$_2$—Si(C$_6$H$_5$)$_3$, —CH$_2$—Si(CH$_2$—C$_6$H$_5$)$_3$, —CH$_2$—Si(C$_6$H$_5$)(CH$_3$)$_2$ and —CH$_2$—Si(CH$_2$—C$_6$H$_5$)(CH$_3$)$_2$ —CH$_2$—Si(CH$_3$)$_3$ is especially preferred.

The other valencies of the Ti(IV), Nb(V), Ta(V), Mo(VI) and W(VI) atoms may be satisfied by identical or different neutral ligands, for example chosen from the group consisting of =O, =N—R$_{44}$, secondary amines having 2 to 18 C atoms, R$_{45}$O—, R$_{45}$S—, halogen, substituted or unsubstituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen; and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl)amino, di(C$_1$–C$_6$-alkyl)amino-C$_1$–C$_3$alkyl or halogen, or benzyl or phenylethyl, which are unsubstituted or substituted by C$_1$–C6alkyl, C$_1$–C$_6$alkoxy, C$_1$–C$_6$alkoxymethyl, C$_1$C$_6$alkoxyethyl or halogen, with the proviso that in the case of the titanium compounds, the ligand is not =O or =N—R$_{44}$.

The definitions and preferences of R$_{44}$ and R$_{45}$, of secondary amines, of halogen as a further ligand on the metal atoms or as substituent, of cyclopentadienyl, ethers, nitriles, tertiary amines and phosphines as neutral ligands and of tridentate monoanionic ligands have been given previously. Likewise given previously were the definitions and preferences of alkyl, akoxy or alkoxy as a substituent in alkoxymethyl or -ethyl.

In a preferred embodiment, the metal compounds are those, in particular, of the formulae XV, XVa or XVb

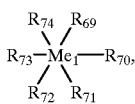
(XV)

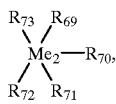
(XVa)

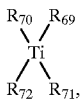
(XVb)

in which

Me$_1$ is Mo(VI) or W(VI);

Me$_2$ is Nb(V) or Ta(V);

one of the radicals R$_{69}$ to R$_{74}$ is a radical —CH$_2$—SiR$_{38}$R$_{39}$R$_{40}$ of the formula XIV;

at least one of the radicals R$_{69}$ to R$_{74}$ is F, Cl or Br;

R$_{38}$, R$_{39}$ and R$_{40}$ independently of one another are C$_1$–C$_6$alkyl, C$_5$- or C$_6$cycloalkyl, or phenyl or benzyl which are unsubstituted or substituted by C$_1$–C$_6$alkyl or C$_1$–C$_6$alkoxy;

in formula XV two or in each case two, and in formula XVa two of the other radicals of R$_{69}$ to R$_{74}$ each together are =O or =N—R$_{44}$, and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, and the other radicals are secondary amino having 2 to 18 C atoms, R$_{45}$O— or R$_{45}$S—, halogen, unsubstituted or substituted cyclopentadienyl or bridged biscyclopentadienyl or a neutral ligand, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl)amino, di(C$_1$–C$_6$-alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl)amino, di(C$_1$–C$_6$-alkyl)amino-C$_1$–C$_3$alkyl or halogen; or in the formulae XV, XVa and XVb, the other radicals independently of one another are secondary amino having 2 to 18 C atoms, R$_{45}$O— or R$_{45}$S—, halogen, unsubstituted or substituted cyclopentadienyl or bridged biscyclopentadienyl or a neutral ligand, in which the R$_{45}$ independently of one another are linear or branched C$_1$–C$_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)-amino, di($C_1$–$C_6$-alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-C–$C_3$-alkyl or halogen.

For the radicals $R_{69}$ to $R_{74}$, the abovementioned preferred meanings apply.

In a particularly preferred embodiment, metal compounds of the formulae XV, XVa or XVb which are used in the process according to the invention are those in which $R_{69}$ is a radical of the formula XIV —$CH_2$—$SiR_{38}R_{39}R_{40}$ and $R_{70}$ is F, Cl or Br; and (a) in formula XV $R_{71}$ and $R_{72}$, and $R_{73}$ and $R_{74}$ in each case together are the radical =N—$R_{44}$, or $R_{71}$, and $R_{72}$ together are the radical =N—$R_{44}$, and $R_{73}$ and $R_{74}$ independently of one another are unsubstituted or substituted cyclopentadienyl, $R_{45}$—O— or halogen, or b) in formula XVa $R_{71}$ and $R_{72}$ together are the radical =N—$R_{44}$, and $R_{44}$ is unsubstituted or substituted cyclopentadienyl, $R_{45}$—O— or halogen, or in formula XVa $R_{71}$, $R_{72}$ and $R_{73}$ independently of one another are unsubstituted or substituted cyclopentadienyl, $R_{45}$—O— or halogen, or c) in formula XVb $R_{71}$ and $R_{72}$ independently of one another are unsubstituted or substituted cyclopentadienyl, $R_{45}$—O— or halogen, in which $R_{38}$ to $R_{44}$ have the above meanings. For $R_{38}$, $R_{39}$, $R_{40}$, $R_{44}$ and $R_{45}$, the above preferred meanings apply.

Metal compounds which are especially preferably used in the process according to the invention are those of the formulae XVI, XVIa, XVIb, XVIc or XVId

(XVI)

(XVIa)

(XVIb)

(XVIc)

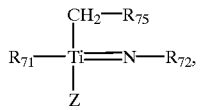
(XVId)

in which $Me_1$ is Mo(VI) or W(VI);

$Me_2$ is Nb(V) or Ta(V);

$R_{75}$ is —Si($C_1$–$C_4$alkyl)$_3$;

Z is Cl or Br;

$R_{63}$ is phenyl or phenyl which is substituted by 1 to 3 $C_1$–$C_4$alkyl or $C_1$–$C_4$alkoxy, (a) $R_{73}$ and $R_{74}$ in formula XVI together are the group =$NR_{63}$ or individually independently of one another are F, Cl, Br, linear or branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;

(b) $R_{71}$, $R_{72}$, $R_{73}$ and $R_{74}$ in formula XVIa independently of one another are F, Cl, Br, linear or, in particular, branched $C_1$–$C_4$-alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;

(c) $R_{73}$ in formula XVIb is F, Cl, Br, linear or branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;

(d) $R_{71}$, $R_{72}$ and $R_{73}$ in formula XVIc independently of one another are Fl, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl; and (e) $R_{71}$ and $R_{72}$ in formula XVId independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. The alkoxy is particularly preferably branched alkoxy, which is optionally partly or completely substituted by F, for example i-propyloxy, i- and t-butyloxy, hexafluoropopyloxy [sic] and nonafluoropropyloxy. The phenyloxy radical is, in particular, phenyloxy substituted in the 2,6-positions [sic] by $C_1$–$C_4$alkyl, for example 2,6-dimethylphenyloxy. Examples of substituted cyclopentadienyl radicals are mono- to pentamethylcyclopentadienyl and trimethylsilylcyclopentadienyl. $R_{63}$ is preferably phenyl or phenyl which is substituted by $C_1$–$C_1$alkyl [sic], in particular phenyl 3,5-dimethyl-, 2,6-dimethyl-, 3,5-diethyl- and 2,6-diethylphenyl.

Especially preferred compounds in the process according to the invention are those of the formulae XVII, XVIIa, XVIIb, XVIc and XVId $(R_{63}$—N=$)_2 Me_1 X_a CH_2 Si(CH_3)_3$ (XVII), $$(R_{63}\!\!=\!\!N\!\!=\!\!)R_{71}Me_1X_a(OR_{62})CH_2Si(CH_3)_3 \quad (XVIIa),$$

$$R_{72}R_{73}Me_2X_a(OR_{62})CH_2Si(CH_3)_3 \quad (XVIIb),$$

$$R_{63}\!\!-\!\!N\!\!=\!\!Me_2X_a(OR_{62})CH_2Si(CH_3)_3 \quad (XVIIc),$$

$$R_{71}\!\!-\!\!TiX_a(OR_{62})CH_2Si(CH_3)_3 \quad (XVIId),$$

in which $Me_1$ is Mo(VI) or W(VI);

$Me_2$ is Nb(V) or Ta(V);

Xa is F or Cl;

$R_{63}$ is phenyl or phenyl which is substituted by 1 or 2 $C_1$–$C_4$alkyl groups;

$R_{62}$ is branched $C_3$- or $C_4$alkyl which is unsubstituted or partly or completely substituted by fluorine, or phenyloxy or phenyloxy which is substituted by 1 to 3 methyl or ethyl groups;

$R_{72}$ and $R_{73}$ independently of one another are cyclopentadienyl which is unsubstituted by substituted by 1 to 5 methyl groups $X_a$ or $R_{62}$O—; and $R_{71}$ which is unsubstituted or substituted by 1 to 5 methyl groups, $X_a$ or $R_{72}$O—.

Some examples of titanium(IV), niobium(V), tantalum(V), molybdenum(VI) and tungsten(VI) compounds are [Cp is cyclpentadienyl and Me is Nb(V) or Ta(V)]: Ti[CH$_2$Si(CH$_3$)$_3$]Cl$_3$, Ti[CH$_2$Si(CH$_3$)$_3$]Br$_3$, Cp$_2$Ti[CH$_2$Si(CH$_3$)$_3$]Cl, (CH$_3$)$_2$Ti[CH$_2$Si(CH$_3$)$_3$]Cl, Cp$_2$Ti[CH$_2$Si(CH$_3$)$_3$]Br, Cp$_2$Ti[CH$_2$Si(CH$_3$)$_3$]I, CpTi[CH$_2$Si(CH$_3$)$_3$][CH$_3$]Cl, CpTi[CH$_2$Si(CH$_3$)$_3$]Br$_2$, [(CH$_3$)$_2$CHO]$_2$Ti[CH$_2$Si(CH$_3$)$_3$]Cl, [(CF$_3$)$_2$CHO]$_2$Ti[CH$_2$Si(CH$_3$)$_3$]Cl, [(CF$_3$)$_2$CHO]CpTi[CH$_2$Si(CH$_3$)$_3$]Cl, [(CH$_3$)$_2$CHO]CpTi[CH$_2$Si(CH$_3$)$_3$]Cl, (C$_6$H$_5$O)CpTi[CH$_2$Si(CH$_3$)$_3$]Cl, (2,6-dimethyl-C$_6$H$_5$O)CpTi[CH$_2$Si(CH$_3$)$_3$]Cl, (2,6-dimethyl-$_6$H$_5$O)$_2$Ti[CH$_2$Si(CH$_3$)$_3$]Cl [sic], (2,6-dimethyl-C$_6$H$_5$O)Ti[CH$_2$Si(CH$_3$)$_3$]$_2$Br, [(CH$_3$)$_3$CO]CpTi[CH$_2$Si(CH$_3$)$_3$]Cl, [(CF$_3$)$_2$(CH$_3$)CO]CpTi[CH$_2$Si(CH$_3$)$_3$]Cl, Me(=N—C$_6$H$_5$)[OCH(CH$_{32}$][(CH$_2$Si(CH$_3$)$_3$]Cl, Cp$_2$Me[(CH$_2$Si(CH$_3$)$_3$]Cl$_2$, Me(=N—C$_6$H$_5$)[OCH(CF$_3$)$_2$][(CH$_2$Si(CH$_3$)$_3$]Cl, Ta[CH$_2$Si(CH$_3$)$_3$]$_3$Cl$_2$, Me(=N-2,6-diisopropylC$_6$H$_3$)[(CH$_2$Si(CH$_3$)$_3$]Cl, Me(=N-2,6-diisopropylC$_6$H$_3$)[(CH$_3$)$_2$CHO][(CH$_2$Si(CH$_3$)$_3$]Cl, Me(=N-2,6-dimethylC$_6$H$_3$)(2,6-Dimethyl-C$_6$H$_5$O)[CH$_2$Si(CH$_3$)$_3$]Cl, Me(=N-2,6-dimethylC$_6$H$_3$)((CF$_3$)$_2$CHO)[CH$_2$Si(CH$_3$)$_3$]Cl, (=N-2,6-dimethylC$_6$H$_3$)CpMe[(CH$_2$Si(CH$_3$)$_3$]Cl, (C$_6$H$_5$O)$_2$CpMe[(CH$_2$Si(CH$_3$)$_3$]Cl, (=N-3,5-dimethylC$_6$H$_3$)Me[2,6-dimethylC$_6$H$_3$O)][(CH$_2$Si(CH$_3$)$_3$)] Cl, CpMe[OCH(CH$_3$)$_2$]$_2$[(CH$_2$Si(CH$_3$)$_3$]Br, CpMe[OCH(CH$_3$)$_2$]$_2$[(CH$_2$Si(CH$_3$)$_3$]Cl, CpMe[OCH(CF$_3$)$_2$]$_2$[(CH$_2$Si(CH$_3$)$_3$]Cl, Cp$_2$Me(methyl)[(CH$_2$Si(CH$_3$)$_3$]Cl, Cp$_2$Me[OCH(CH$_3$)$_2$][(CH$_2$Si(CH$_3$)$_3$]Cl, [OCH(CH$_3$)$_2$]$_2$Me[CH$_2$Si(CH$_3$)$_3$]Cl$_2$, Me(2,6-dimethylphenyloxy)(CH$_3$O)$_2$[(CH$_2$Si(CH$_3$)$_3$]Cl, Me[CH$_2$Si(CH$_3$)$_3$][OCH(CH$_3$)](CF$_3$O)$_2$Cl, W(=N—C$_6$H$_5$)[(OC(CH$_3$)$_3$][CH$_2$—Si(CH$_3$)$_3$]Cl, (2,6-diisopropylphenyloxy)$_2$Me[CH$_2$Si(CH$_3$)$_3$]Cl$_2$, CP$_2$Me[OC(CH$_3$)$_3$][(CH$_2$Si(CH$_3$)$_3$]Cl, CpMe[OC(CH$_3$)(CF$_3$)$_2$]$_2$[(CH$_2$Si(CH$_3$)$_3$]Cl, Mo$_2$[(CH$_2$—Si(CH$_3$)$_3$)(OCH$_2$C(CH$_3$)$_3$)Cl]$_2$, Mo(=N-2,6-diisopropylC$_6$H$_3$)$_2$[(CH$_2$—Si(CH$_3$)$_3$]Cl, W(=N—C$_6$H$_5$)[(OC(CH$_3$)$_3$]$_2$[CH$_2$—Si(CH$_3$)$_3$]Cl, Mo(=N—C$_6$H$_5$)$_2$[CH$_2$—Si(CH$_3$)$_3$]Cl, Mo(=N-2,6-diisopropylC$_6$H$_3$)[(OCH$_2$C(CH$_3$)$_3$]$_2$[CH$_2$—Si(CH$_3$)$_3$]Cl.

The titanium, niobium, tantalum, molybdenum and tungsten compounds to be used according to the invention are known or can be prepared by known and analogous processes starting from unsubstituted or correspondingly substituted metal halides by means of Grignard reactions [Schrock, R. R., Murdzeck, J. S., Bazan, G. C., Robbins, J., DiMare, M., O'Regan, M., J. Am. Chem. Soc., 112:3875–3886 (1990)].

4. Other suitable photactive one-component catalysts are niobium(V) or tantalum(V) compounds which have at least two methyl groups or two monosubstituted methyl groups bonded to the metal, the substituent containing no hydrogen atom in the α position. These compounds are also thermal catalysts.

The niobium(V) and tantalum(V) compounds to be used according to the invention contain one metal atom. The methyl group or monosubstituted methyl group bonded to the metal is bonded at least twice, particularly preferably two to five times, and especially preferably twice or three times as a ligand. This ligand preferably is that of the formula XI

$$—CH_2—R \quad (XI),$$

in which R has the meanings and preferred meanings given above.

The other valencies of the niobium and tantalum atom are preferably satisfied by heat-stable neutral ligands, a very large number of which are known. The number of neutral ligands may also exceed the stoichiometrically possible number (solyates). The definition of heat stability has been given above.

The other valencies of the Nb(V) and Ta(V) atoms may be satisfied by identical or different neutral ligands, for example chosen from the group consisting of =O, =N—R$_{44}$, secondary amines having 2 to 18 C atoms, R$_{45}$O—, R$_{45}$S—, halogen, unsubstituted or substituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$-alkoxyethyl or halogen; and R$_{44}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)-amino, di($C_1$–$C_6$alkyl)amino-$C_1$–$C_3$alkyl, or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen.

The definitions and preferences of R$_{44}$ and R$_{45}$, of secondary amines, of halogen as a further ligand on the metal atoms or as substituent, of cyclopentadienyl, ethers, nitriles, tertiary amines and phosphines as neutral ligands and of tridentate monoanionic ligands have been given previously. Likewise given previously were the definitions and preferences of alkyl, alkoxy or alkoxy as a substituent in alkoxymethyl or -ethyl.

In a preferred embodiment, the niobium and tantalum compounds are, in particular, those of the formula XVIII

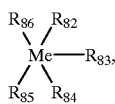
(XVIII)

in which

Me is Nb(V) or Ta(V), at least two, preferably 2 or 3, of the radicals $R_{82}$ to $R_{86}$ are a radical —$CH_2$—R of the formula XI in which R has the meanings and preferred meanings given above;

two of the other radicals of $R_{82}$ to $R_{86}$ together are =O or =N—$R_{44}$, and $R_{44}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl) amino, di($C_1$–$C_6$-alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$alkyl)amino-$C_1$–$C_3$alkyl or halogen; and/or the other radicals of $R_{82}$ to $R_{86}$ independently of one another are secondary amino having 2 to 18 C atoms, $R_{45}O$—, $R_{45}S$—, halogen, cyclopentadienyl or bridged biscyclopentadienyl or a neutral ligand, in which the $R_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

In a particularly preferred embodiment, the niobium and tantalum compounds of the formula XVIII used are those in which a) $R_{82}$ to $R_{86}$ are each a radical of the formula XI —$CH_2$—R, or b) $R_{82}$ and $R_{83}$ are each a radical of the formula XI —$CH_2$—R, $R_{84}$ and $R_{85}$ together are the radical =N—$R_{44}$, and $R_{86}$ is unsubstituted or substituted cyclopentadienyl, $R_{45}$—O— or halogen, or c) $R_{82}$, $R_{83}$ and $R_{84}$ are each a radical of the formula XI —$CH_2$—R, and $R_{85}$ and $R_{86}$ together are the radical =N—$R_{44}$, or [lacuna] $R_{82}$, $R_{83}$, $R_{84}$ and $R_{85}$ are a radical of the formula XI —$CH_2$—R, and $R_{86}$ is unsubstituted or substituted cyclopentadienyl, $R_{45}$—O— or halogen, in which R, $R_{44}$ and $R_{45}$ have the above meanings. For R, $R_{44}$ and $R_{45}$, the above preferred meanings apply.

Niobium and tantalum compounds which are especially preferably used in the process according to the invention are those of the formulae IXX, IXXa or IXXb

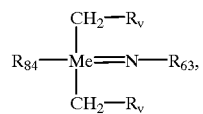
(IXX)

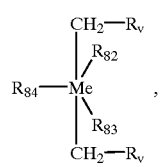
(IXXa)

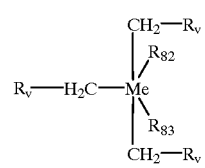
(IXXb)

in which

Me is Nb(V) or Ta(V), $R_v$ is H, —$C(CH_3)_3$, —$C(CH_3)_2$—$C_6H_5$, —$C_6H_5$ or —Si$(C_1$–$C_4$alkyl)$_3$, $R_{63}$ is phenyl or phenyl which is substituted by 1 to 3 $C_1$–$C_4$alkyl or $C_1$–$C_4$alkoxy, $R_{84}$ in formula IXX is the group —$CH_2$—R or F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;

$R_{82}$, $R_{83}$ and $R_{84}$ in formula IXXa independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl; and $R_{82}$ and $R_{83}$ in formula IXXb independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. The alkoxy is particularly preferably branched alkoxy, which is unsubstituted or completely or partly substituted by F, for example i-propyloxy, i- and t-butyloxy, hexafluoropopyloxy [sic] or nonafluoropropyloxy.

Some examples of niobium(V) and tantalum(V) compounds are [Cp is cyclopentadienyl and Me is Nb(V) or Ta(V)]:

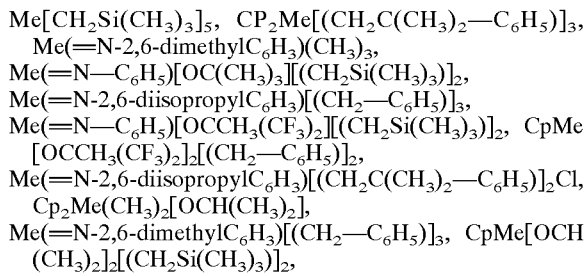

Cp$_2$Me[(CH$_2$—C$_6$H$_5$)]$_3$, Me[CH$_2$Si(CH$_3$)$_3$]$_3$Cl$_2$, Me[CH$_2$Si(CH$_3$)$_3$]$_3$[OCH$_2$C(CH$_3$)$_3$]$_2$,
Cp$_2$Me[3,5-dimethylC$_6$H$_3$O)][CH$_2$Si(CH$_3$)$_3$)]$_2$, Me(2,6-diisopropylphenyloxy)$_2$(CH$_3$)$_3$,
Cp$_2$Me(CH$_3$)$_3$, Me(2,6-dimethylphenyloxy)$_2$(CH$_3$)$_3$,
Me[CH$_2$Si(CH$_3$)$_3$]$_3$[OCH(CH$_3$)]$_2$, CpMe[OC(CH$_3$)$_3$]$_2$[(CH$_2$—C$_6$H$_5$)]$_2$ and
Cp$_2$Me[(CH$_2$Si(CH$_3$)$_3$)]$_3$.

The niobium and tantalum compounds to be used according to the invention are known or can be prepared by known and analogous processes starting from the optionally substituted metal halides via Grignard reactions and/or substitution reactions [Schrock, R. R., Murdzeck, J. S., Bazan, G. C., Robbins, J., DiMare, M., O'Regan, M., J. Am. Chem. Soc., 112:3875–3886 (1990)].

5. Other suitable photoactive one-component catalysts are titanium(IV) compounds which contain at least two methyl groups or two monosubstituted methyl groups bonded to the metal, the substituent containing no hydrogen atom in the α position. These compounds are also thermal catalysts.

The titanium(IV) compounds to be used according to the invention contain one metal atom. The methyl group or monosubstituted methyl group bonded to the metal is bonded at least twice, particularly preferably two to four times, and especially preferably twice or three times as a ligand. This ligand preferably is that of the formula XI

   (XI), in which R has the abovementioned meanings and preferred meanings.

The other valencies of the titanium atom are preferably satisfied by heat-stable neutral ligands, a large number of which are known. The number of neutral ligands may also exceed the stoichiometrically possible number (solvates). Heat stability has been explained above.

The other valencies of the titanium(IV) atoms may be satisfied by identical or different neutral ligands, for example chosen from the group consisting of secondary amines having 2 to 18 C atoms, R$_{45}$O—, R$_{45}$S—, halogen, unsubstituted or substituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen.

The definitions and preferences of R$_{45}$, of secondary amines, of halogen as a further ligand on the metal atoms or as substituent, of cyclopentadienyl, ethers, nitriles, tertiary amines and phosphines as neutral ligands and of tridentate monoanionic ligands have been given previously. Likewise given previously were the definitions and preferences of alkyl, alkoxy or alkoxy as a substituent in alkoxymethyl or -ethyl.

In a preferred embodiment, the titanium(IV) compounds are, in particular, those of the formula XX

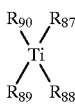   (XX)

in which
at least two, preferably 2 or 3, of the radicals R$_{87}$ to R$_{90}$ are a radical —CH$_2$—R of the formula XI in which R has the abovementioned meanings and preferred meanings; and the other radicals R$_{87}$ to R$_{90}$ are secondary amino having 2 to 18 C atoms, R$_{45}$O—, R$_{45}$S—, halogen, cyclopentadienyl or bridged biscyclopentadienyl or a neutral ligand, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_{1-C6}$alkoxyethyl, di(C$_1$–C$_6$alkyl)amino, di(C$_1$–C$_6$alkyl)amino-C$_1$–C$_3$alkyl or halogen.

In a particularly preferred embodiment, titanium(IV) compounds of the formula XX which are used in the process according to the invention are those in which a) R$_{87}$ to R$_{90}$ are a radical of the formula XI —CH$_2$—R, or b) R$_{87}$ and R$_{88}$ are a radical of the formula XI —CH$_2$—R, and R$_{89}$ and R$_{90}$ independently of one another are unsubstituted or substituted cyclopentadienyl, R$_{45}$—O— or halogen, or c) R$_{87}$, R$_{88}$ and R$_{89}$ are a radical of the formula XI —CH$_2$—R, and R$_{90}$ is unsubstituted or substituted cyclopentadienyl, R$_{45}$—O— or halogen, where R and R$_{45}$ have the above meanings. For R and R$_{45}$, the above preferred meanings apply.

Titanium(IV) compounds which are especially preferably used in the process according to the invention are those of the formulae XXIa or XXIb

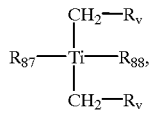   (XXIa)

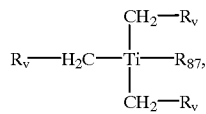   (XXIb)

in which
R$_v$ is H, —C(CH$_3$)$_3$, —C(CH$_3$)$_2$—C$_6$H$_5$, —C$_6$H$_5$ or —Si(C$_1$–C$_4$alkyl)$_3$, and R$_{87}$ and R$_{88}$ independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or $C_1$–$C_4$alkoxy, or cyclopentadienyl which is unsubstituted or substituted by $C_1$–$C_4$alkyl. The alkoxy is particularly preferably branched alkoxy, which is unsubstituted or partly or completely substituted by F, for example i-propyloxy, i- and t-butyloxy, hexafluoropropyloxy and nonafluoropropyloxy.

In a preferred embodiment of the invention, the titanium (IV) compounds contain a halogen atom, in particular Cl or Br, bonded to the titanium if the radical R in the group —$CH_2$—R is —$SiR_{38}R_{39}R_{40}$. In this case, especially preferred compounds are those of the formula XXII

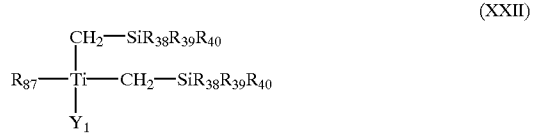

(XXII)

in which $Y_1$ is F, Cl or Br, $R_{38}$, $R_{39}$ and $R_{40}$ independently of one another are $C_1$–$C_{18}$alkyl, $C_5$- or $C_6$cycloalkyl or phenyl or benzyl which are unsubstituted or substituted by $C_1$–$C_6$alkyl or $C_1$–$C_6$alkoxy; and $R_{87}$ is the group —$CH_2$—$SiR_{38}R_{39}R_{40}$, F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. $R_{38}$, $R_{39}$ and $R_{40}$ are preferably $C_1$–$C_4$alkyl, phenyl or benzyl, and $R_{87}$ is preferably Cl, $C_3$- or $C_4$alkyl which is unsubstituted or substituted by fluorine, or phenyl or benzyl which are unsubstituted or substituted by $C_1$–$C_4$alkyl or $C_1$–$C_4$alkoxy.

Some examples of titanium(IV) compounds are [Cp is cyclopentadienyl]: $Ti[CH_2Si(CH_3)_3]_4$, $Ti[OCH(CF_3)_2]_2$ $[(CH_2Si(CH_3)_3)]_2$, $CpTi[(CH_2C(CH_3)_2—C_6H_5)]_2Cl$, $CpTi[(CH_2—C_6H_5)]_3$, $TiCl_2[CH_2Si(CH_3)_3)]_2$, $[OCH(CF_3)_2]Ti[(CH_2—C_6H_5)]_3$, $CpBrTi[(CH_2C(CH_3)_2—C_6H_5)]_2$, $CpTi[2,6$-dimethyl$C_6H_3O)][(CH_2Si(CH_3)_3)]_2$, $Ti[OCH(CH_3)_2]_2$ $[(CH_2—C_6H_5)]_2$, $ClTi[OCH(CH_3)_2][(CH_2Si(CH_3)_3)]_2$, $CpTi[OCH(CF_3)_2][(CH_2—C_6H_5)]_2$, $CpTi(methyl)_3$, $CpTi(methyl)_2[OCH(CH_3)_2]$, $Ti[CH_2Si(CH_3)_3]_2Br_2$, $Ti(2,6$-dimethylphenyloxy$)_2(CH_3)_2$, $Cp_2Ti(CH_3)_2$, $Ti[CH_2Si(CH_3)_3]_3[OCH(CH_3)]$ and $Ti(2,6$-diisopropylphenyloxy$)_2(CH_3)_2$.

The titanium(IV) compounds to be used according to the invention are known or can be prepared by known and analogous processes starting from the metal halides via Grignard reactions or other known substitution reactions [see Clauss, K., Bestian, H., Justus Liebigs Ann. Chem. 654:8–19 (1962)].

6. Other suitable photocatalytically active compounds are ruthenium or osmium compounds which contain at least one phosphine group, at least one photolabile ligand and optionally neutral ligands bonded to the metal atom, 2 to 5 ligands in total being bonded, and which contain acid anions for charge balancing. In total in the context of the invention means the sum of the phosphine groups, photolabile ligands and neutral ligands. The neutral ligands are also called non-photolabile ligands. Preferably 2 to 4, and particularly preferably 2 or 3 ligands are bonded in total.

These osmium compounds are also thermally active catalysts. The ruthenium compounds are thermal catalysts if the phosphine group contains no linear alkyl or alkoxy groups, but bulky groups, for example secondary and tertiary alkyl or alkoxy groups (i-propyl, i- and t-butyl), or cycloalkyl groups, or phenyl groups or pheyloxy groups which are unsubstituted or substituted by 1 to 3 $C_1$–$C_4$alkyl or -alkoxy.

The phosphine group is preferably tertiary phosphines and phosphites having 3 to 40, more preferably 3 to 30, and particularly preferably 3 to 24 C atoms.

The other valencies of the ruthenium and osmium are preferably satisifed by heat-stable neutral ligands, a very large number of which are known. The number of neutral ligands can also exceed the stoichiometrically possible number (solvates).

The ruthenium and osmium compounds to be used according to the invention can contain a monophosphine bonded one to three times, and preferably two or three times, and a diphosphine bonded once to the metal atom. Preferably 1 to 2 photolabile ligands are bonded in the ruthenium and osmium catalysts. The phosphine ligands preferably are those of the formulae XXIII and XXIIIa

(XXIII)

(XXIIIa)

in which $R_{91}$, $R_{92}$ and $R_{93}$ independently of one another are H, $C_1$–$C_{20}$alkyl, $C_1$–$C_{20}$alkoxy, $C_4$–$C_{12}$cycloalkyl or cycloalkoxy which are unsubstituted or substituted by $C_1$–$C_6$alkyl, $C_1$–$C_6$haloalkyl or $C_1$–$C_6$alkoxy or $C_6$–$C_{16}$aryl or $C_6$–$C_{16}$aryloxy which are unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which are unsubstituted or substituted by $C_1$–$C_6$alkyl, $C_1$–$C_6$haloalkyl or $C_1$–$C_6$alkoxy; the radicals $R_{91}$ and $R_{92}$ together are tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy, or tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy and fused with 1 or 2 1,2-phenylene, or tetramethylenedioxyl which is unsubstituted or substituted by $C_1$–$C_6$alkyl, $C_1$–$C_6$haloalkyl or $C_1C_6$alkoxy and is fused in the 1,2- and 3,4-positions with 1,2-phenylene, and $R_{93}$ has the abovementioned meaning; and $Z_1$ is linear or branched $C_2$–$C_{12}$alkylene which is unsubstituted or substituted by $C_1$–$C_4$alkoxy, 1,2- or 1,3-cycloalkylene having 4 to 8 C atoms, which is unsubstituted or substituted by $C_1$–$C_4$alkyl or $C_1$–$C_4$alkoxy, or 1,2- or 1,3-heterocycloalkylene having 5 or 6 ring members and one heteroatom from the group consisting of O or N, which is unsubstituted or substituted by $C_1$–$C_4$alkyl or $C_1$–$C_4$alkoxy.

The radicals $R_{91}$, $R_{92}$ and $R_{93}$ are preferably identical radicals.

If $R_{91}$, $R_{92}$ and $R_{93}$ are substituted, the substituents are preferably $C_1$–$C_4$alkyl, $C_1$–$C_4$haloalkyl or $C_1$–$C_4$alkoxy. Halogen is preferably Cl, and particularly preferably F. Examples of preferred substituents are methyl, methoxy, ethyl, ethoxy and trifluoromethyl. $R_{91}$, $R_{92}$ and $R_{93}$ are preferably substituted by 1 to 3 substituents.

Alkyl $R_{91}$, $R_{92}$ and $R_{93}$ can be linear or branched and can preferably contain 1 to 12, more preferably 1 to 8, and particularly preferably 1 to 6 C atoms. Examples of alkyl are methyl, ethyl, n- and i-propyl, n-, i- and t-butyl, the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3-pentyl and 1-, 2-, 3- or 4-hexyl.

Alkoxy $R_{91}$, $R_{92}$ and $R_{93}$ can be linear or branched and can preferably contain 1 to 12, more preferably 1 to 8, and particularly preferably 1 to 6 C atoms. Examples of alkoxy are methoxy, ethoxy, n- and i-propyloxy, n-, i- and t-butyloxy, the isomers of pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy and eicosyloxy. Preferred examples are methoxy, ethoxy, n- and i-propyloxy, n-, i- and t-butyloxy, 1-, 2- or 3-pentyloxy and 1-, 2-, 3- or 4-hexyloxy.

Cycloalkyl $R_{91}$, $R_{92}$ and $R_{93}$ are preferably $C_5$–$C_8$cycloalkyl, and particularly preferably $C_5$- or $C_6$cycloalkyl. Some examples are cyclobutyl, cycloheptyl, cyclooctyl and, in particular, cyclopentyl and cyclohexyl. Examples of substituted cycloalkyl are methyl-, dimethyl-, trimethyl-, methoxy-, dimethoxy-, trimethoxy-, trifluoromethyl-, bistrifluoromethyl and tristrifluoromethyl-cyclopentyl and -cyclohexyl.

Cycloalkyloxy $R_{91}$, $R_{92}$ and $R_{93}$ are preferably $C_1$–$C_8$cycloalkyloxy, and particularly preferably $C_5$- or $C_6$cycloalkyloxy. Some examples are cyclobutyloxy, cycloheptyloxy, cyclooctyloxy and, in particular, cyclopentyloxy and cyclohexyloxy. Examples of substitued cycloalkyl are methyl-, dimethyl-, trimethyl-, methoxy-, dimethoxy-, trimethoxy-, trifluoromethyl-, bistrifluoromethyl and tristrifluoromethylcyclopentyloxy and -cyclohexyloxy.

Aryl $R_{91}$, R92 and $R_{93}$ are preferably $C_6$–$C_{12}$aryl and particularly preferably phenyl or naphthyl. Examples of substituted aryl are methyl-, dimethyl-, trimethyl-, methoxy-, dimethoxy-, trimethoxy-, trifluoromethyl-, bistrifluoromethyl and tristrifluoromethylphenyl.

Aryloxy $R_{91}$, $R_{92}$ and $R_{93}$ are preferably $C_6$–$C_{12}$aryloxy, and particularly preferably unsubstituted or substituted phenyloxy or naphthyloxy. Examples of substituted aryloxy are methyl-, dimethyl-, trimethyl-, methylisopropyl-, isopropyl-, diisopropyl-, triisopropyl-, tert-butyl-, methyl-tert-butyl-, di-tert-butyl-, tri-tert-butyl-, methoxy-, dimethoxy-, trimethoxy-, trifluoromethyl-, bistrifluoromethyl and tristrifluoromethylphenyloxy.

Aralkyl $R_{91}$, $R_{92}$ and $R_{93}$ are preferably $C_7$–$C_{13}$aralkyl, the alkylene group in the aralkyl preferably being methylene. The aralkyl is particularly preferably benzyl. Examples of substituted aralkyl are methyl-, dimethyl-, trimethyl-, methoxy-, dimethoxy-, trimethoxy-, trifluoromethyl-, bistrifluoromethyl and tristrifluoromethylbenzyl.

Aralkyloxy $R_{91}$, $R_{92}$ and $R_{93}$ are preferably unsubstituted or substituted $C_7$–$C_{13}$aralkyloxy, the alkylene group in the aralkyloxy preferably being methylene. The aralkyloxy is particularly preferably unsubstituted or substituted benzyloxy. Examples of substituted aralkyloxy are methyl-, dimethyl-, trimethyl-, methoxy-, dimethoxy-, trimethoxy-, trifluoromethyl-, bistrifluoromethyl and tristrifluoromethylbenzyloxy.

Examples of tetra- and pentamethylene which are bonded to the P atom and are unsubstituted or substituted or fused are

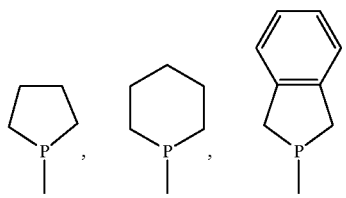

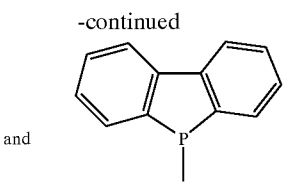

and

Other suitable phosphines are cycloaliphatics having 6 to 8 ring carbon atoms which are bridged with a =PRa group, for example

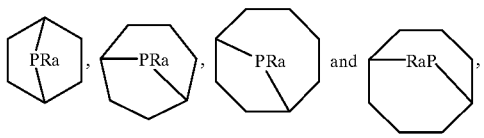

in which Ra is $C_1$–$C_6$alkyl, cyclohexyl, benzyl, or phenyl which is unsubstituted or substitued by 1 or 2 $C_1$–$C_4$alkyl.

Linear or branched alkylene $Z_1$ is preferably 1,2-alkylene or 1,3-alkylene having preferably 2 to 6 C atoms, for example ethylene, 1,2-propylene or 1,2-butylene.

Examples of cycloalkylene $Z_1$ are 1,2- and 1,3-cyclopentylene and 1,2- or 1,3-cyclohexylene. Examples of heterocycloalkylene $Z_1$ are 1,2- and 1,3-pyrrolidine, 1,2- and 1,3-piperidine, and 1,2- and 1,3-tetrahydrofuran.

In a preferred embodiment, the phosphine ligands are those of the formula XXIII in which $R_{91}$, $R_{92}$ and $R_{93}$ independently of one another are H, $C_1$–$C_6$alkyl, cyclopentyl or cyclohexyl which are unsubstituted or substituted by $C_1$–$C_4$alkyl, or phenyl which are unsubstituted or substituted by $C_1$–$C_4$alkyl, $C_1$–$C_4$alkoxy or trifluoromethyl, or benzyl which is unsubstituted or substituted by $C_1$–$C_4$alkyl, $C_1$–$C_4$alkoxy or trifluoromethyl. Particularly preferred examples of phosphine ligands of the formula XXIII are $(C_6H_5)_3P$, $(C_6H_5CH_2)_3P$, $(C_5H_{11})_3P$, $(CH_3)_3P$, $(C_2H_5)_3P$, $(n$-$C_3H_7)_3P$, $(i$-$C_3H_7)_3P$, $(n$-$C_4H_9)_3P$, $(C_6H_5)_2HP$, $(C_6H_5CH_2)_2HP$, $(C_5H_{11})_2HP$, $(C_2H_5)_2HP$, $(n$-$C_3H_7)_2HP$, $(i$-$C_3H_7)_2HP$, $(n$-$C_4H_9)_2HP$, $(C_6H_5)H_2P$, $(n$-$C_4H_9)H_2P$, $(C_6H_5CH_2)H_2P$, $(C_5H_{11})H_2P$, $(CH_3)H_2P$, $(CH_3)_2HP$, $(C_2H_5)H_2P$, $(n$-$C_3H_7)H_2P$, $(i$-$C_3H_7)H_2P$, $PH_3$, $(2$-methyl-$C_6H_4)_3P$, $(3$—$CH_3$—$C_6H_4)_3P$, $(4$-$C_2H_5$—$C_6H_4)_3P$, $(4$-$CH_3$—$C_6H_4)_3P$, $(2,4$-di-$CH_3$—$C_6H_3)_3P$, $(2,6$-di-$CH_3$—$C_6H_3)_3P$, $(2$-$C_2H_5$—$C_6H_4)_3P$, $(3$-$C_2H_5$—$C_6H_4)_3P$, $(2$-n-$C_3H_7$—$C_6H_4)_3$P, $(3$-n-$C_3H_7$—$C_6H_4)_3P$, $(4$-n-$C_3H_7$—$C_6H_4)_3P$, $(2$-i-$C_3H_7$—$C_6H_4)_3P$, $(3$-i-$C_3H_7$—$C_6H_4)_3P$, $(4$-i-$C_3H_7$—$C_6H_4)_3P$, $(2$-n-$C_4H_9$—$C_6H_4)_3P$, $(3$-n-$C_4H_9$—$C_6H_4)_3P$, $(4$-n-$C_4H_9$—$C_6H_4)_3P$, $(2$-i-$C_4H_9$—$C_6H_4)_3P$, $(3$-i-$C_4H_9$—$C_6H_4)_3$ P, $(4$-i-$C_4H_9$—$C_6H_4)_3P$, $(2$-t-$C_4H_9$—$C_6H_4)_3P$, $(3$-t-$C_4H_9$—$C_6H_4)_3$P, $(4$-t-$C_4H_9$—$C_6H_4)_3P$, $(2$-$CH_3$-6-t-$C_4H_9$—$C_6H_3)_3P$, $(3$-$CH_3$-6-t-$C_4H_9$—$C_6H_3)_3P$, $(3$-$CH_3$-6-t-$C_4H_9$—$C_6H_3)_3P$, $(2,6$-di-t-$C_4H_9$—$C_6H_3)_3P$, $(2,3$-di-t-$C_4H_9$—$C_6H_3)_3P$, $(C_6H_{11})_3P$, $(C_6H_{11})_2HP$, $(C_5H_9)P$, $(C_5H_9)_2HP$ and $(2,4$-di-t-$C_4H_9$—$C_6H_3)_3P$.

In another preferred embodiment, the phosphine ligands correspond to the formula XXIII in which $R_{91}$, $R_{92}$ and $R_{93}$ independently of one another are H, $C_1$–$C_6$alkoxy, cyclopentyloxy or cyclohexyloxy which is unsubstituted or substituted by $C_1$–$C_4$alkyl, phenyloxy or phenyl which is unsubstituted or substituted by $C_1$–$C_4$alkyl, $C_1$–$C_4$alkoxy or trifluoromethyl, or benzyloxy which is unsubstituted or substituted by $C_1$–$C_4$alkyl, $C_1$–$C_4$alkyl, $C_1$–$C_4$alkoxy or trifluoromethyl.

Examples of phosphites are $(CH_3O)_3P$, $(C_2H_5O)_3P$, $(n$-$C_3H_7O)_3P$, $(i$-$C_3H_7O)_3P$, $(n$-$C_4H_9O)_3P$, $(i$-$C_4H_9O)_3P$, (t-C$_4$H$_9$O)$_3$P, (C$_6$H$_5$O)$_3$P, (3-CH$_3$-6-t-C$_4$H$_9$—C$_6$H$_3$O)$_3$P, (2-CH$_3$—C$_6$H$_4$O)$_3$P, (3-CH$_3$—C$_6$H$_4$O)$_3$P, (4-CH$_3$—C$_6$H$_4$O)$_3$P, (2,4-di-CH$_3$—C$_6$H$_3$O)$_3$P, (2,6-di-CH$_3$—C$_6$H$_3$O)$_3$ P, (2-C$_2$H$_5$—C$_6$H$_4$O)$_3$P, (3-C$_2$H$_5$—C$_6$H$_4$O)$_3$P, (4-C$_2$H$_5$—C$_6$H$_4$O)$_3$P, (2-n-C$_3$H$_7$—C$_6$H$_4$O)$_3$P, (3-n-C$_3$H$_7$—C$_6$H$_4$O)$_3$P, (4-n-C$_3$H$_7$—C$_6$H$_4$O)$_3$P, (2-i-C$_3$H$_7$—C$_6$H$_4$O)$_3$P, (3-i-C$_3$H$_7$—C$_6$H$_4$O)$_3$P, (4-i-C$_3$H$_7$—C$_6$H$_4$O)$_3$P, (2-n-C$_4$H$_9$—C$_6$H$_4$O)$_3$P, (3-n-C$_4$H$_9$—C$_6$H$_4$O)$_3$P, (4-n-C$_4$H$_9$—C$_6$H$_4$O)$_3$P, (2-i-C$_4$H$_9$—C$_6$H$_4$O)$_3$P, (3-i-C$_4$H$_9$—C$_6$H$_4$O)$_3$P, (4-i-C$_4$H$_9$—C$_6$H$_4$O)$_3$P, (2-CH$_3$-6-t-C$_4$H$_9$—C$_6$H$_3$O)$_3$P, (2,3-di-t-C$_4$H$_9$—C$_6$H$_3$O)$_3$P, ((2,6-di-t-C$_4$H$_9$—C$_6$H$_3$O)$_3$P, 3-t-C$_4$H$_9$—C$_6$H$_4$O)$_3$ P, (3-CH$_3$-6-t-C$_4$H$_9$—C$_6$H$_3$O)$_3$P, (2,4-di-t-C$_4$H$_9$—C$_6$H$_3$O)$_3$ P, (4-t-C$_4$H$_9$—C$_6$H$_4$O)$_3$P, (2-t-C$_4$H$_9$—C$_6$H$_4$O)$_3$P and phosphites of the formula

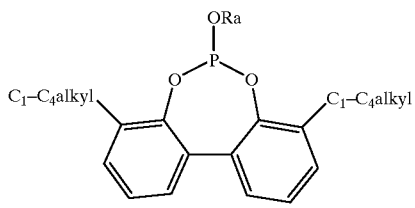

in which Ra is C$_1$–C$_6$alkyl, cyclohexyl, benzyl, or phenyl which is unsubstituted or substituted by 1 or 2 C$_1$–C$_4$alkyl.

Particularly preferred phosphines are tri-i-propylphosphine, tri-t-butylphosphine, tricyclopentylphosphine and tricyclohexylphosphine.

Organic or inorganic compounds, atoms or ions which are coordinated to a metal centre are designated as ligands for the ruthenium and osmium compounds to be used according to the invention.

The meanings and preferred meanings of photolabile ligands and non-photolabile ligands (also called highly coordinating ligands) have been mentioned above.

In a preferred embodiment, the Ru and Os catalysts to be used according to the invention contain only photolabile ligands, phosphine groups and anions for charge balancing. The catalysts which are especially preferred are those which contain an arene group as a photolabile ligand, a tertiary phosphine group, and mono- or divalent anions for charge balancing.

Suitable anions of inorganic or organic acids are, for example, hydride (H$^-$), halide (for example F$^-$, Cl$^-$, Br$^-$ and I$^-$), the anion of an oxygen acid, and BF$_4^-$, PF$_6^-$, SbF$_6^-$ or AsF$_6^-$. It should be mentioned that the abovementioned cyclopentadienyl is a ligand and anion.

Other suitable anions are C$_1$–C$_2$-, preferably C$_1$–C$_6$-, and particularly preferably C$_1$–C$_4$alcoholates, which, in particular, are branched, for example corresponding to the formula R$_x$R$_y$R$_z$C—O$^-$, in which R$_x$ is H or C$_1$–C$_{10}$alkyl, R$_y$ is C$_1$–C$_{10}$alkyl and R$_z$ is C$_1$–C$_{10}$alkyl or phenyl, and the sum of the C atoms of R$_x$,R$_y$ and R$_z$ is 11. Examples are, in particular, i-propyloxy and t-butyloxy.

Other suitable anions are C$_3$–C$_{18}$-, preferably C$_5$–C$_{14}$- and particularly preferably C$_5$–C$_{12}$acetylides, which can correspond to the formula R$_w$—C≡C$^-$, in which R$_w$ is C$_1$–C$_{16}$alkyl, preferably α-branched C$_3$–C$_{12}$alkyl, for example of the formula R$_x$R$_y$R$_z$C—, or are [sic] phenyl or benzyl which are unsubstituted or substituted by 1 to 3 C$_1$–C$_4$alkyl or C$_1$–C$_4$alkoxy. Some examples are i-propyl-, i- and t-butyl-, phenyl-, benzyl-, 2-methyl-, 2,6-dimethyl-, 2-i-propyl-, 2-i-propyl-6-methyl-, 2-t-butyl-, 2,6-di-t-butyl- and 2-methyl-6-t-butylphenylacetylide.

The meanings and preferred meanings of anions of oxygen acids have been mentioned above. H$^-$, F$^-$, Cl$^-$, Br$^-$, BF$_4^-$, PF$_6^-$, SbF$_6^-$, AsF$_6^-$, CF$_3$SO$_3^-$, C$_6$H$_5$—SO$_3^-$, 4-methyl-C$_6$H$_5$—SO$_3^-$; 2,6-dimethyl-C$_6$H$_5$—SO$_3^-$, 2,4,6-trimethyl-C$_6$H$_5$—SO$_3^-$ and 4-CF$_3$—C$_6$H$_5$—SO$_3^-$ and cyclopentadienyl (Cp$^-$) are particularly preferred.

The number of the non-photolabile ligands depends on the number of the phosphine groups, the size of the non-photolabile ligands and the number of photolabile ligands.

In a preferred embodiment, the ruthenium and osmium compounds are particularly preferably those of one of the formulae XXIV to XXIVf $$R_{97}L_8Me^{2+}(Z^{n-})_{2/n} \qquad (XXIV),$$

$$R_{97}L_9L_{10}Me^{2+}(Z^{n-})_{2/n} \qquad (XXIVa),$$

$$(R_{97})_2L_9Me^{2+}(Z^{n-})_{2/n} \qquad (XXIVb),$$

$$(R_{97}^-)_3L_9Me^{2+}(Z^{n-})_{2/n} \qquad (XXIVc),$$

$$R_{97}L_8L_9Me^{2+}(Z^{n-})_{2/n} \qquad (XXIVd),$$

$$R_{97}L_9L_9Me^{2+}(Z^{n-})_{2/n} \qquad (XXIVe),$$

$$R_{97}L_8L_{10}Me^{2+}(Z^{n-})_{2/n} \qquad (XXIVf),$$

in which

R$_{97}$ is a tertiary phosphine of the formula XXIII or XXIIIa;

Me is Ru or Os;

n is the numbers 1, 2 or 3;

Z is the anion of an inorganic or organic acid;

(a) L$_8$ is an arene or heteroarene ligand;

(b) L$_9$ is a monovalent photolabile ligand which is different to L$_8$; and (c) L$_{10}$ is a monovalent non-photolabile ligand.

For R$_{97}$, L$_8$, L$_9$ and L$_{10}$, the preferred meanings mentioned above for the individual meanings apply.

In the formulae XXIV to XXIVf, n is preferably 1 or 2, and especially 1. For R$_{97}$, the preferred meanings mentioned for the phosphine ligands of the formula XXIII apply, and these are, in particular, tertiary phosphines.

Ruthenium and osmium compounds which are especially preferably used in the process according to the invention are those of one of the formulae XXV to XXVf $$(R_{94}R_{95}R_{96}P)L_8Me^{2+}(Z^{1-})_2 \qquad (XXV),$$

$$(R_{94}R_{95}R_{96}P)_2L_9Me^{2+}(Z^{1-})_2 \qquad (XXVa),$$

$$(R_{94}R_{95}R_{96}P)L_9L_{10}Me^{2+}(Z^{1-})_2 \qquad (XXVb),$$

$$(R_{94}R_{95}R_{96}P)_3L_9Me^2(Z^{1-})_2 \qquad (XXVc),$$

$$(R_{94}R_{95}R_{96}P)L_9L_9Me^{2+}(Z^{1-})_2 \qquad (XXVd),$$

$$(R_{94}R_{95}R_{96}P)L_8L_{10}Me^{2+}(Z^{1-})_2 \qquad (XXVe),$$

$$(R_{94}R_{95}R_{96}P)L_8(L_9)_mMe^{2+}(Z^{1-})_2 \qquad (XXVf),$$

in which

Me is Ru or Os;

Z in formulae XXV to XXVe is H$^-$, cyclopentadienyl, Cl$^-$, Br$^-$, BF$_4^-$, PF$_6^-$, SbF$_6^-$, AsF$_6^-$, CF$_3$SO$_3^-$, C$_6$H$_5$—SO$_3^-$, 4-methyl-C$_6$H$_5$—SO$_3^-$, 3,5-dimethyl-C$_6$H$_5$—SO$_3^-$, 2,4,6-trimethyl-C$_6$H$_5$—SO$_3^-$ and 4-CF$_3$—C$_6$H$_5$—SO$_3^-$ and in formula XXVf is H$^-$, cyclopentadienyl, BF$_4^-$, PF$_6^-$, SbF$_6^-$, AsF$_6^-$, CF$_3$SO$_3^-$, C$_6$H$_5$—SO$_3^-$, 4-methyl-C$_6$H$_5$—SO$_3^-$, 2,6-dimethyl-C$_6$H$_5$—SO$_3^-$, 2,4,6-trimethyl-C$_6$H$_5$—SO$_3^-$ or 4-CF$_3$—C$_6$H$_5$—SO$_3^-$;

$R_{94}$, $R_{95}$ and $R_{96}$ independently of one another are $C_1$–$C_6$alkyl, or cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl;

$L_8$ is $C_6$–$C_{16}$arene or $C_5$–$C_{16}$heteroarene which are unsubstituted or substituted by 1 to 3 $C_1$–$C_4$alky, $C_1$–$C_4$alkoxy, —OH, —F or Cl;

$L_9$ is $C_1$–$C_6$alkyl-CN, benzonitrile or benzylnitrile; and $L_{10}$ is $H_2O$ or $C_1$–$C_6$alkanol.

Preferred arenes and heteroarenes are benzene, toluene, xylene, trimethylbenzene, naphthalene, biphenyl, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazine, thianthrene and purin. More preferred arenes and heteroarenes are benzene, naphthalene, cumene, thiophene and benzothiophene. The arene is especially preferably benzene or a benzene substituted by $C_1$–$C_4$alkyl, for example toluene, xylene, isopropylbenzene, tert-butylbenzene or cumene, and the heteroarene is preferably thiophene.

If the preparation of the ruthenium and osmium catalysts is carried out in solyents which can coordinate to a metal atom, for example alkanols, solvated Ru/Os cation complexes can form, and these are also included in the context of the use of according to the invention.

Some examples of ruthenium and osmium compounds to be used according to the invention are [Tos is tosylate]: $(C_6H_{11})_2HPRu(p\text{-cumene})Cl_2$, $(C_6H_{11})_3PRu(p\text{-cumene})Cl_2$, $(C_6H11\ )_3PRu(p\text{-cumene})(Tos)_2$, $(C_6H_{11})_3PRu(p\text{-cumene})Br_2$, $(C_6H_{11})_3PRu(p\text{-cumene})ClF$, $(C_6H_{11})_3PRu(C_6H_6)(Tos)_2$, $(C_6H_{11})_3PRu(C_3—C_6H_5)(TOS)_2$, $(C_6H_{11})_3PRu(i\text{-}C_3H_7—C_6H_5)(Tos)_2$, $(C_6H_{11})_3PRu(\text{chrysene})(Tos)_2$, $(C_6H_{11})_3PRu(\text{biphenyl})(Tos)_2$, $(C_6H_{11})_3PRu(\text{anthracene})(Tos)_2$, $(C_6H_{11})_3PRu(C_{10}H_8)(Tos)_2$, $(i\text{-}C_3H_7)_3PRu(p\text{-cumene})Cl_2$, $(CH_3)_3PRu(p\text{-cumene})Cl_2$, $(n\text{-}C_4H_9)_3PRu(p\text{-cumene})Cl_2$, $[(C_6H_{11})_3P]_2Ru(CH_3—CN)(Tos)_2$, $(C_6H11)_3PRu(CH_3—CN)(C_2H_5—OH)(Tos)_2$, $(C_6H_{11})_3PRu(p\text{-cumene})(CH_3—CN)_2(PF_6)_2$, $(C_6H_{11})_3PRu(p\text{-cumene})(CH_3—CN)_2(Tos)_2$, $(n\text{-}C_4H_9)_3PRu(p\text{-cumene})(CH_3—CN)_2(Tos)_2$, $(C_6H_{11})_3PRu(CH_3CN)Cl_2$, $(C_6H_{11})_3PRu(CH_3—CN)_2\ Cl_2$, $(C_6H_{11})_3PRu(p\text{-cumene})(C_2H_5OH)(BF_4)_2$, $(C_6H_{11})_3PRu(p\text{-cumene})(C_2H_5OH)_2(BF_4)_2$, $(C_6H_{11})_3Pru(p\text{-cumene})(C_2H_5OH)_2(PF_6)_2$, $(C_6H_{11})_3PRu(C_6H_6)(C_2H_5OH)_2(Tos)_2$, $(C_6H_{11})_3POs(p\text{-cumene})Cl_2$, $(i\text{-}C_3H_7)_3POs(p\text{-cumene})Cl_2$, $(CH_3)_3POs(p\text{-cumene})Cl_2$, $(C_6H_5)_3POs(p\text{-cumene})Cl_2$, $[(C_6H_{11})_3P]_3Ru(p\text{-cumene})Cl_2$ and $RuCl_2(p\text{-cumene})[(C_6H_{11})_2PCH_2CH_2P(C_6H_{11})_2]$.

The ruthenium and osmium compounds to be used according to the invention are known or can be prepared by known and analogous processes starting from the metal halides (for example $MeX_3$ or $[MeareneX_2]_2$ and reaction with phosphines and ligand-forming agents.

7. Further suitable one-component catalysts are divalently cationic ruthenium or osmium compounds with a metal atom to which 1 to 3 tertiary phosphine ligands with, in the case of ruthenium compounds, sterically bulky substituents, if desired, non-photolabile neutral ligands and anions are bonded for charge balancing, with the proviso that in ruthenium(trisphenylphosphine)dihalides or -hydride-halides the phenyl groups are substituted by $C_1$–$C_{18}$alkyl, $C_1$–$C_{18}$haloalkyl or $C_1$–$C_{18}$alkoxy.

The ruthenium and osmium compounds preferably contain 2 or 3 tertiary phosphine groups. Phosphine groups in the context of the invention are understood as meaning tertiary phophines and phosphites. The number of additional non-photolabile neutral ligands depends on the one hand on the number of phosphine and phosphite ligands, and on the other hand on the valency of the neutral ligands. Monovalent or divalent neutral ligands are preferred.

In a preferred embodiment, the divalently cationic ruthenium and osmium compounds to be used according to the invention contain 3 phosphine or phosphite group s and two monovalent anions for charge balancing; or 3 phosphine or phosphite groups, two monovalent or one divalent non-photolabile neutral ligand, and two monovalent anions for charge balancing; or 2 phosphine or phosphite groups, one monoanionic, additionally monovalent non-photolabile neutral ligands and o one monovalent anion for charge balancing.

The meanings and preferred meanings of non-photolabile ligands (also called highly coordinating ligands) have been mentioned above.

Sterically bulky substituents in the context of the invention are understood as meaning those which shield the ruthenium and osmium atoms sterically. It has thus been found, surprisingly, that linear alkyl groups as substituents in the phosphine and phosphite ligands result in ruthenium compounds without any thermal activity for the metathesis polymerization of strained cycloolefins. It has also been observed that in the case of osmium compounds, surprisingly, linear alkyl groups as substituents in the phosphine and phosphite ligands have an excellent thermocatalytic activity for the metathesis polymerization of strained cycloolefins; however, phosphine and phosphite ligands with sterically bulky substituents are also preferably used for the osmium compounds. It has furthermore been found that the steric shielding of triphenylphosphine ligands in ruthenium dihalides and ruthenium hydride-halides is inadequate, and such catalysts have only a moderate catalytic activity for the metathesis polymerization of strained cycloolefins. The catalytic activity can suprisingly be increased considerably if the tertiary phosphine groups contain phenyl substituted by alkyl or alkoxy groups.

The meanings and preferred meanings of phosphine ligands have been mentioned above. Alkyl $R_{91}$, $R_{92}$ and $R_{93}$ are particularly preferably α-branched alkyl, for example of the formula —$CR_bR_cR_d$, in which $R_b$ is H or $C_1$–$C_{12}$alkyl, $R_c$ is $C_1$–$C_{12}$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical —$CR_bR_cR_d$ is 3 to 18. Examples of alkyl are i-propyl, i- and t-butyl, 1-methyl- or 1,1-dimethylpropyl-1-yl, 1-methyl- or 1,1-dimethylbut-1-yl, 1-methyl- or 1,1-dimethylpent-1-yl, 1-methyl- or 1,1-dimethylhex-1-yl, 1-methyl- or 1,1-dimethylheptl-1yl [sic], 1-methyl- or 1,1-dimethyloct-1-yl, 1-methyl- or 1,1-dimethylnon-1-yl, 1-methyl- or 1,1-dimethyldec-1-yl, 1-methyl- or 1,1-dimethylundec-1-yl, 1-methyl- or 1,1-dimethyldodec-1-yl, 1-methyl- or 1,1-dimethyltridec-1-yl, 1-methyl- or 1,1-dimethyltetradec-1-yl, 1-methyl- or 1,1-dimethylpentadec-1-yl, 1-methyl- or 1,1-dimethylhexadec-1-yl, 1-methylheptadec-1-yl, phenyl-dimethyl-methyl. Preferred examples are i-propyl, i- and t-butyl.

In the case of the osmium compounds used, $R_{91}$, $R_{92}$ and $R_{93}$ can also be linear alkyl having 1 to 18, preferably 1 to 12, more preferably 1 to 8, and particularly preferably 1 to 6 C atoms, for example methyl, ethyl, n-propyl, n-butyl, n-pentyl, n-hexyl, n-heptyl and n-octyl.

Alkoxy $R_{91}$, $R_{92}$ and $R_{93}$ can contain 3 to 12, more preferably 3 to 8, and particularly preferably 3 to 6 C atoms. The alkoxy is particularly preferably α-branched alkoxy, for example of the formula —$OCR_bR_cR_d$, in which $R_b$ is H or $C_1$–$C_{12}$alkyl, $R_c$ is $C_1$–$C_2$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical —$CR_bR_cR_d$ is 3 to 18. Examples of alkoxy are i-propyloxy, i- and t-butyloxy, 1-methyl- or 1,1-dimethylprop-1-oxyl, 1-methyl- or 1,1-dimethylbut-1-oxyl, 1-methyl- or 1,1-dimethylpent-1-oxyl, 1-methyl- or 1,1-dimethylhex-1-oxyl, 1-methyl- or 1,1-dimethylhept-1-oxyl, 1-methyl- or 1,1-dimethyloct-1-oxyl, 1-methyl- or 1,1-dimethylnon-1-oxyl, 1-methyl- or 1,1-dimethyldec-1-oxyl, 1-methyl- or 1,1-dimethylundec-1-oxyl, 1-methyl- or 1,1-dimethyldodec-1-oxyl, 1-methyl- or 1,1-dimethyltridec-1-oxyl, 1-methyl- or 1,1-dimethyltetradec-1-oxyl, 1-methyl- or 1,1-dimethylpentadec-1-oxyl, 1-methyl- or 1,1-dimethylhexadec-1-oxyl, 1-methylheptadec-1-oxyl, phenyldimethyl-methyl. Preferred examples are i-propyloxy, i- and t-butyloxy.

In the case of the osmium compounds used, $R_{91}$, $R_{92}$ and $R_{93}$ can also be linear alkoxy having 1 to 18, preferably 1 to 12, more preferably 1 to 8, and particularly preferably 1 to 6 C atoms, for example methoxy, ethoxy, n-propyloxy, n-butyloxy, n-pentyloxy, n-hexyloxy, n-heptyloxy and n-octyloxy.

Cycloalkyl $R_{91}$, $R_{92}$ and $R_{93}$ are preferably $C_1$–$C_8$cycloalkyl, and particularly preferably $C_5$- or $C_6$cycloalkyl. Some examples are cyclobutyl, cycloheptyl, cyclooctyl and in particular, cyclopentyl and cyclohexyl, which are preferably unsubstituted or substituted by 1 to 3 alkyl, haloalkyl or alkoxy groups.

Cycloalkyloxy $R_{91}$, $R_{92}$ and $R_{93}$ are preferably $C_5$–$C_8$cycloalkyloxy, and particularly preferably $C_5$- or $C_6$cycloalkyloxy. Some examples are cyclobutyloxy, cycloheptyloxy, cyclooctyloxy and, in particular, cyclopentyloxy and cyclohexyloxy, which are preferably unsubstituted or substituted by 1 to 3 alkyl, haloalkyl or alkoxy groups.

In a preferred embodiment, the phosphine ligands are those of the formula XXIII in which $R_{91}$, $R_{92}$ and $R_{93}$ independently of one another are α-branched $C_3$–$C_8$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkyl [sic] $C_1$–$C_4$alkoxy or trifluoromethyl. Particularly preferred examples of phosphine ligands of the formula XXIII are $(C_6H_5)_3P$, $(C_5H_9)_3P$, $(C_6H_{11})_3P$, (i-$C_3H_7)_3P$, (i-$C_4H_9)_3P$, (t-$C_4H_9)_3P$, $[C_2H_5$—$CH(CH_3)]_3P$, $[C_2H_5$—$C(CH_3)_2]_3P$, (2-methylphenyl)$_3P$, (2,3-dimethylphenyl)$_3P$, (2,4-dimethylphenyl)$_3P$, (2,6-dimethylphenyl)$_3P$, (2-methyl-4-i-propylphenyl)$_3P$, (2-methyl-3-i-propylphenyl)$_3P$, (2-methyl-5-i-propylphenyl)$_3P$, (2,4-di-t-butylphenyl)$_3P$, (2-methyl-6-i-propylphenyl)$_3P$, (2-methyl-3-t-butylphenyl)$_3P$, (2,5-di-t-butylphenyl)$_3P$, (2-methyl4-t-butylphenyl)$_3P$, (2-methyl-5-i-butylphenyl)$_3P$, (2,3-di-t-butylphenyl)$_3P$ and (2,6-di-t-butylphenyl)$_3P$.

In another preferred embodiment, the phosphite ligands are those of the formula XXIII in which $R_{91}$, $R_{92}$ and $R_{93}$ independently of one another are α-branched $C_3$–$C_8$alkoxy, or cyclopentyloxy or cyclohexyloxy which are unsubstituted or substituted by $C_1$–$C_4$alkyl; or phenyloxy which is unsubstituted or substituted by $C_1$–$C_4$alkyl, $C_1$–$C_4$alkoxy or trifluoromethyl. Examples of phosphites have been mentioned above.

Examples and preferred meanings of suitable anions have been mentioned above.

In a preferred embodiment, the ruthenium and osmium compounds are particularly preferably those of the formulae XXVI, XXVIa, XXVIb, XXVIc or XXVId

  (XXVI),

  (XXVIa),

  (XXVIb),

  (XXVIc),

  (XXVId), in which

Me is Ru or Os;

$Y_1$ is the anion of a monobasic acid;

$L_{11}$ is a phosphine of the formula XXIII or XXIIIa;

$L_{12}$ is a neutral ligand;

$L_{13}$ is cyclopentadienyl which is unsubstituted or substituted by $C_1$–$C_4$alkyl; and $L_{14}$ is CO.

For the individual meanings of $L_{11}$, $L_{12}$, $L_{13}$ and $Y_1$, the above preferred meanings apply.

In a particularly preferred embodiment, in formula XXVI $L_{12}$ is a $C_1$–$C_4$alkanol, in formula XXVIb, $Y_1$ is Cl or Br, in formula XXVIc $Y_1$ is H, and in the formulae XXVI to XXVIc $L_{11}$ is tri-i-propylphosphine, tricyclohexylphosphine, triphenylphosphine or triphenyiphosphine which is substituted by 1 to 3 $C_1$–$C_4$alkyl in the phenyl groups.

Some examples of ruthenium and osmium compounds to be used according to the invention are $[(C_6H_{11})_3P]_2Ru(CH_3OH)_2(ToS)_2$, $[(C_6H_{11})_3P]_2RuCl_2$ and $[(C_6H_{11})_3P]_3Ru(CH_3OH)_2$.

The ruthenium and osmium compounds to be used according to the invention are known or can be prepared by known and analogous processes starting from the metal halides (for example $MeX_3$, $[Me(diolefin)X_2]_2$ or $[Me$-$areneX_2]_2$ and reaction with phosphines and ligand-forming agents.

The compositions according to the invention are surprisingly stable to storage and can be marketed as such. However, it is also possible to mix the individual components together before processing. If air- and/or moisture-sensitive catalysts are used, storage with exclusion of air and moisture is advisable. Since the novel crosslinking principle is not based on a free radical, anionic or cationic reaction, practically no interruption or slowing of the reaction is observed on carrying out the polymerization in air, which offers considerable advantages during processing, for example no extensive protective precautions. The possibility of using solyent-free systems in the case of liquid polymers of low molecular weight or in the case of solutions with reactive strained cycloolefins which are capable of metathesis polymerization as comonomers is a great surprising advantage.

The invention also relates to a process for the preparation of crosslinked polymers by metathesis polymerization, wherein a composition of (a) a catalytic amount of a one-component catalyst for metathesis polymerization and (b) at least one polymer with strained cycloalkenylene radicals bonded in the polymer backbone, alone or mixed with strained cycloolefins, (c) is polymerized by heating, (d) is polymerized by irradiation, (e) is polymerized by heating and irradiation,
(f) the one-component catalyst is activated by brief heating and the polymerization is brought to completion by irradiation, or
(g) the one-component catalyst is activated by brief irradiation and the polymerization is brought to completion by heating.

Heating can mean a temperature of 50 to 300° C., preferably 60 to 250° C., particularly preferably 60 to 200° C., and especially preferably 60 to 150° C. The polymerization times essentially depend on the catalyst activity, and the times can extend from several seconds to minutes and hours.

In the process according to the invention, it is not necessary to maintain the irradiation of the reaction mixture over the entire duration of the reaction. Once the polymerization has been initiated photochemically, the subsequent course of the reaction takes place independently, even in the dark. Irradiation is advantageously carried out with light of a wavelength in the range from 50 nm to 1000 nm, preferably in the range from 200 nm to 500 nm and especially preferably in the UV range. The irradiation time depends on the nature of the light source. Suitable sources of irradiation are, for example, the sun, sources of laser radiation, X-ray radiation and, in particular, sources of UV radiation. UV lasers or UV lamps are preferably employed according to the invention. The irradiation of the catalyst can be carried out both before, during and after the addition of the monomer.

Suitable irradiation times are from one second to several hours, in particular minutes to hours. The sequence of the addition of monomers and catalysts is not critical. The monomer can be both initially introduced into the reaction vessel and added after introduction of the catalyst. Likewise, the catalyst can be pre-irradiated and then added to the monomer. It is furthermore also possible to irradiate the solution comprising catalyst and monomer.

In the case of irradiation using photoactive catalysts, the process according to the invention is preferably carried out at room temperature to slightly elevated temperature. An increase in temperature in this case essentially serves to increase the rate of reaction. At the temperatures chosen to accelerate the reaction, a photopolymerization therefore also chiefly takes place. However, it should be mentioned that the catalysts can be converted into thermoactive catalysts by adequate irradiation or elevated temperature. It is furthermore to be noted that some catalysts are capable of initiating the metathesis polymerization both thermally and [lacuna] irradiation.

In particular, the process according to the invention is carried out with irradiation preferably at temperatures of −20 to +110° C., particularly preferably 20 to 80° C.

The irradiation time essentially depends on the desired reaction procedure. Brief irradiation is chosen, for example, if the polymerization is only to be initiated by irradiation and is to be brought to completion by heating. This can mean an irradiation time of up to 60 seconds, preferably 5 to 60 seconds, and particularly preferably 10 to 40 seconds. A longer irradiation time is chosen, for example, if the polymerization is to be carried out chiefly with irradiation and the final polymerization is to be brought to completion only by after-heating.

A quite particular and surprising advantage of the process according to the invention is that one-component catalysts used act as thermal catalysts after the irradiation. This results in the possibility of continuing the polymerization and bringing it to completion by supplying heat after a short irradiation time, which offers economic and industrial advantages in various areas of production of shaped articles or coatings.

The present invention also relates to crosslinked metathesis polymers of a polymer with strained cycloalkenylene radicals bonded in the polymer backbone, alone or as a mixture with strained cycloolefins.

The present invention also relates to metathesis polymers, crosslinked using a one-component catalyst, from a composition comprising
(a) a catalytic amount of a one-component catalyst for the metathesis polymerization and
(b) at least one polymer with strained cycloalkenylene radicals bonded in the polymer backbone, alone or as a mixture with strained cycloolefins.

Materials for production of shaped articles by machining, or shaped articles of all types directly, as well as coatings and relief images can be produced with the process according to the invention. The invention also relates to shaped articles of crosslinked metathesis polymers of the composition according to the invention.

The polymers according to the invention can have very different properties, depending on the monomer used. Some are distinguished by a very high permeability to oxygen, low dielectric constants, good heat stability and low absorption of water. Others have outstanding optical properties, for example high transparency and low refractive indices. Furthermore, the low shrinkage is to be singled out in particular. They can therefore be used in very different industrial fields.

As layers on the surfaces of carrier materials, the compositions according to the invention are distinguished by a high adhesive strength. The coated materials are furthermore distinguished by a high surface smoothness and gloss. Among the good mechanical properties, the low shrinkage and the high impact strength are to be singled out in particular, and also the heat stability. The ease of removal from the moulds during processing in moulds and the high resistance to solvents are furthermore to be mentioned.

These polymers are suitable for the production of medical equipment, implants or contact lenses; for the production of electronic components; as binders for coatings; as photocurable compositions for model construction or as adhesives for gluing substrates of low surface energy (for example Teflon, polyethylene and polypropylene, silicone rubber), and as photopolymerizable compositions in stereolithography. The compositions according to the invention can also be used for the production of coatings by photopolymerization, it being possible for on the one hand clear (transparent) and even pigmented compositions to be used. Both white and coloured pigments can be used.

The photocurable compositions according to the invention are particularly suitable for the production of protective coatings and relief images. The invention also relates to a variant of the process according to the invention for the production of coated materials or relief images on carrier materials, in which a composition according to the invention and, if desired, a solyent are applied as a layer to a carrier, for example by dipping, brushing, pouring, rolling, knife-coating or whirler coating processes, the solyent is removed, if desired, and the layer is irradiated or heated for polymerization, or the layer is irradiated through a photomask and the non-irradiated portions are then removed with a solyent. This can then also be followed by heat treatment. Using this process, surfaces of substrates can be modified or protected, or, for example, printed circuits, printing plates or printing rolls can be produced. In the production of printed circuits, the compositions according to the invention can also be employed as solder resists. Other possible uses are the production of screen printing masks and the use as radiation-curable printing inks for offset, screen and flexographic printing. Because of the high adhesion and the low absorption of water, the protective coatings on carrier materials are especially suitable for corrosion protection.

The present invention furthermore relates to a coated carrier material, wherein a layer of a composition according to the invention is applied to a substrate.

The present invention also relates to a coated substrate with a cured layer of a composition according to the invention. The exceptionally high adhesive strength of the layers, even on metal surfaces, is to be singled out in particular, even when the products are pure hydrocarbon polymers.

Suitable substrates (carrier materials) are, for example, those of glass, minerals, ceramics, plastics, wood, semimetals, metals, metal oxides and metal nitrides. The layer thicknesses essentially depend on the desired use, and can be, for example, 0.1 to 1000 μm, preferably 0.5 to 500 μm, particularly preferably 1 to 100 μm. The coated materials are distinguished by a high adhesive strength and good thermal and mechanical properties.

The coated materials according to the invention can be prepared by known methods, for example brushing, knife-coating or casting processes, such as curtain pouring or spin coating.

The compositions according to the invention can also be used as adhesives which cure by means of heat or by means of radiation, for firmly bonding the most diverse materials, it being possible for outstanding peel strengths to be achieved.

In addition to the high adhesive strengths, the outstanding processability, the good surface properties (smoothness, gloss), the high crosslinking density and the resistance to solvents and other liquids, the polymers according to the invention are also distinguished in particular by very good physico-mechanical properties, for example high heat resistance, breaking and flexural strength and impact strength, and outstanding electrical properties, for example low surface tensions and charges (very low ε and tan δ values). The high permeability to oxygen and the low absorption of water are furthermore to be mentioned. Polymers built up only from carbon and hydrogen are particularly valuable ecologically, since, for example, they can be incinerated by pyrrolysis [sic] or without the formation of harmful by-products. Because of their outstanding electrical properties, these polymers are particularly suitable for applications in the field of electrical engineering and electronics, in particular as insulating materials (for example coil encapsulation).

The following examples illustrate the invention in more detail.

A) Preparation of Polymers with Strained Cycloolefin Rings in the Polymer Backbone

EXAMPLE A1

Preparation of

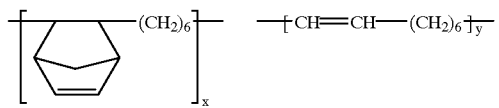

55.1 g (0.5 mol) of Vestenamer® 6213 (cyclooctene polymerized by metathesis, Hüls AG) are dissolved in 200 ml of toluene, the solution is mixed with 33.05 g (0.25 mol) of dicyclopentadiene and the mixture is heated at 190° C. in an autoclave for 8 hours. During this operation, the dicyclopentadiene is cleaved to give cyclopentadiene, which reacts with the Vestenamer to form norbornene groups. The reaction mixture is then poured into methanol/acetone (1:1), while stirring, and the polymer which has precipitated out is filtered off and then dried. Yield 50.4 g (76%). Elemental analysis, % calculated (found): C 88.57 (88.38), H 11.43 (11.60).

$^1$H-NMR analysis shows that 35% of the double bonds of the Vestenamer have been converted into norbornene units (x=0.35 and y=0.65). $M_n$=8500 g/mol; $M_w$=170,000 g/mol, determined by gel permeation chromatography in tetrahydrofuran with polystyrene standards.

EXAMPLE A2

Preparation of

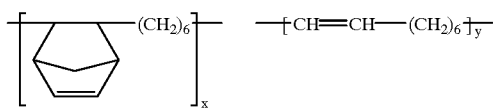

55.1 g (0.5 mol) of Vestenamer® L3000 (cyclooctene of low molecular weight polymerized by metathesis, Hüls AG, Marl) are mixed with 33.5 g (0.25 mol) of dicyclopentadiene without a solvent and the mixture is heated at 190° C. in an autoclave for 8 hours. Working up and analysis of the reaction mixture are carried out analogously to Example A1. Yield 47.5 g (77%). Elemental analysis, % calculated (found): C, 88.57 (88.54), H, 11.43 (11.32). $^1$H-NMR analysis shows that 28% of the double bonds of the Vestenamer have been converted into norbornene units (x=0.28 and y=0.72). $M_n$=500 g/mol; $M_w$=5000 g/mol.

EXAMPLE A3

Preparation of Linear Polydicyclopentadiene with Structural Elements

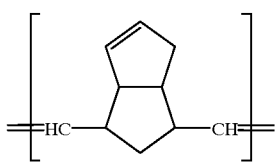

0.25 g of [W(N—C$_6$H$_5$)(CH$_2$Si(CH$_3$)$_3$)$_2$(OC(CH$_3$)$_3$)Cl] is dissolved in 150 of toluene, and 30 ml of dicyclopentadiene are added. Irradiation is carried out for 30 minutes with a 1000W Xenon lamp with an IR water filter from a distance of one meter. Thereafter, 1 ml of benzaldehyde is added and the mixture is stirred at room temperature for a further hour. It is added dropwise to 1.5l of methanol and the polymer which has precipitated out is filtered off and dried in vacuo at room temperature. The yield of crude product is 22.6 g. 200 ml of toluene are added to the crude product and the mixture is stirred at room temperature for 3 days. It is centrifuged and the toluene solution is decanted off, and subsequently stirred into 1.5l of methanol. The white polymer which has precipitated out is filtered off and dried in vacuo. The yield of polymer is 5.62 g (19%). The polymer is very readily soluble in toluene.

EXAMPLE A4

Preparation of

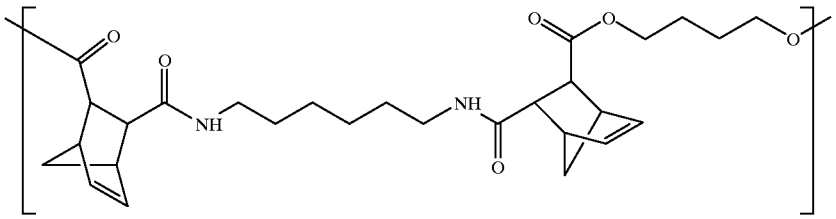

(a) 15.0 g (0.091 mol) of norbornene-1,2-dicarboxylic anhydride are dissolved in 200 ml of toluene at 80° C. A solution of 5.29 g (0.0455 mol) of 1,6-diaminohexane in 50 ml of toluene is added dropwise with stirring. After 30 minutes at 80° C. the mixture is cooled and filtered. The residue is powdered and dried under a high vacuum at 40° C. for 24 h. Yield: 16.5 g (81.6%). Melting point: 164° C.; IR (KBr): ν(C═O): 1635 cm$^{-1}$ (amide) and 1695 cm$^{-1}$ (carboxylic acid); $^1$H-NMR (DMSO-d$_6$): inter alia 5.92–6.16 ppm: 4 olefin-H of the norbornene units; elemental analysis ($C_{24}H_{32}N_2O_6$): calculated: C, 64.85; H, 7.26; N, 6.30; found: C, 66.64, H, 8.34; N, 7.22.

(b) 1.0 g (11 mmol) of 1,4-butanediol and 7.84 g (11 mmol) of the product obtained in (a) are dissolved in 50 ml of dimethylformamide. 4.54 g (22 mmol) of dicyclohexyl-carbodiimide are added in portions with stirring and under an N$_2$ atmosphere, and the mixture is heated at 50° C. for 14 h. After cooling, the mixture is filtered and the filtrate is precipitated in 1 l of water. Filtration and drying give the title compound. Yield: 4.2 g (84%); GPC (THF, PS standards): M$_n$=5100 g/mol; M$_w$=13,000 g/mol; elemental analysis ($C_{28}H_{38}N_2O_6$)$_n$: calculated: C, 67.44; H, 7.68; N, 5.62; found: C, 66.88, H, 7.70; N, 5.87; soluble in DMSO, DMF, CHCl$_3$, THF, dioxane

EXAMPLE A5

Preparation of

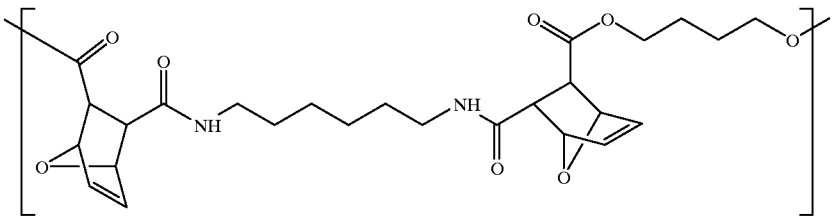

(a) 15.0 g (0.090 mol) of 7-oxanorbornene-1,2-dicarboxylic anhydride are dissolved in 135 ml of dioxane at 60° C. A solution of 5.23 g (0.045 mol) of 1,6-diaminohexane in 50 ml of toluene is added dropwise with stirring. After 30 minutes at 60° C. the mixture is cooled and filtered. The residue is powdered and dried under a high vacuum at 40° C. for 24 h. Yield: 13.09 g (64.9%). Melting point: 120° C. (decomposes); IR (KBr): ν(C═O): 1632 cm$^{-1}$ (amide) and 1700 cm$^{-1}$ (carboxylic acid); $^1$H-NMR (DMSO-d$_6$): inter alia 6.0–6.5 ppm: 4 olefin-H of the 7-oxanorbornene units; elemental analysis ($C_{22}H_{28}N_2O_8$): calculated: C, 64.85; H, 7.26; N, 6.30; found: C, 66.64, H, 8.34; N, 7.22.

(b) 1.0 g (11 mmol) of 1,4-butanediol and 5.0 g (11 mmol) of the product obtained in (a) are dissolved in 50 ml of dimethylformamide. 4.54 g (22 mmol) of dicyclohexylcarbodiimide are added in portions with stirring and under an N$_2$ atmosphere, and the mixture is heated at 50° C. for 14 h. After cooling, the mixture is filtered and the filtrate is concentrated in a rotary evaporator. Drying gives the title compound. Yield: 5.2 g (94%); GPC (THF, PS standards): M$_n$=7400 g/mol; M$_w$=20,800 g/mol; elemental analysis ($C_{26}H_{34}N_2O_8$)$_n$: calculated: C, 62.14; H, 6.82; N, 5.57; found: C, 61.74, H, 7.12; N, 6.01; soluble in DMSO, DMF, CHCl$_3$, THF, dioxane B) Use Examples

EXAMPLE B1

Thermal Polymerization

In 1 ml of a 20% solution of the polymer according to Example A1 in chloroform, (a) 5 mg of Ru[p-cumene][P(C$_6$H$_{11}$)$_3$]$_3$Cl$_2$ or (b) 5 mg of Ru[P(C$_6$H$_{11}$)$_3$]$_3$(CH$_3$OH)$_2$ are dissolved. The mixtures are cast to films on glass plates with a doctor blade of 100 μm slit width. The solvent is evaporated off at room temperature for 1 hour and the film is then dried at 50° C. in vacuo for 1 hour. The coated plates are stable to storage. The layers can be detached with toluene. The coated glass plates are heated either at 65° C. for 4 hours or at 80° C. for 2 hours. After cooling, the plates are placed in water, whereupon a transparent, practically colourless and unsupported film can be detached from the glass plate. The crosslinking is demonstrated by the insolubility and swellability of the film in toluene. The films have an elasticity modulus of 2 MPa (Minimat tensile tester). Dielectric constants (ε) and and [sic] loss factors (tan δ) at 30° C. and various frequencies (ν):

| ν | ε | tan δ (%) |
|---|---|---|
| 200 Hz | 2.8 | <0.01 |
| 1000 Hz | 2.7 | 0.01 |
| 10,000 Hz | 2.7 | 0.015 |
| 100 kHz | 2.6 | 0.025 |

-continued

| ν | ε | tan δ (%) |
|---|---|---|
| 1 MHz | 2.5 | 0.03 |
| 10 MHz | 2.4 | 0.05 |
| 100 MHz | 2.3 | 0.05 |
| 1 GHz | 2.2 | not determined |

EXAMPLE B2
Thermal Polymerization

Analogously to Example B1, 5 mg of Ru[p-cumene][P(C$_6$H$_{11}$)$_3$]$_3$Cl$_2$, as the catalyst, are dissolved in 1 g of the polymer according to Example A2 by heating to 60° C. and the solvent-free mixture is applied hot to a heated glass plate with a doctor blade. The coated plate is heated at 80° C. for 2 hours. After cooling, a pale yellow transparent and unsupported film is detached from the glass plate. The film is insoluble in toluene.

EXAMPLE B3
Thermal Polymerization

Analogously to Example B1, a 5% solution of the polymer according to Example A3 is dissolved in toluene with 0.5% by weight of Ru[p-cumene][P(C$_6$H$_{11}$)$_3$]$_3$Cl$_2$ as the catalyst, and the mixture is applied to a heated glass plate with a layer thickness of 20 μm using a doctor blade. The coated plate is heated at 80° C. for 2 hours. After cooling, a transparent and unsupported film which swells only very slightly in toluene is detached from the glass plate.

EXAMPLE B4
Thermal Polymerization

The procedure is analogous to Example 3 and a film is formed on a copper foil. After the polymerization, the film has excellent adhesion to the copper foil. The coated copper foil is steeped in water for one week; even after this, the film cannot be detached from the copper film.

EXAMPLE A5
Photopolymerization

A layer about 1 μm thick is applied to an Si semiconductor plate (wafer) by means of spin coating with a 10% solution of the polymer according to Example A1 and and [sic] 1% by weight (based on the polymer) of Ta[CH$_2$—Si(CH$_3$)$_3$]$_3$Cl$_2$, as the catalyst, in toluene. The layer is exposed to an Oriel 350W UV lamp under a mask for 15 seconds, subsequently heated at 80° C. for 30 seconds and then developed with methylene chloride. A relief image with a resolution of about 1 μm is obtained.

EXAMPLE B6
Photopolymerization

The solution used according to Example B5 is applied to a copper-coated epoxy laminate (printed circuit board) with a layer thickness of 50 μm using a doctor blade (slit width 500 μm). The layer is then heated at 70° C. for 1 minute and subsequently exposed to a Höhnle 3000W UV lamp under a printed circuit board mask for 3 minutes. It is then heated at 70° C. for 3 minutes and subsequently developed with methylene chloride. A negative relief image of high resolution is obtained.

EXAMPLE B7
Photopolymerization

A layer about 1 μm thick is applied to an Si semiconductor plate (wafer) by means of spin coating with a 10% solution of the polymer according to Example A3 and and [sic] 2% by weight (based on the polymer) of Ta[CH$_2$—Si(CH$_3$)$_3$]$_3$Cl$_2$, as the catalyst, in toluene. The layer is exposed to an Oriel 350W UV lamp under a resist mask for 5 seconds, subsequently heated at 80° C. for 30 seconds and then developed with toluene. A relief image with a resolution of about 0.7 μm is obtained.

EXAMPLE B8
Photopolymerization

A layer about 1 μm thick is applied to an Si semiconductor plate (wafer) by means of spin coating with a 10% solution of the polymer according to Example A4 and and [sic] 1% by weight (based on the polymer) of Ta[CH$_2$—Si(CH$_3$)$_3$]$_3$Cl$_2$ in dioxane. The layer is exposed to an Oriel 350W UV lamp under a resist mask for 100 seconds and then developed with dioxane. A relief image with a high resolution is obtained.

EXAMPLE B9
Photopolymerization

A layer about 1 μm thick is applied to an Si semiconductor plate (wafer) by means of spin coating with a 10% solution of the polymer according to Example A5 and and [sic] 1% by weight (based on the polymer) of Ta[CH$_2$—Si(CH$_3$)$_3$]$_3$Cl$_2$ in dioxane.

The layer is exposed to an Oriel 350W UV lamp under a resist mask for 100 seconds and then developed with dioxane. A relief image with a high resolution is obtained.

EXAMPLE B10
Photocrosslinking 0.5 g of the polymer according to Example A4 are dissolved in 5 ml of dioxane together with 5 mg of [Ru(C$_6$H$_6$)$_2$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B11
Photocrosslinking 0.5 g of the polymer according to Example A4 are dissolved in 5 ml of dioxane together with 5 mg of [Ru(CH$_3$CN)$_6$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B12
Photocrosslinking 0.5 g of the polymer according to Example A4 are dissolved in 5 ml of dioxane together with 5 mg of [Ru(CH$_3$CH$_2$CN)$_6$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B13
Photocrosslinking 0.5 g of the polymer according to Example A5 are dissolved in 5 ml of dioxane together with 5 mg of [Ru(C$_6$H$_6$)$_2$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B14
Photocrosslinking 0.5 g of the polymer according to Example A5 are dissolved in 5 ml of dioxane together with 5 mg of [Ru(CH$_3$CN)$_6$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B15
Photocrosslinking 0.5 g of the polymer according to Example A5 are dissolved in 5 ml of dioxane together with 5 mg of [Ru(CH$_3$CH$_2$CN)$_6$](Tos)$_2$. The solution is poured onto a glass plate and a film about 30 μm thick is produced by means of a doctor blade. Exposure is carried out for 3 minutes under a UV lamp, after which the clear, transparent films can no longer be dissolved, in particular neither in DMSO nor in dioxane.

EXAMPLE B16
Thermal Crosslinking

A film about 50 μm thick is produced on a glass plate by means of a doctor blade from a 10% solution of the polymer according to Example A4 in dioxane together with 1% (based on the polymer) of RuCl$_2$(p-cumene)P(C$_6$H$_{11}$)$_3$ and subsequent evaporation of the solvent at 80° C. The film is crosslinked by heating at 120° C. for 1 h. After detaching it from the glass plate, a tear-resistant film is obtained which is insoluble in both dioxane and DMF.

EXAMPLE B17
Thermal Crosslinking

A film about 50 μm thick is produced on a glass plate by means of a doctor blade from a 10% solution of the polymer according to Example A5 in dioxane together with 1% (based on the polymer) of RuCl$_2$(p-cumene)P(C$_6$H$_{11}$)$_3$ and subsequent evaporation of the solvent at 80° C. The film is crosslinked by heating at 120° C. for 1 h. After detaching it from the glass plate, a tear-resistant film is obtained which is insoluble in both dioxane and DMF.

EXAMPLE B18
Thermal Crosslinking

A layer 500 μm thick of a 10% solution of the polymer according to Example A1 and 1% of [(C$_6$H$_{11}$)$_3$P]$_2$Ru(CH$_3$OH)$_2$(Tos)$_2$ in toluene is applied to an iron panel.

Following the evaporation of the toluene, the polymer is crosslinked at 80° C. for 1 h. The resulting film is insoluble in CH$_2$Cl$_2$.

EXAMPLE B19
Thermal Crosslinking

A layer 500 μm thick of a 10% solution of the polymer according to Example A1 and 1% of [(C$_6$H$_{11}$)$_3$P]$_2$RuCl$_2$ in toluene is applied to an iron panel. Following the evaporation of the toluene, the polymer is crosslinked at 80° C. for 1 h. The resulting film is insoluble in CH$_2$Cl$_2$.

What is claimed is:

1. A composition comprising
   (a) a catalytic amount of a one-component catalyst for metathesis polymerization, which one-component catalyst is selected from the group consisting of ruthenium and osmium compounds of the formulas XXV to XXVf

$(R_{94}R_{95}R_{96}P)L_8Me^{2+}(Z^{1-})_2$ (XXV)

$(R_{94}R_{95}R_{96}P)_2L_9Me^{2+}(Z^{1-})_2$ (XXVa)

$(R_{94}R_{95}R_{96}P)L_9L_{10}Me^{2+}(Z^{1-})_2$ (XXVb)

$(R_{94}R_{95}R_{96}P)_3L_9Me^{2+}(Z^{1-})_2$ (XXVc)

$(R_{94}R_{95}R_{96}P)L_9L_9Me^{2+}(Z^{1-})_2$ (XXVd)

$(R_{94}R_{95}R_{96}P)L_8L_{10}Me^{2+}(Z^{1-})_2$ (XXVe)

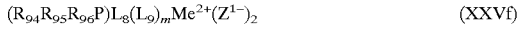
$(R_{94}R_{95}R_{96}P)L_8(L_9)_mMe^{2+}(Z^{1-})_2$ (XXVf)

wherein

Me is Ru or Os;

Z in formulas XXV to XXVe is H$^-$, cyclopentadienyl, Cl$^-$, Br$^-$, BF$_4^-$, PF$_6^-$, SbF$_6^-$, AsF$_6^-$, CF$_3$SO$_3^-$, C$_6$H$_5$—SO$_3^-$, 4-methyl-C$_6$H$_4$—SO$_3^-$, 3,5-dimethyl-C$_6$H$_3$—SO$_3^-$, 2,4,6-trimethyl-C$_6$H$_2$—SO$_3^-$ and 4—CF$_3$—C$_6$H$_4$—SO$_3$—; or Z in formula XXVf is H$^-$, cyclopentadienyl, BF$_4^-$, PF$_6^-$, SbF$_6^-$, AsF$_6^-$, CF$_3$SO$_3^-$, C$_6$H$_5$—SO$_3^-$, 4-methyl-C$_6$H$_4$—SO$_3^-$, 3,5-dimethyl-C$_6$H$_3$—SO$_3^-$, 2,4,6-trimethyl-C$_6$H$_2$—SO$_3^-$ and 4-CF$_3$—C$_6$H$_4$—SO$_3$—; or R$_{94}$, R$_{95}$ and R$_{96}$ independently of one another are C$_1$–C$_6$alkyl, or cyclopentyl or cyclohexyl or cyclopentyloxy or cyclohexyloxy which are unsubstituted or substituted by one to three C$_1$–C$_4$alkyl, or phenyl or benzyl or phenoxy or benzyloxy which are unsubstituted by one to three C$_1$–C$_4$alkyl;

L$_8$ is C$_6$–C$_{16}$arene or C$_5$–C$_{16}$heteroarene which are unsubstituted or substituted by one to three C$_1$–C$_4$alkyl, C$_1$–C$_4$alkoxy, —OH, —F or —Cl;

L$_9$ is C$_1$–C$_6$alkyl-CN, benzonitrile or benzylnitrile; and

L$_{10}$ is H$_2$O or C$_1$–C$_6$alkanol; and (b) at least one polymer with strained cycloalkenylene radicals bonded in the polymer backbone, alone or mixed with a strained cycloolefin.

2. A composition according to claim 1, wherein the polymers are those with recurring structural units of the formula (a) in the polymer backbone

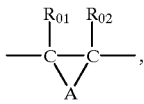

(a)

in which

R$_{01}$ and R$_{02}$ independently of one another are H or C$_1$–C$_6$alkyl, or R$_{01}$ and R$_{02}$ together are a bond, and A, together with the C—C group, forms an unsubstituted or substituted strained cycloolefin ring.

3. A composition according to claim 2, wherein the structural units of the formula (a) are bonded directly or via bridge groups.

4. A composition according to claim 2, wherein R$_{01}$ and R$_{02}$ are H.

5. A composition according to claim 2, wherein in formula (a)

R$_{01}$ and R$_{02}$ together are a bond, and A is unsubstituted or substituted C$_1$–C$_{12}$alkylene, unsubstituted or substituted C$_2$–C$_{12}$heteroalkylene, with at least one heteroatom from the group consisting of O, S and N; unsubstituted or substituted $C_5$–$C_{12}$cycloalkylene, unsubstituted or substituted $C_4$–$C_{12}$heterocycloalkylene, with at least one heteroatom from the group consisting of O, S and N; unsubstituted or substituted $C_2$–$C_{12}$alkenylene; unsubstituted or substituted $C_3$–$C_{12}$heteroalkenylene, with at least one heteroatom from the group consisting of O, S and N; unsubstituted or substituted $C_5$–$C_{12}$cycloalkenylene; or unsubstituted or substituted $C_4$–$C_{12}$heterocycloalkenylene, with at least one heteroatom from the group consisting of O, S and N; or $R_{01}$ and $R_{02}$ independently of one another are H or $C_1$–$C_6$alkyl and A is unsubstituted or substituted $C_5$–$C_{12}$-cycloalkenylene; unsubstituted or substituted $C_4$–$C_{12}$heterocycloalkenylene, with at least one heteroatom from the group consisting of O, S and N; or unsubstituted or substituted $C_5$–$C_{12}$cycloalkdienylene; or $R_{01}$ are a double bond together with a terminal C atom of the radical A; $R_{02}$ is H or $C_1$–$C_6$alkyl; and A unsubstituted or substituted $C_1$–$C_{12}$alkylene, unsubstituted or substituted $C_3$–$C_{12}$heteroalkylene, with at least one heteroatom from the group consisting of O, S and N; unsubstituted or substituted $C_5$–$C_{12}$cycloalkylene; unsubstituted or substituted $C_4$–$C_{12}$heterocycloalkylene with at least one heteroatom from the group consisting of O, S and N; unsubstituted or substituted $C_2$–$C_{12}$alkenylene; unsubstituted or substituted $C_3$–$C_{12}$heteroalkenylene with at least one heteroatom from the group consisting of O, S and N; unsubstituted or substituted $C_5$–$C_{12}$cycloalkenylene; or unsubstituted or substituted $C_4$–$C_{12}$heterocycloalkenylene with at least one heteroatom from the group consisting of O, S and N; or $R_{01}$ and $R_{02}$ each are a double bond together with in each case a terminal C atom of the radical A, and A is unsubstituted or substituted $C_3$–$C_{12}$alkylene; unsubstituted or substituted $C_3$–$C_{12}$heteroalkylene, with at least one heteroatom from the group consisting of O, S and N; unsubstituted or substituted $C_5$–$C_{12}$cycloalkylene; or unsubstituted or substituted $C_4$–$C_{12}$heterocycloalkylene, with at least one heteroatom from the group consisting of O, S and N; it being possible for phenylene, $C_4$–$C_8$cycloalkylene or $C_4$–$C_8$heterocycloalkylene to be fused onto the alkylene, heteroalkylene, cycloalkylene, heterocycloalkylene, alkenylene, heteroalkenylene, cycloalkenylene, heterocycloalkenylene, alkdienylene, heteroalkdienylene, cycloalkdienylene and heterocycloalkdienylene.

6. A composition according to claim 5, wherein $R_{01}$ and $R_{02}$ together are a bond, and A is unsubstituted or substituted $C_2$–$C_6$alkylene, unsubstituted or substituted $C_3$–$C_7$cycloalkylene, unsubstituted or substituted $C_2$–$C_6$alkenylene or unsubstituted or substituted $C_5$–$C_7$cycloalkenylene; or $R_{01}$ and $R_{02}$ independently of one another are H or $C_1$–$C_4$alkyl and A is unsubstituted or substituted $C_5$–$C_7$cycloalkenylene; or $R_{01}$ is a double bond together with a terminal C atom of the radical A; $R_{02}$ is H or $C_1$–$C_4$alkyl; and A is unsubstituted or substituted $C_2$–$C_6$alkenylene, unsubstituted or substituted $C_5$–$C_7$cycloalkylene, unsubstituted or substituted $C_2$–$C_6$alkenylene or unsubstituted or substituted $C_5$–$C_7$cycloalkenylene; or $R_{01}$ and $R_{02}$ each are a double bond together with in each case a terminal C atom of the radical A and A is unsubstituted or substituted $C_3$–$C_6$alkylene or unsubstituted or substituted $C_5$–$C_7$cycloalkylene.

7. A composition according to claim 1, wherein the polymers are homo- or copolymers.

8. A composition according to claim 2, wherein the polymer contains the structural elements of the formula (a) to the extent of at least 5 mol %, based on the polymer.

9. A composition according to claim 8, wherein the polymer contains the structural elements of the formula (a) to the extent of 5 to 100 mol %.

10. A composition according to claim 1, wherein the polymers with a carbon backbone are metathesis polymers or copolymers of strained cycloolefins with a double bond in the ring and olefinically unsaturated comonomers, of which the olefinic double bonds in the polymer backbone are reacted partly or completely with open-chain or cyclic 1,3-dienes having 4 to 12 C atoms in a Diels-Alder reaction to give cycloalkenylene radicals having 6 to 14 C atoms.

11. A composition according to claim 10, wherein 5 to 80% of the double bonds are reacted.

12. A composition according to claim 10, wherein the metathesis polymers contain recurring structural elements of the formula (t)

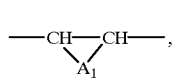

in which $A_1$ is mono- or bicyclic $C_5$–$C_8$cycloalkenylene.

13. A composition according to claim 12, wherein the structural element of the formula (t) is norborn-1,2-enylene of the formula (nr$_3$)

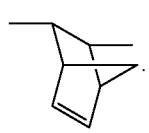

14. A composition according to claim 10, wherein the metathesis polymer contains recurring structural units of the formula (u)

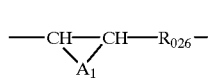

and recurring structural elements of the formula (w)

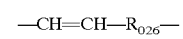

in which $A_1$, together with the —CH—CH—group, is bicyclic $C_5$–$C_8$cycloalkenylene and $R_{026}$ is $C_1$–$C_{12}$alkylene, and, if desired, recurring structural elements of the formula (s)

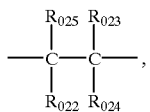

(s)

in which $R_{022}$ is H, F, $C_1$–$C_{12}$alkyl, —COOH, —C(O)O—$C_1$–$C_{12}$alkyl, —C(O)—$NH_2$ or —C(O)—NH—$C_1$–$C_{12}$alkyl; $R_{023}$ is H, F, Cl, CN or $C_1$–$C_{12}$alkyl; $R_{024}$ is H, F, Cl, CN, OH, $C_1$–$C_{12}$alkyl, $C_1$–alkoxy, phenyl which is unsubstituted or substituted by OH, Cl, Br, $C_1$–$C_4$alkyl, $C_1$–$C_4$alkoxy, —COOH, C(O)O$C_1$–$C_{12}$alkyl, —C(O)—$NH_2$, —C(O)—NH—$C_1$–$C_{12}$alkyl, —$SO_3$H or —$SO_3$—$C_1$–$C_{12}$alkyl, —C(O)OH, —C(O)O—$C_2$—$C_{12}$hydroxyalkyl, —C(O)O—$C_1$–$C_{12}$alkyl, —C(O)—$NH_2$ or —C(O)—NH—$C_1$–$C_{12}$alkyl; and $R_{025}$ is H, F or $C_1$–$C_{12}$alkyl.

15. A composition according to claim 1, wherein the polymers with a carbon backbone are homo- and copolymers of 1,3-dienes and, if desired, olefinically unsaturated monomers, of which the olefinic double bonds in the polymer backbone are reacted partly or completely with open-chain or cyclic 1,3-dienes having 4 to 12 C atoms in a Diels-Alder reaction to give cycloalkenylene radicals having 6 to 14 C atoms.

16. A composition according to claim 15, wherein 5 to 80% of the double bonds are reacted.

17. A composition according to claim 15, wherein the 1,3-dienes are chosen from the group consisting of 1,3-butadiene, isoprene and chloroprene.

18. A composition according to claim 15, wherein the polymers contain recurring structural elements of the formula (t),

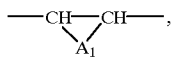

in which $A_1$ is mono- or bicyclic $C_5$–$C_8$cycloalkenylene.

19. A composition according to claim 18, wherein the structural element of the formula (t) corresponds to norbornen -1,2-enylene of the formula ($nr_3$)

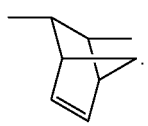

20. A composition according to claim 15, wherein the polymer contains recurring structural units of the formula (y)

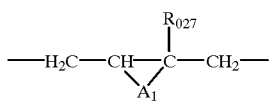

and recurring structural elements of the formula (z)

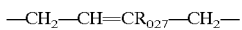

in which $A_1$, together with the —CH—$CR_{027}$ group, is bicyclic $C_5$–$C_8$cycloalkenylene and $R_{027}$ is H, Cl or $C_1$–$C_{12}$alkyl, and, if desired, recurring structural elements of the formula (s)

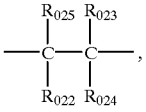

in which $R_{022}$ is H, F, $C_1$–$C_{12}$alkyl, —COOH, —C(O)O—$C_1$–$C_{12}$alkyl, —C(O)—$NH_2$ or —C(O)—NH—$C_1$–$C_{12}$alkyl; $R_{023}$ is H, F, Cl, CN or $C_1$–$C_{12}$alkyl; $R_{024}$ is H, F, Cl, CN, OH, $C_1$–$C_{12}$alkyl, $C_1$–$C_{12}$alkoxy, phenyl which is unsubstituted or substituted by OH, Cl, Br, $C_1$–$C_4$alkyl, $C_1$–$C_4$alkoxy, —COOH, C(O)O$C_1$–$C_{12}$alkyl, —C(O)—$NH_2$, —C(O)—NH—$C_1$–$C_{12}$alkyl, —$SO_3$H or —$SO_3$—$C_1$–$C_{12}$alkyl, —C(O)OH, —C(O)O—$C_2$–$C_{12}$hydroxyalkyl, —C(O)O—$C_1$–$C_{12}$alkyl, —C(O)—$NH_2$ or —C(O)—NH—$C_1$–$C_{12}$alkyl; and $R_{025}$ is H, F or $C_1$–$C_{12}$alkyl.

21. A composition according to claim 1, wherein the comonomeric strained cycloolefins correspond to the formula 1

in which $Q_1$ is a radical having at least one carbon atom which, together with the —CH=$CQ_2$— group, forms an at least 3-membered alicyclic ring which may contain one or more heteroatoms chosen from the group consisting of silicon, phosporus, oxygen, nitrogen or sulfur; and which is unsubstituted or substituted by halogen, =O, —CN, —$NO_2$, $R_1R_2R_3$Si—(O)$_u$, —COOM, —$SO_3$M, —$PO_3$M, —COO($M_1$)$_{1/2}$, —$SO_3$($M_1$)$_{1/12}$, —$PO_3$($M_1$)$_{1/2}$, $C_1$–$C_{20}$alkyl, $C_1$–$C_{20}$hydroxyalkyl $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_6$heteroaryl, $C_4$–$C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—may be fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, $C_7$–$C_{16}$aralkyl;

$R_5$ and $R_{10}$ independently of one another are hydrogen, $C_1$–$C_{12}$alkyl, phenyl or benzyl, where the alkyl groups in their turn are unsubstituted or substituted by $C_1-C_{12}$alkoxy or $C_3-C_8$cycloalkyl;

$R_6$, $R_7$ and $R_8$ independently of one another are $C_1-C_{12}$alkyl, $C_1-C_{12}$perfluoroalkyl, phenyl or benzyl;

M is an alkali metal and $M_1$ is an alkaline earth metal; and u is 0 or 1;

where the alicyclic ring formed with $Q_1$, may contain further non-aromatic double bonds;

$Q_2$ is hydrogen, $C_1-C_{20}$alkyl, $C_1-C_{20}$haloalkyl, $C_1-C_{12}$alkoxy, halogen, —CN, $R_{11}$—$X_2$—;

$R_{11}$ is $C_1-C_{20}$alkyl, $C_1-C_{20}$haloalkyl, $C_1-C_{20}$hydroxyalkyl, $C_3-C_8$cycloalkyl, $C_6-C_{16}$aryl or $C_7-C_{16}$aralkyl;

$X_2$ is —C(O)—O— or —C(O)—$NR_{12}$—;

$R_{12}$ is hydrogen, $C_1-C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1-C_{12}$alkyl, $C_1C_{12}$alkoxy, —$NO_2$, —CN or halogen and where the heteroatoms of the abovementioned heterocycloalkyl, heteroaryl and heteroaralkyl groups are chosen from the group consisting of —O—, —S—, —$NR_9$— and —N═; and $R_9$ is hydrogen, $C_1-C_{12}$alkyl, phenyl or benzyl.

22. A composition according to claim 1, which comprises comonomeric polyfunctional strained cycloolefins which are those of the formula (f1)

$$(T)_n-U \tag{f1}$$

in which T is the radical of a strained cycloolefin, U is a direct bond or an n-valent bridge group and n is an integer from 2 to 8.

23. A composition according to claim 22, wherein the radicals T correspond to cycloolefin radicals of the formula (f2)

(f2)

in which $Q_1$ is a radical having at least one carbon atom which, together with the —CH═$CQ_2$— group, forms an at least 3-membered alicyclic ring which may contain one or more heteroatoms chosen from the group consisting of silicon, phosporus, oxygen, nitrogen or sulfur; and which is unsubstituted or substituted by halogen, ═O, —CN, —$NO_2$, $R_1R_2R_3$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1-C_{20}$alkyl, $C_1-C_{20}$hydroxyalkyl $C_1-C_{20}$haloalkyl, $C_1C_6$cyanoalkyl, $C_3-C_8$cycloalkyl, $C_6-C_{16}$aryl, $C_7-C_{16}$aralkyl, $C_3-C_6$heterocycloalkyl, $C_3-C_{16}$heteroaryl, $C_4-C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1-C_{20}$alkyl, $C_1-C_{20}$haloalkyl, $C_1-C_{20}$hydroxyalkyl, $C_1-C_6$cyanoalkyl, $C_3-C_8$cycloalkyl, $C_6-Cl_{16}$aryl, $C_7-C_{16}$aralkyl, $C_3-C_6$heterocycloalkyl, $C_3-C_{16}$heteroaryl, $C_4-C_{16}$heteroaralkyl or $R_{13}$—$X_1$— may be fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—; $R_1$, $R_2$ and $R_3$ independently of one another are $C_1-C_{12}$alkyl, $C_1-C_{12}$perfluoroalkyl, phenyl or benzyl;

$R_4$ and $R_{13}$ independently are $C_1-C_{20}$alkyl, $C_1-C_{20}$haloalkyl, $C_1-C_{20}$hydroxyalkyl, $C_3-C_8$cycloalkyl, $C_6-C_{16}$aryl, $C_7-C_{16}$aralkyl;

$R_5$ and $R_{10}$ independently of one another are hydrogen, $C_1-C_{12}$alkyl, phenyl or benzyl, where the alkyl groups in their turn are unsubstituted or substituted by $C_1-C_{12}$alkoxy or $C_3-C_8$cycloalkyl;

$R_6$, $R_7$ and $R_8$ independently of one another are $C_1-C_{12}$alkyl, $C_1-C_{12}$perfluoroalkyl, phenyl or benzyl;

M is an alkali metal and $M_1$ is an alkaline earth metal; and u is 0 or 1;

where the alicyclic ring formed with $Q_1$ may contain further non-aromatic double bonds;

$Q_2$ is hydrogen, $C_1-C_{20}$alkyl, $C_1-C_{20}$haloalkyl, $C_1-C_{12}$alkoxy, halogen, —CN, $R_{11}$—$X_2$—;

$R_{11}$ is $C_1-C_{20}$alkyl, $C_1-C_{20}$haloalkyl, $C_1-C_{20}$hydroxyalkyl, $C_3-C_8$cycloalkyl, $C_6-C_{16}$aryl or $C_7-C_{16}$aralkyl;

$X_2$ is —C(O)—O— or —C(O)—$NR_{12}$—;

$R_{12}$ is hydrogen, $C_1-C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1-C_{12}$alkyl, $C_1$ $C_{12}$alkoxy, —$NO_2$, —CN or halogen and where the heteroatoms of the abovementioned heterocycloalkyl, heteroaryl and heteroaralkyl groups are chosen from the group consisting of —O—, —S—, —$NR_9$— and —N═; and $R_9$ is hydrogen, $C_1-C_{12}$alkyl, phenyl or benzyl.

24. A composition according to claim 22, wherein U is a) a divalent bridge group of the formula (f5)

$$-X_5-R_{028}-X_6- \tag{f5}$$

in which $X_5$ and $X_6$ independently of one another are a direct bond, —O—, —$CH_2$—O—, —C(O)O—, —O(O)C—, —$CH_2$—O(O)C—, —C(O)—$NR_{029}$—, —$R_{029}$N—(O)C—, —NH—C(O)—$NR_{029}$—, —O—C(O)—NH—, —$CH_2$—O—C(O)—NH— or —NH—C(O)—O—, and $R_{028}$ is $C_2-C_{18}$alkylene, $C_5-C_8$cycloalkylene which is unsubstituted or substituted by $C_1-C_4$alkyl or $C_1-C_4$alkoxy, $C_6-C_{18}$arylene or $C_7-C_{19}$aralkylene which are unsubstituted or substituted by $C_1-C_4$alkyl or $C_1-C_4$alkoxy, or polyoxaalkylene having 2 to 12 oxaalkylene units and 2 to 6 C atoms in the alkylene, and $R_{029}$ is H or $C_1-C_6$alkyl; or (b) a trivalent bridge group of the formula (f6)

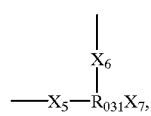
(f6)

in which $X_5$, $X_6$ and $X_7$ are —O—, —$CH_2$—O—, —C(O)O—, —O(O)C—, —$CH_2$—O(O)C—, —C(O)—

$NR_{029}$—, —$R_{029}$N—(O)C—, —NH—C(O)—$NR_{029}$—, —O—C(O)—NH—, —$CH_2$—O—C(O)—NH— or —NH—C(O)—O—, and $R_{031}$ is a trivalent aliphatic hydrocarbon radical having 3 to 20 C atoms, a trivalent cycloaliphatic radical which has 3 to 8 C atoms and is unsubstituted or substituted by $C_1$–$C_4$alkyl or $C_1$–$C_4$alkoxy, or a trivalent aromatic radical having 6 to 18 C atoms, which is unsubstituted or substituted by $C_1$–$C_4$alkyl or $C_1$–$C_4$alkoxy, a trivalent araliphatic radical having 7 to 19 C atoms, which is unsubstituted or substituted by $C_1$–$C_4$alkyl or $C_1$–$C_4$alkoxy, or a trivalent heteroaromatic radical having 3 to 13 C atoms and 1 to 3 heteroatoms from the group consisting of —O—, —N— and —S—, which is unsubstituted or substituted by $C_1$–$C_4$alkyl or $C_1$–$C_4$alkoxy, and $R_{031}$ is H or $C_1$–$C_6$alkyl; or (c) a tetravalent bridge group of the formula (f7)

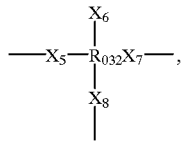

(f7)

in which $X_5$, $X_6$, $X_7$ and $X_8$ are —C(O)O—, —$CH_2$—O(O)C— or —C(O)—$NR_{029}$—, and $R_{032}$ is a tetravalent aliphatic hydrocarbon radical having 4 to 20 C atoms, a tetravalent cycloaliphatic radical having 4 to 8 ring C atoms, which is unsubstituted or substituted by $C_1$–$C_4$alkyl or $C_1$–$C_4$alkoxy, or a tetravalent aromatic radical having 6 to 18 C atoms, which is unsubstituted or substituted by $C_1$–$C_4$alkyl or $C_1$–$C_4$alkoxy, a tetravalent araliphatic radical having 7 to 19 C atoms, which is unsubstituted or substituted by $C_1$–$C_4$alkyl or $C_1$–$C_4$alkoxy, or a tetravalent heteroaromatic radical having 3 to 13 C atoms and 1 to three heteroatoms from the group consisting of —O—, —N— and —S—, which is unsubstituted or substituted by $C_1$–$C_4$alkyl or $C_1$–$C_4$alkoxy, and $R_{029}$ is H or $C_1$–$C_6$alkyl.

25. A composition according to claim 1, which comprises polymers and, if desired, monomers which are built up only from carbon and hydrogen.

26. A composition according to claim 1, which comprises the one-component catalyst in an amount of 0.001 to 20 mol %, based on the amount of the monomer.

27. A composition according to claim 26, which comprises the one-component catalyst in an amount of 0.01 to 10 mol %, based on the amount of the monomer.

* * * * *